United States Patent

[11] 3,597,744

[72] Inventors James H. Case
2286 Preston St., Salt Lake City, Utah 84106;
Neil C. Stewart, 1991 McClelland, Salt Lake City, Utah 84105

[21] Appl. No. 871,729
[22] Filed Sept. 11, 1969
[45] Patented Aug. 3, 1971
Continuation of application Ser. No. 605,757, Dec. 29, 1966, now abandoned.

[54] DIGITAL COMPUTING AND INFORMATION PROCESSING MACHINE AND SYSTEM
23 Claims, 37 Drawing Figs.

[52] U.S. Cl. .......... 340/172.5
[51] Int. Cl. .......... G11c 19/00
[50] Field of Search .......... 340/172.5; 235/157

[56] References Cited
UNITED STATES PATENTS

| | | | |
|---|---|---|---|
| 3,287,702 | 11/1966 | Borck, Jr. et al. | 340/172.5 |
| 3,287,703 | 11/1966 | Slotnick | 340/172.5 |
| 3,364,472 | 1/1968 | Sloper | 340/172.5 |
| 3,473,160 | 10/1969 | Wahlstrom | 340/172.5 |

*Primary Examiner*—Raulfe B. Zache
*Attorneys*—Mallinckrodt and Mallinckrodt; P. H. Mallinckrodt, Philip A. Mallinckrodt and B. Deon Criddle ABSTRACT: This invention provides a new parallel digital computing and information processing machine and system, which is word organized and can be appropriately described as of "short wire" type. The basic machine has an array of an arbitrarily large number of relatively simple information processing and transferring cells, which are arranged for independent operation in parallel at very high speeds. There is no overall command organization. When properly activated each cell processes or transfers information only within a region of influence containing the cell. Any such array has at least two and may have a multitude of such nonoverlapping regions of influence. The information transfer means between the cells are all "short" in that no such means connect between cells which are not in each other's influence regions. Long distance information transfer is achieved by programming means—duplicating information in a "bucket brigade" fashion from cell to cell. Each cell in the array contains at least one word of information, representing a four address instruction referring to cells in its influence region; and, when properly activated, each cell will decode its respective instruction word, obtain or send the addressed operand-information to neighboring cells; execute the instruction, store any results in the appropriate cells; and activate the next cell in the influence region.

INVENTORS
JAMES H. CASE
NEIL C. STEWART
BY
Mallinckrodt and Mallinckrodt
ATTORNEYS INVENTORS
JAMES H. CASE
NEIL C. STEWART
BY Mallinckrodt and Mallinckrodt
ATTORNEYS Fig. 3
A MAGNETIC CORE STANDARD GATE ELEMENT
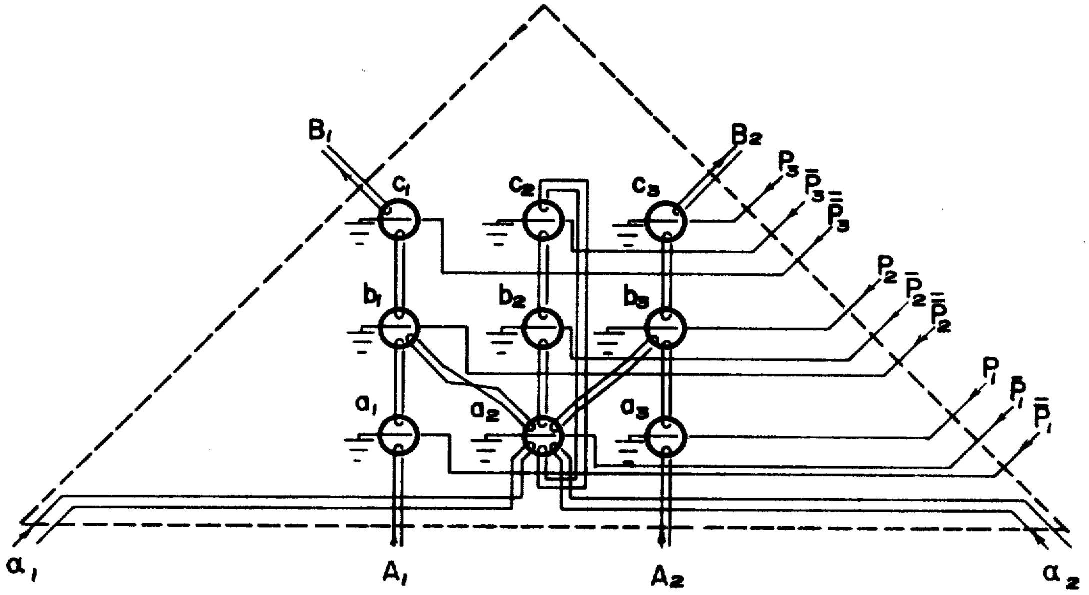
COMMUNICATION LINE BRANCHING
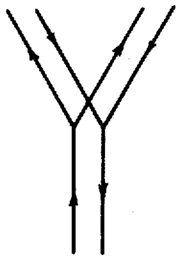
POWER PULSES
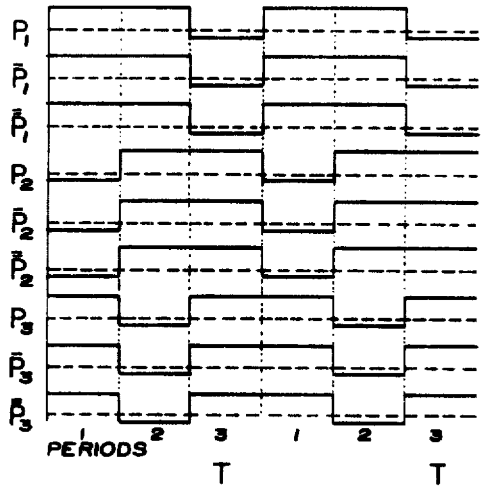
INVENTORS
JAMES H. CASE
NEIL C. STEWART
BY Mallinckrodt and Mallinckrodt
ATTORNEYS Fig. 4
A STANDARD GATE ELEMENT USING RELAYS
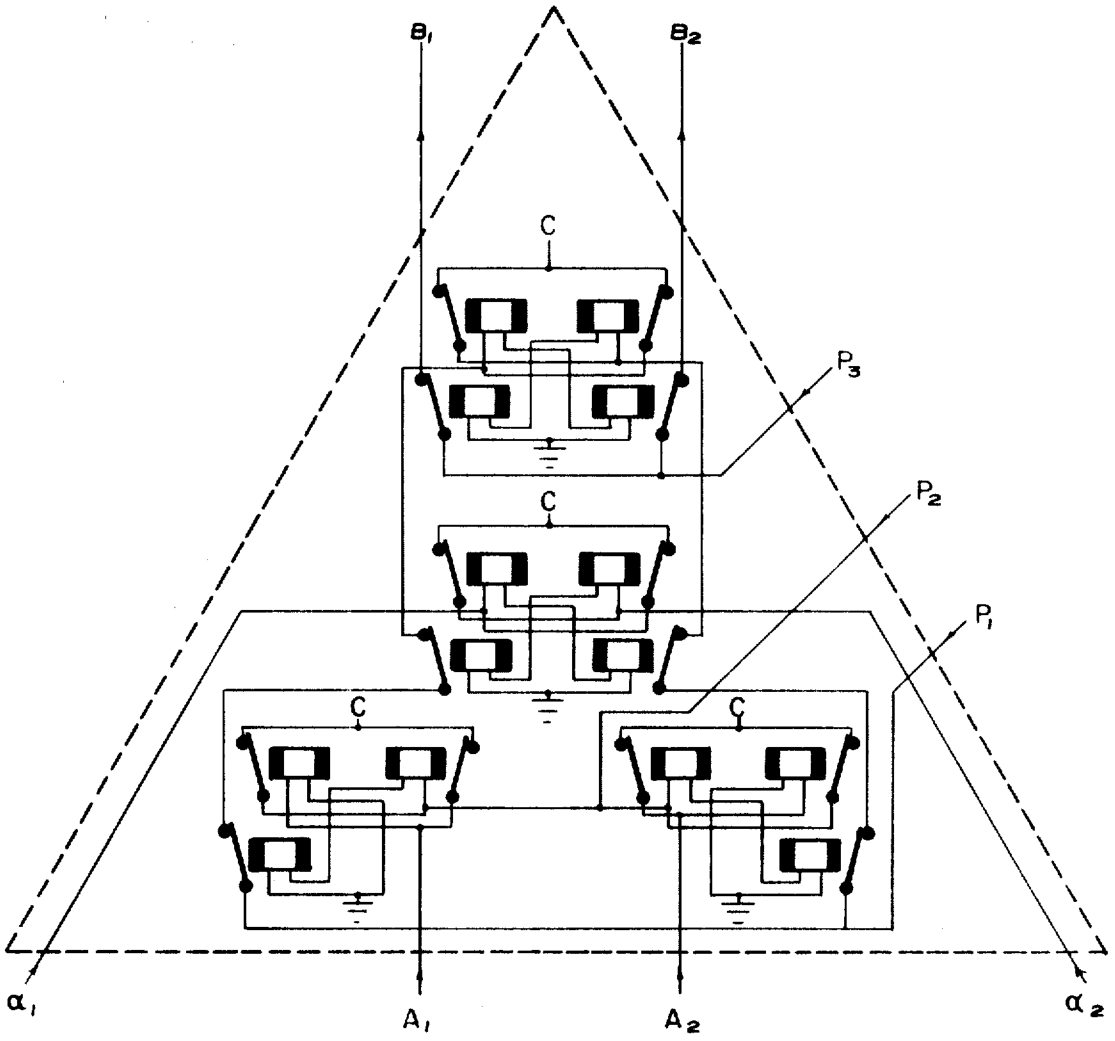
POWER PULSES
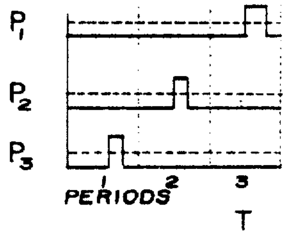
INVENTORS
JAMES H. CASE
NEIL C. STEWART
BY Mallinckrodt and Mallinckrodt
ATTORNEYS Fig. 5
A CROSSED-FILM CRYOTRON STANDARD GATE ELEMENT
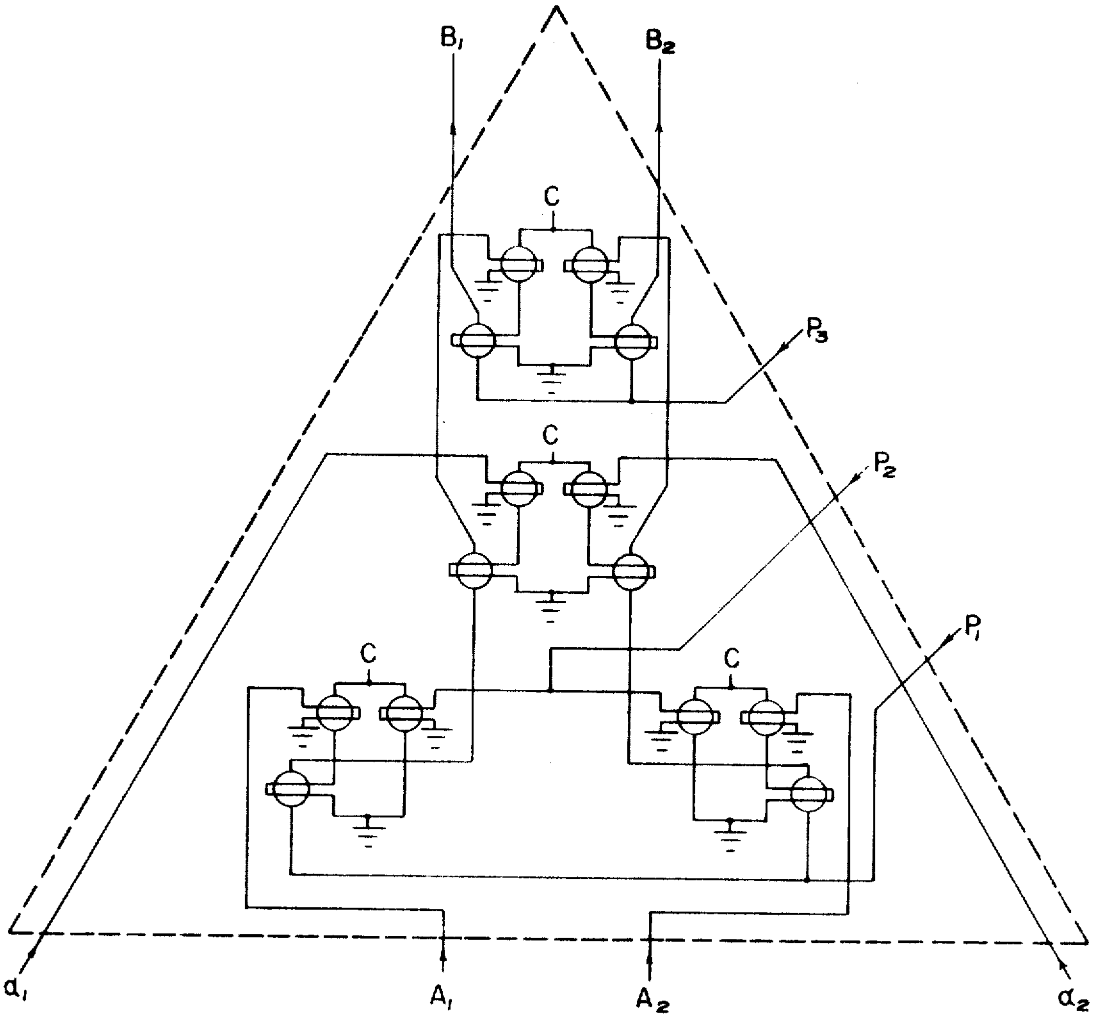
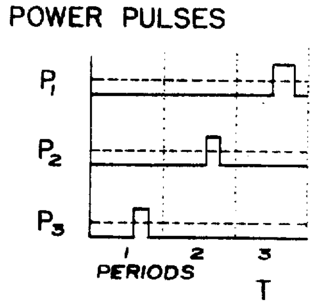
INVENTORS
JAMES H. CASE
NEIL C. STEWART
BY
Mallinckrodt and Mallinckrodt
ATTORNEYS Fig. 6
A TRANSISTOR STANDARD GATE ELEMENT
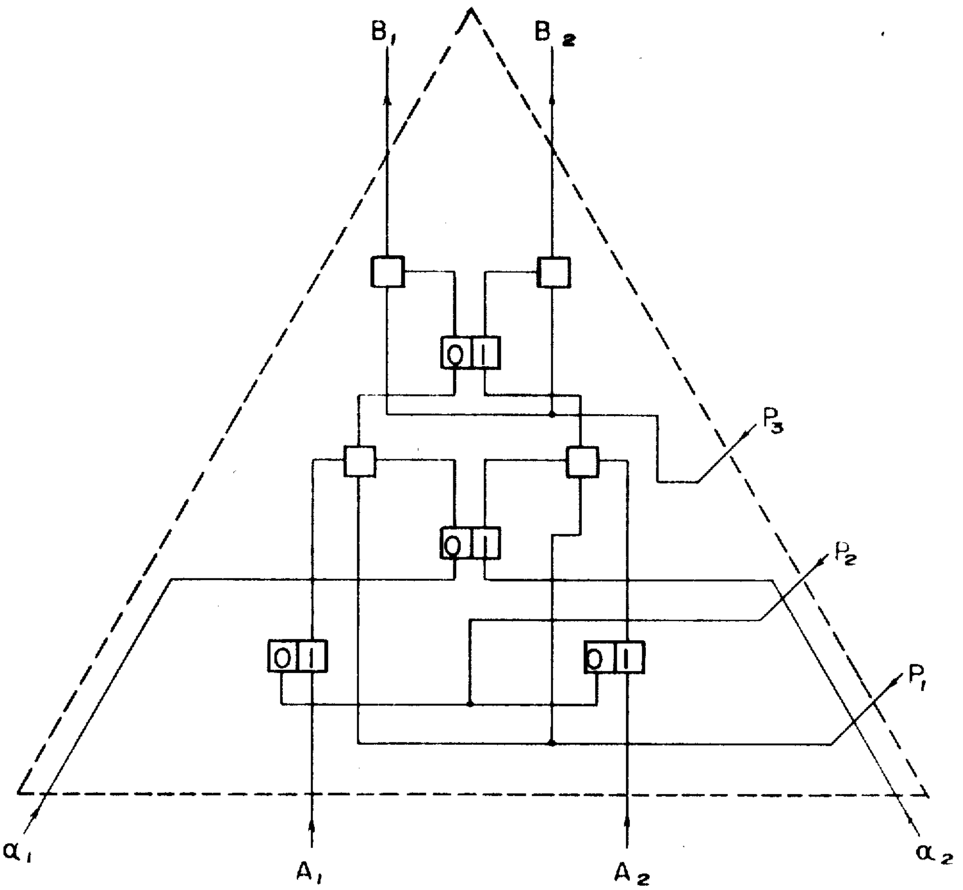
□ TRANSISTOR "AND" CIRCUIT SYMBOL
[0|1] TRANSISTOR FLIP-FLOP CIRCUIT SYMBOL
POWER PULSES
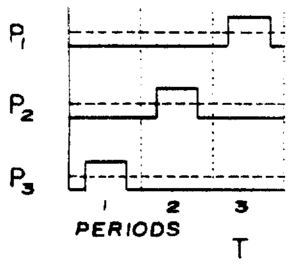
INVENTORS
JAMES H. CASE
NEIL C. STEWART
BY Mallinckrodt and Mallinckrodt
ATTORNEYS INVENTORS
JAMES H. CASE
NEIL C. STEWART
BY Mallinckrodt and Mallinckrodt
ATTORNEYS INVENTORS
JAMES H. CASE
NEIL C. STEWART
BY Mallinckrodt and Mallinckrodt
ATTORNEYS PATENTED AUG 3 1971 3,597,744
SHEET 09 OF 34
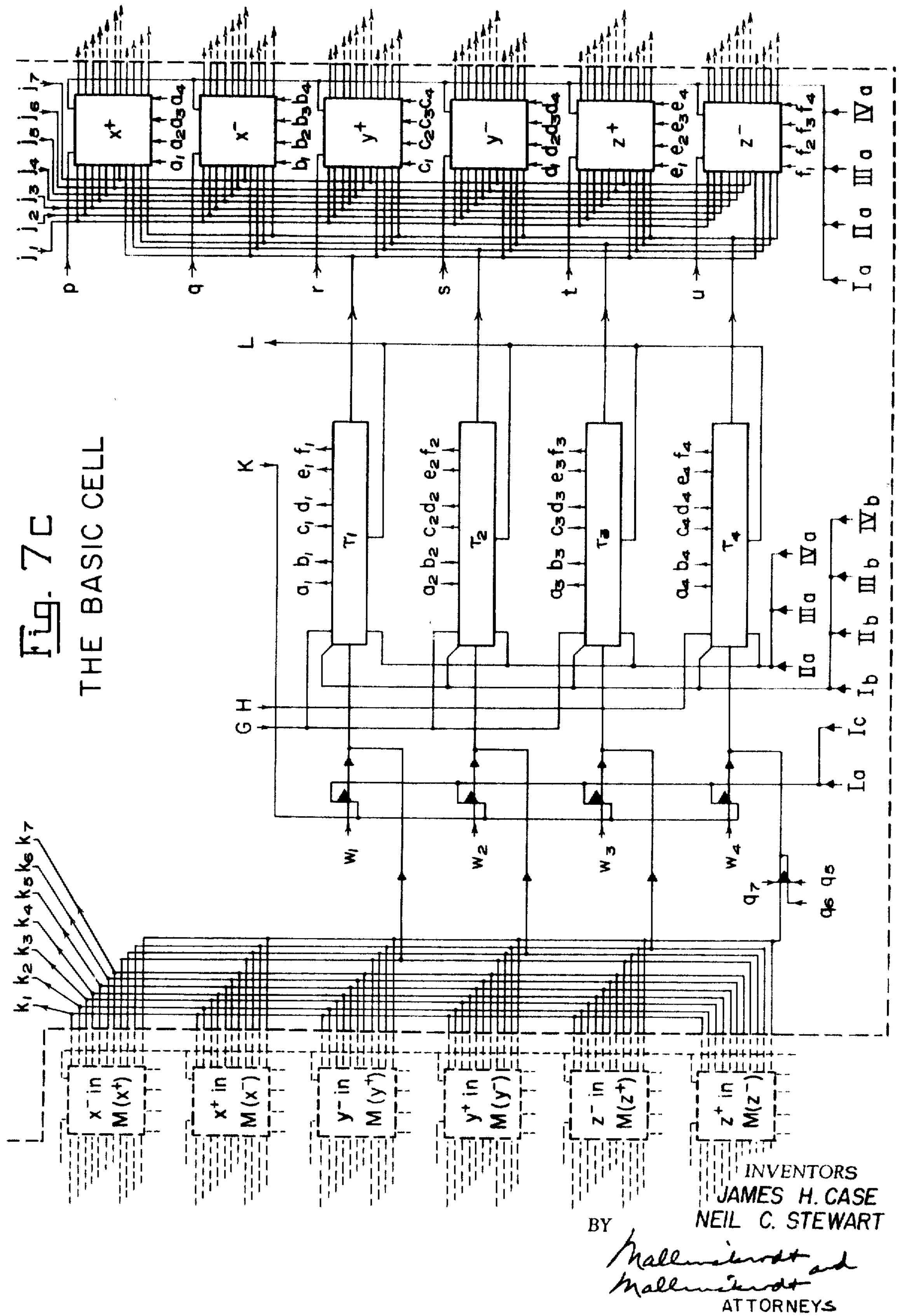
Fig. 7C THE BASIC CELL
INVENTORS
JAMES H. CASE
NEIL C. STEWART
BY Mallinckrodt and Mallinckrodt
ATTORNEYS

THE α - REGISTER

INVENTORS
JAMES H. CASE
NEIL C. STEWART
BY Mallinckrodt and Mallinckrodt
ATTORNEYS

THE Q-REGISTER

INVENTORS
JAMES H. CASE
NEIL C. STEWART
BY
Mallinckrodt and Mallinckrodt
ATTORNEYS

THE σ-REGISTER

INVENTORS
JAMES H. CASE
NEIL C. STEWART
BY Mallinckrodt and Mallinckrodt
ATTORNEYS THE $\bar{Q}$P-REGISTER INVENTORS
JAMES H. CASE
NEIL C. STEWART
BY Mallinckrodt and Mallinckrodt
ATTORNEYS THE $\pi_1$-REGISTER INVENTORS
JAMES H. CASE
NEIL C. STEWART
BY
Mallinckrodt and Mallinckrodt
ATTORNEYS

SUBMODULE OF GATES ON A FACE

INVENTORS
JAMES H. CASE
NEIL C. STEWART
BY Mallinckrodt and Mallinckrodt
ATTORNEYS

THE P-DECODER

INVENTORS
JAMES H. CASE
NEIL C. STEWART
BY
Mallinckrodt and Mallinckrodt
ATTORNEYS Fig. 15 BRANCH ON NEGATIVE SUBMODULE
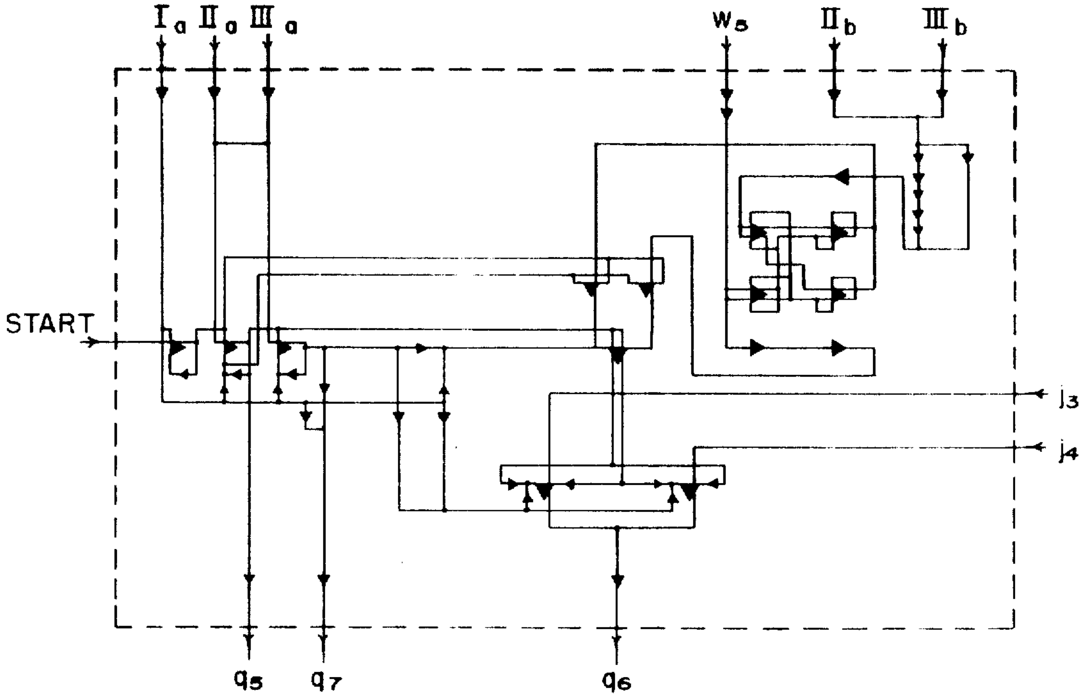
Fig. 16 BRANCH ON ZERO SUBMODULE
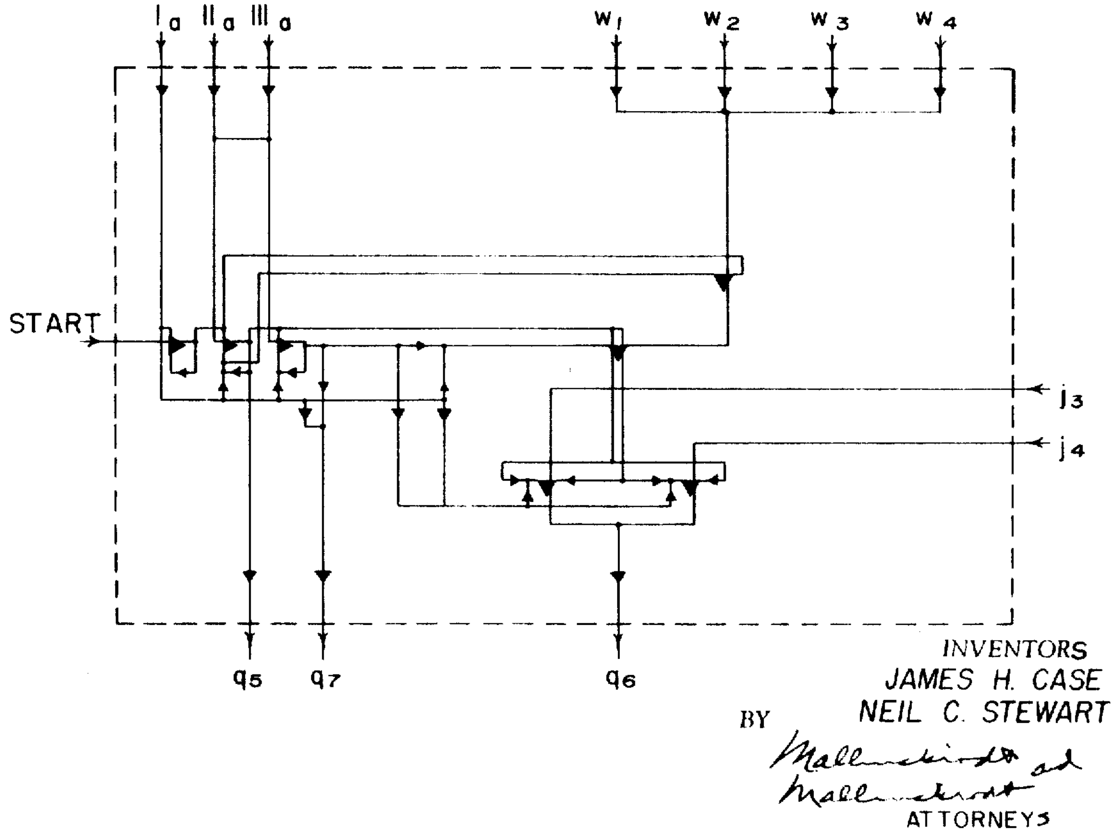
INVENTORS
JAMES H. CASE
NEIL C. STEWART
BY
Mallinckrodt and Mallinckrodt
ATTORNEYS PATENTED AUG 3 1971 3,597,744
SHEET 18 OF 34
FIG. 17 EXTERNAL TAPE CONTROL
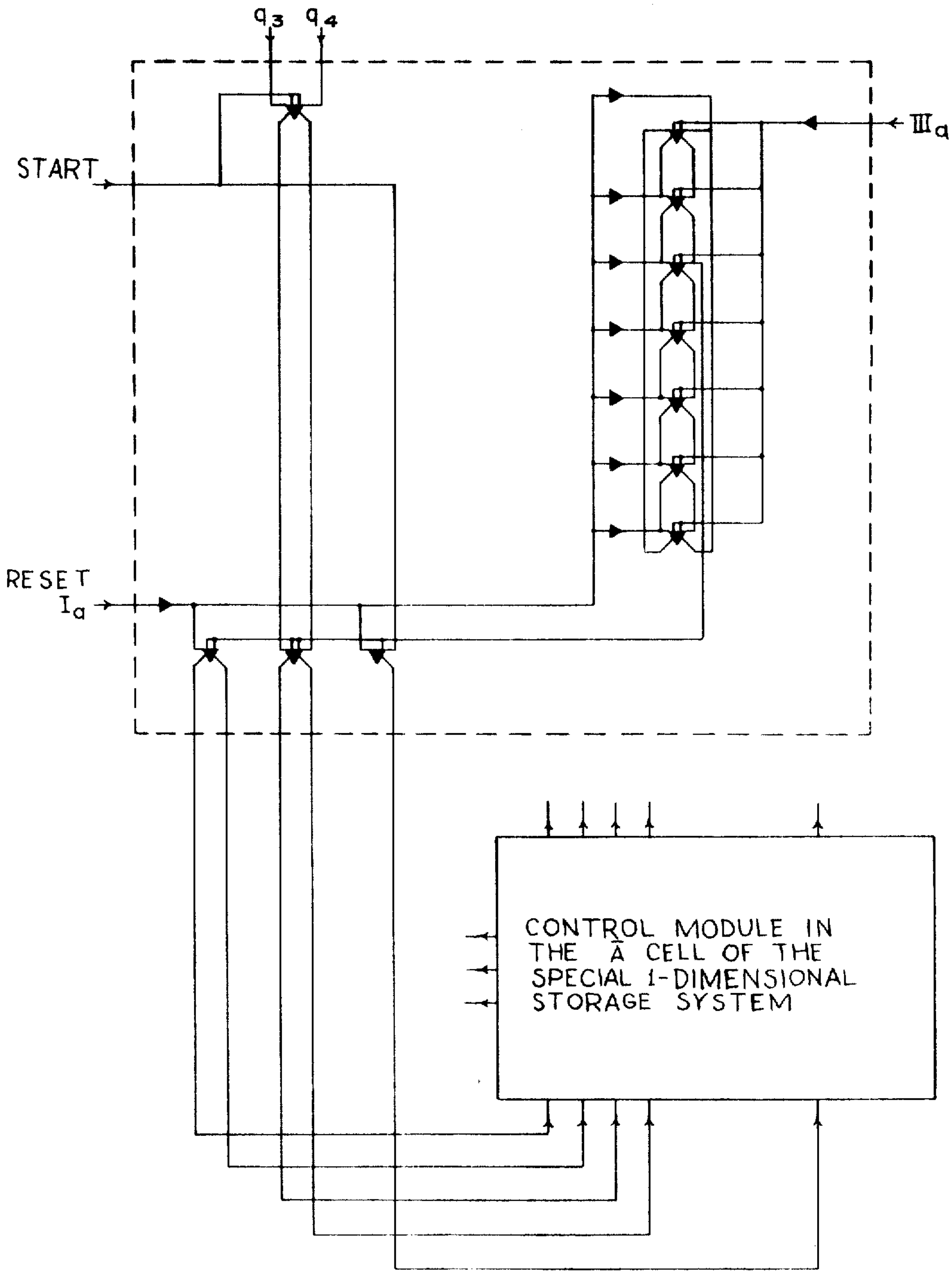
INVENTORS
JAMES H. CASE
NEIL C. STEWART
BY Mallinckrodt and Mallinckrodt
ATTORNEYS INVENTORS
JAMES H. CASE
NEIL C. STEWART
BY Mallinckrodt and Mallinckrodt
ATTORNEYS Fig. 19 CLOCK PULSES — FIRST TIME PERIOD
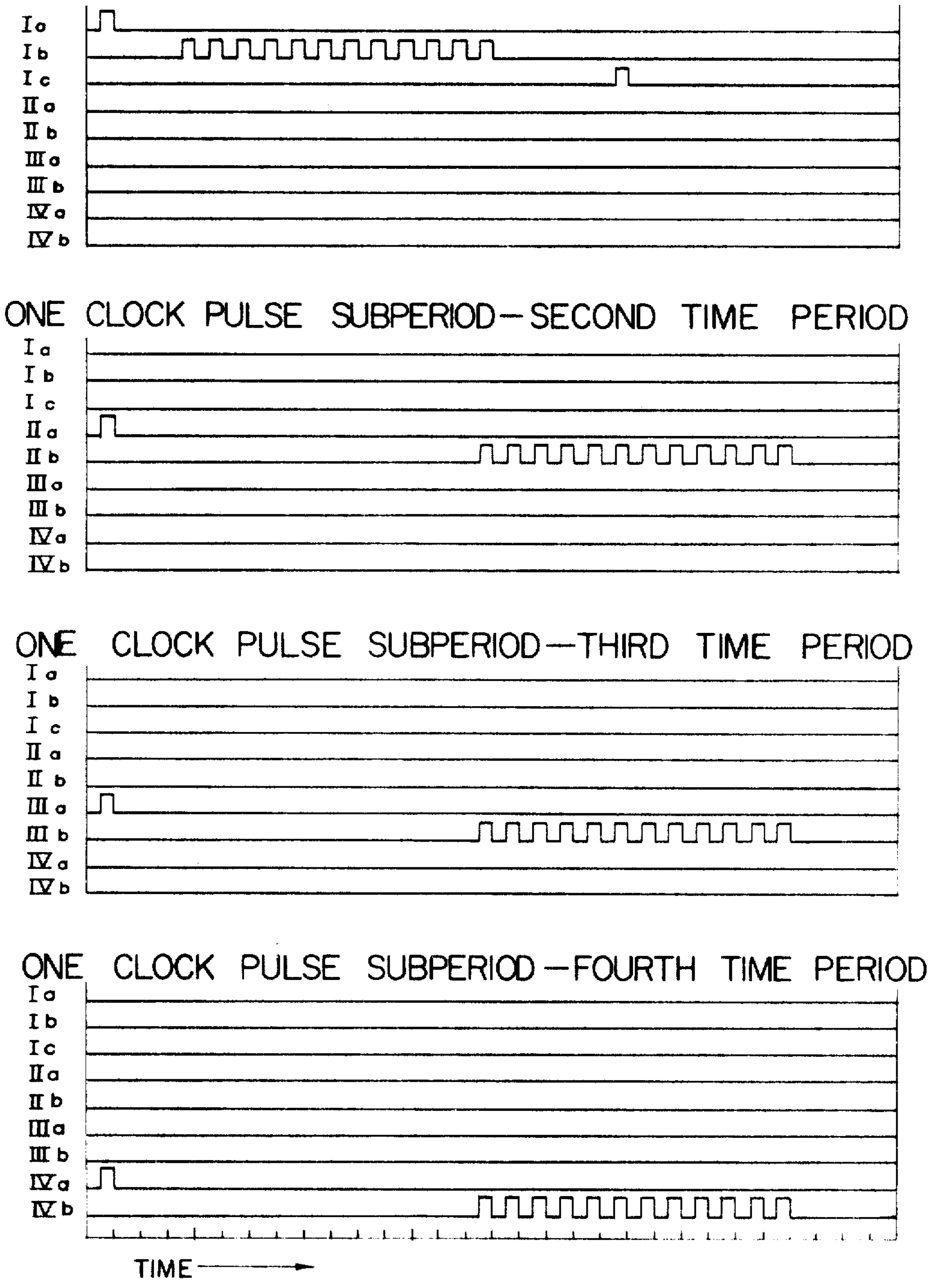
INVENTORS
JAMES H. CASE
NEIL C. STEWART
BY Mallinckrodt & Mallinckrodt
ATTORNEYS FIG. 20d 1-DIMENSIONAL SHORT WIRE STORAGE SYSTEM (NON-ABBREVIATED FORM)
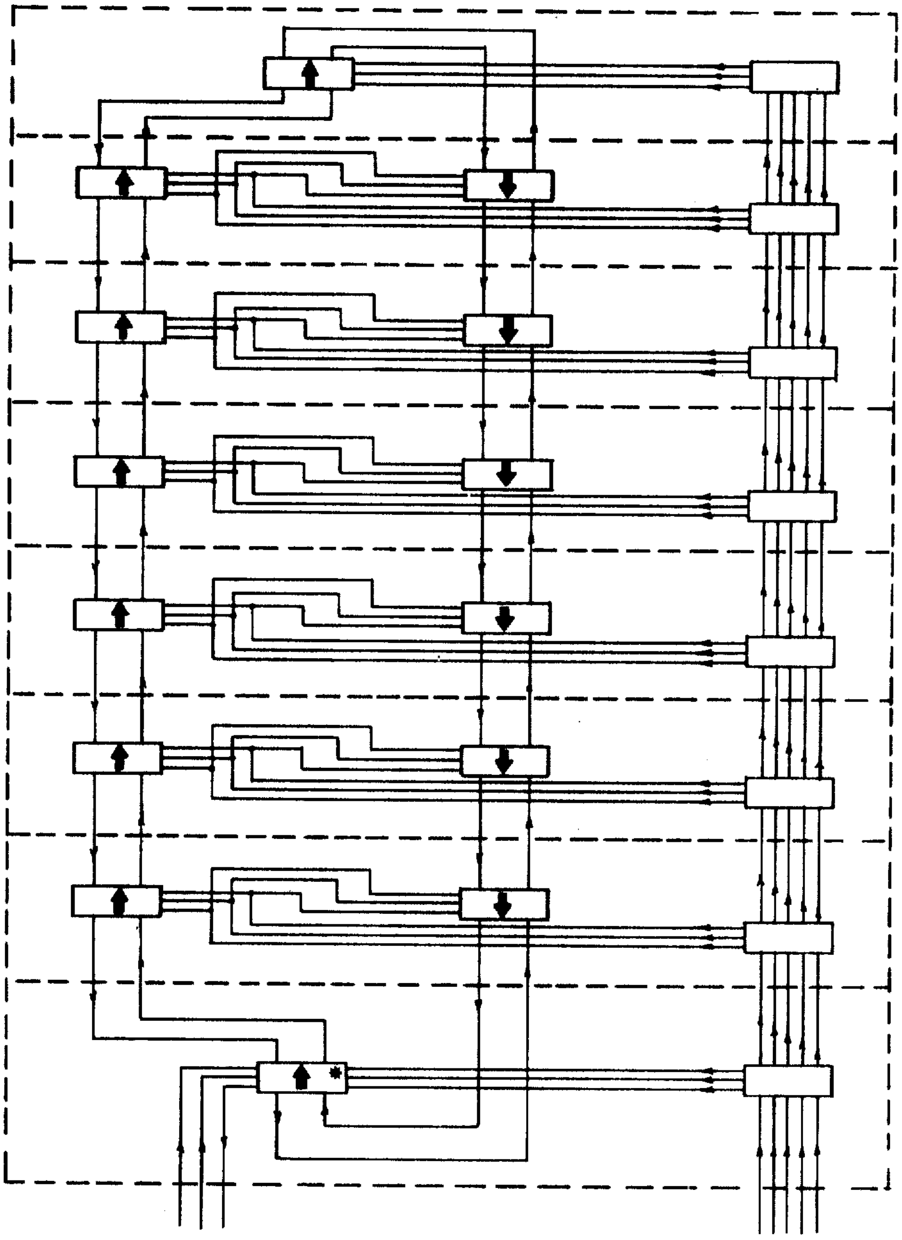
INVENTORS
JAMES H. CASE
NEIL C. STEWART
BY
Mallinckrodt and Mallinckrodt
ATTORNEYS

I-DIMENSIONAL SHORT WIRE STORAGE SYSTEM (ABBREVIATED FORM)

INVENTORS
JAMES H. CASE
NEIL C. STEWART
BY
Mallinckrodt and Mallinckrodt
ATTORNEYS

I-DIMENSIONAL DOUBLE REGISTER SUBMODULE

INVENTORS
JAMES H. CASE
NEIL C. STEWART
BY Mallinckrodt and Mallinckrodt
ATTORNEYS

1-DIMENSIONAL CONTROL SUBMODULE

INVENTORS
JAMES H. CASE
NEIL C. STEWART
BY Mallinckrodt and Mallinckrodt
ATTORNEYS

A 2-DIMENSIONAL SHORT WIRE STORAGE SYSTEM

INVENTORS
JAMES H. CASE
NEIL C. STEWART
BY Mallinckrodt and Mallinckrodt
ATTORNEYS

PATENTED AUG 3 1971 3,597,744

SHEET 26 OF 34

2-DIMENSIONAL DOUBLE REGISTER SUBMODULE

INVENTORS
JAMES H. CASE
NEIL C. STEWART
BY Mallinckrodt and Mallinckrodt
ATTORNEYS

2-DIMENSIONAL CONTROL SUBMODULE

INVENTORS
JAMES H. CASE
NEIL C. STEWART
BY
Mallinckrodt and Mallinckrodt
ATTORNEYS

PATENTED AUG 3 1971 3,597,744

SHEET 28 OF 34

3-DIMENSIONAL DOUBLE REGISTER SUBMODULE

INVENTORS
JAMES H. CASE
NEIL C. STEWART
BY
Mallinckrodt and Mallinckrodt
ATTORNEYS

3-DIMENSIONAL CONTROL SUBMODULE

INVENTORS
JAMES H. CASE
NEIL C. STEWART
BY
Mallinckrodt and Mallinckrodt
ATTORNEYS ATTACHMENT OF THE SPECIAL 1-DIMENSIONAL SHORT WIRE STORAGE SYSTEM TO A 3-DIMENSIONAL SHORT WIRE COMPUTER INVENTORS
JAMES H. CASE
NEIL C. STEWART
BY Mallinckrodt and Mallinckrodt
ATTORNEYS

SPECIAL 1-DIMENSIONAL SHORT WIRE STORAGE SYSTEM

INVENTORS
JAMES H. CASE
BY NEIL C. STEWART
Mallinckrodt and Mallinckrodt
ATTORNEYS SPECIAL DOUBLE REGISTER SUBMODULES $\alpha_i$ INVENTORS
JAMES H. CASE
NEIL C. STEWART
BY Mallinckrodt and Mallinckrodt
ATTORNEYS SPECIAL DOUBLE REGISTER SUBMODULES $\beta_i$ INVENTORS
JAMES H. CASE
NEIL C. STEWART
BY Mallinckrodt and Mallinckrodt
ATTORNEYS SPECIAL DOUBLE REGISTER SUBMODULES $\gamma_i$ INVENTORS
JAMES H. CASE
NEIL C. STEWART
BY Mallinckrodt and Mallinckrodt
ATTORNEYS

DIGITAL COMPUTING AND INFORMATION PROCESSING MACHINE AND SYSTEM

This is a continuation of application Ser. No. 605,757, filed Dec. 29, 1966 now abandoned.

TABLE OF CONTENTS

Abstract of Disclosure

PRIOR ART

| | Col. |
|---|---|
| I. Introduction | |
| 1.1 General | 2 |
| 1.2 Trends in development of computing machines and importance of new problem areas | 2 |
| 1.3 Examples of Problem Areas | 3 |
| 1.4 Practical Aspects of the Universality Concept of computer theory | 4 |
| 1.5 Limitations on sequential computing machines and necessity of parallel operation | 4 |
| 1.6 Problems in design of parallel computing machines | 5 |
| 1.7 Attempts at design of parallel computing machines | 6 |
| 1.8 Other references | 7 |

SUMMARY OF THE INVENTION

| | |
|---|---|
| II. General description and uses | |
| 2.1 General | 7 |
| 2.2 Short wire theory | 8 |
| 2.3 Short wire information processing system | 9 |
| 2.4 The computer array and the cell | 11 |
| 2.5 One-, two-, and three-dimensional storage systems | 12 |
| 2.6 Dimensionality | 13 |
| 2.7 Variations of the cell | 13 |
| 2.8 Feasibility for mass production | 14 |
| 2.9 General short wire computers and information processing systems | 14 |
| 2.10 Summary | 15 |

DESCRIPTION OF THE DRAWINGS

Detailed description of the invention

Figure 1:
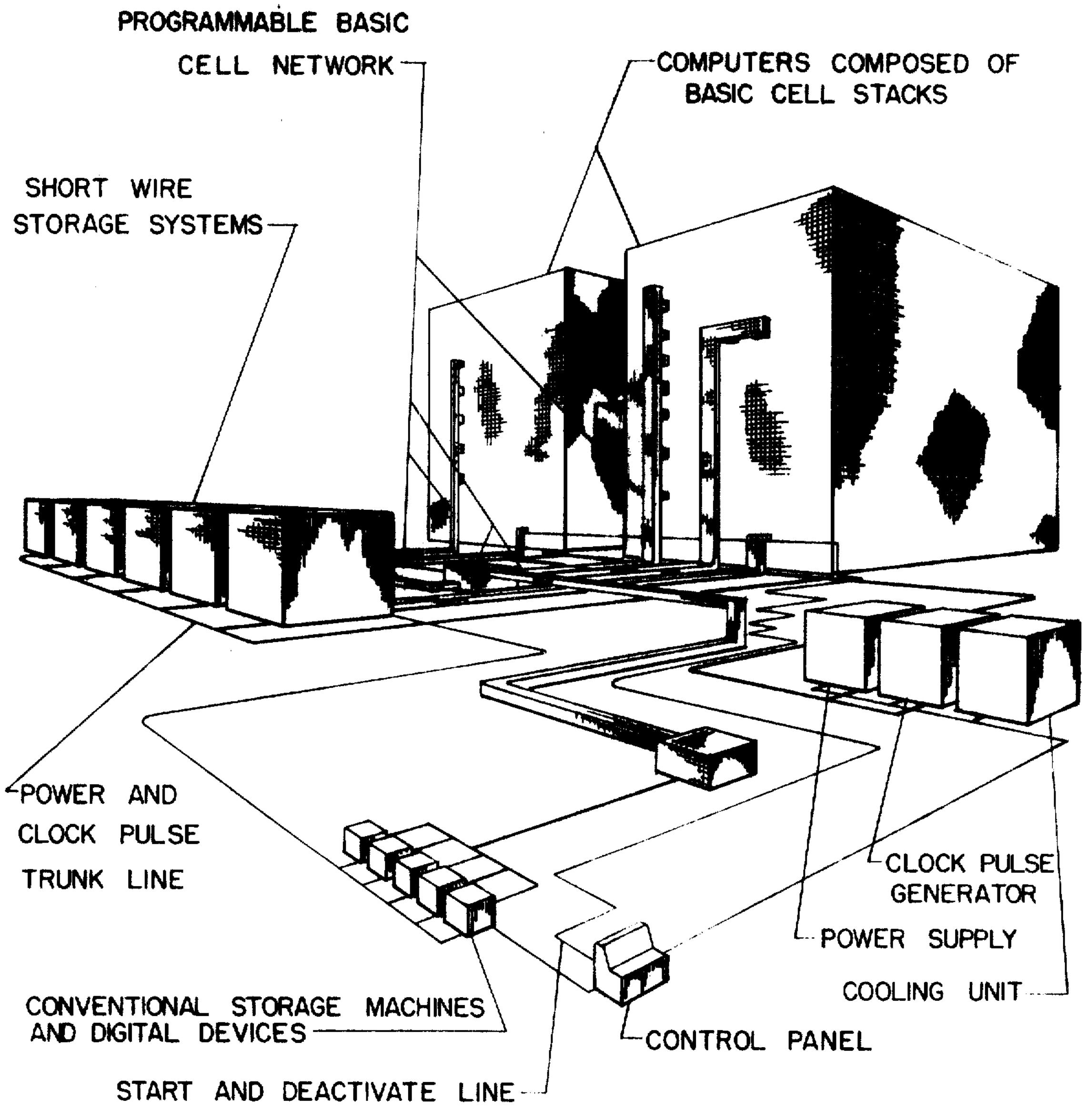

| | |
|---|---|
| III. Standard gate element and methods of realization | |
| 3.1 Principles of operation of standard gate element | 19 |
| 3.2 Magnetic core realisation of standard gate element | 20 |
| 3.3 Other realization of standard gate element | 21 |
| IV. Basic cell of a universal 3-dimensional short wire computer | |
| 4.1 General description | 21 |
| 4.2 Detailed description of main word and switching bit | 22 |
| 4.3 Local addresses | 23 |
| 4.4 Instructions | 23 |
| 4.5 Detailed description of parts of basic cell | 25 |
| 4.6 Description of operation of basic cell in terms of operation of submodules | 29 |
| 4.7 Avoiding interference between command words | 32 |
| V. Short wire storage system | |
| 5.1 The 1-dimensional short wire storage system | 33 |
| 5.2 Abbreviated form of wiring diagram for the 1-dimensional short wire storage system | 34 |
| 5.3 The 2-dimensional short wire storage system | 34 |
| 5.4 The 3-dimesnional short wire storage system | 35 |
| VI. An input-output system for the universal short wire computer | |
| 6.1 Special 1-dimensional short wire storage system | 37 |
| 6.2 Clock pulses for the special 1-dimensional storage system | 37 |

Table—Continued

| | Col. |
|---|---|
| 6.3 Connecting cells $\bar{A}$, $\bar{B}$, and $\bar{C}$ | 37 |
| 6.4 External tape control submodule and the start button in $\bar{A}$ | 37 |
| VII. Programming by means of this input-output sytsem | |
| 7.1 General principles | 38 |
| 7.2 General bootstrap routine | 38 |
| VIII. The general system | |

PRIOR ART

I. INTRODUCTION 1.1 General

In previous years, the field of digital computing machines has been dominated by sequential computers because of their advantages (see Table 1). Great improvements in the computing power of sequential computers have been achieved by increasing their speed of operation while retaining the same basic design functions; thus, new problems could then be solved which were beyond the capabilities of earlier computers (see Sections 1.2, 1.3). Unfortunately, further improvements along this line are basically limited by the laws of physics, since all electrical signals transferring information within the computer are limited by the speed of light. Even now, some computers are nearing this limit. Faster and more complex processors in the sequential computers will lead only to restricted improvements. The only method, therefore, to greatly increase the power of digital computers further is to have many processors operating in parallel. Initial work along this line has produced a modest amount of parallel processing in computers such as the CDC 6600, IBM Stretch, Solomon computer, and many other specialized machines.

The problems of parallel computer design are not simple, however. The above mentioned computers and various theoretical studies not only have shown that the design of parallel digital computers is extremely difficult but these efforts have failed to produce any unified design approaches for parallel computers which can solve the basic problems as listed in Table 4.

1.2 Trends in Development of Computing Machines and Importance of New Problem Areas Digital computing machines have proven very useful for a wide variety of problems such as business, scientific research, process control, visual display, multiprocessing, logical or symbolic processing. Great efforts have constantly been expended by manufacturers to increase the speed of computers in order to more economically perform lengthy calculations. Each large increase in the speed or complexity of the digital computers permitted the solution of new important problems which previously required uneconomical or impossible amounts of computer time. The most powerful computers of today are still unable to solve many vital problems in such areas as plasma physics, elasticity, reaction kinetics, etc. Only costly experiments provide solutions; hence, there are strong incentives to improve greatly the power of digital computers.

Because of their important advantages (Table 1), the majority of digital computers have been sequential. In theory, a sequential computer can execute any program that any other digital computer can; thus, they are useful as general-purpose digital computers. However, in practice, it may take so long that is effectively impossible to solve the problem. Faster computers can thus solve new problems more economically and, in a sense, can manifest a "relative universality" or problem solving ability, which is greater than that of the slower machines even though all can theoretically solve the same problems.

TABLE 1

Advantages of Sequential Computers

1. General problem solving capability.
2. Uniform design principles and relative simplicity of design.

3. Uniformity of operation and programming; hence, feasibility of general program languages such as Fortran, Algol, etc.
4. Relatively rapid operation using new electronic technologies, such as transistors and integrated circuits.
5. Capability of achieving increased speed of operation by use of faster and more compact components.

Digital computers are usually somewhat specialized so as to solve optimally the majority of problems common at the installation of the user. Thus business computers and scientific computers have had different operations optimized by the manufacturer in order to rapidly solve the user's respective class of problems or problem areas. Within a problem area, a digital computer may be general purpose or "relatively universal" if in a reasonable amount of time it can be readily programmed to solve all of the installation's similar problems. The definition of a "reasonable amount of time" will depend on both the type of problem area and its economic importance. A computer is general purpose, or relatively universal for a problem area if any competent programmer can code an example problem in the area and the computer can execute it in a reasonable length of time. There have been three major factors which are mutually interdependent in the development of new digital computers: (1) the development of special computer designs to be general purpose or "relatively universal" for new problem areas; (2) the effort to reduce the cost of running a given program by decreasing the cost per given operation; and (3) the development of more economical methods to lower the costs of construction.

All of these factors also play a role in the development of parallel computers. In order to evaluate a given computer design various criteria can be used (see Table 2).

TABLE 2

Criteria for Evaluating Computers

1. Problem Areas—(a) Feasible or (b) Economic solution of problems in various problem areas.
2. Basic Cost—of functioning or of the entire installation.
3. Program Cost—(a) Develop a program, (b) Execute a program.
4. Program Time—(a) Develop a program, (b) Execute a program.

The two notions of problem areas and whether computers are really general purpose with respect to these problem areas, are very important in computer evaluation and development.

1.3 Examples or Problem Areas

The various problem areas are distinguished by the type of information processing to be done and the magnitude of the problem. These may vary from such large problems as pattern recognition to simple table generation using an algebraic formula. If the problem is represented mathematically, it may be a formula, a one-or two-point ordinary differential equation, a steady state partial differential equation of one, two, or three dimensions, or a time-dependent partial differential equation. A sorting problem or various accounting problems would occur in the business field.

The various problem areas divide into subareas, depending upon the magnitude of data to be considered or on the accuracy necessary for the solution of the mathematical equations.

TABLE 3

Examples of Some Problem Areas

1. Simple accounting and budgeting.
2. Optimized routing or plant layout.
3. Ordinary differential equations with one boundary point.
4. Ordinary differential equations with two boundary points.
5. Steady state partial differential equations, with divisions into elliptic, hyperbolic, or parabolic problems in several dimensions.
6. Time-dependent partial differential equations, as in 5.

7. Pattern recognition, artificial intelligence, neural simulation, and game theory.
8. Process control and control of dynamic systems.
9. Multiple access usage.
10. Digital display and information retrieval.
11. Pure mathematical problems, as in number theory.
12. Weather prediction.

1.4 Practical Aspects of the Universality Concept of Computer Theory

The sequential computers are general-purpose in that they can theoretically perform the same calculations as any other digital computer. The execution time for the sequential computer may be slower and roughly would be equal to the time of the digital computer times the ratio of the times of execution of similar operations of the digital computer to that of the sequential computer.

Nevertheless, there are several very important advantages (see Table 1) of sequential computers which arise mainly because of their theoretical universality. Basically, there are two types of advantages: (a) there is a uniform general design of sequential computers even though specialized instructions may vary among the various computers; (b) the uniform design has led to uniform operation including the general programming languages, such as Algol, and to uniform programming approaches to the coding of various problems.

Since the sequential computers have uniform design and operation features, it has been feasible to improve greatly their performance simply by increasing the speed of functioning of their various elements. The various computers having some parallel processing (C.D.C. 6600 etc.) have a lack of uniform design and operation features, since there is no general theory for such "partly parallel" sequential computers. Hence they do not contribute basic design methods for construction of larger similarly operating machines.

In order to develop a family of parallel computers which can be constantly improved, some basic theory must underlie their design and operation and the basic design of the family must solve the basic problems of parallel computers listed in Table 5.

1.5 Limitations on Sequential Computing Machines and Necessity of Parallel Operation in Computers In spite of their substantial advantages, sequential computers have serious limitations (Table 4), which will preclude further great improvements comparable to those of the past few years. The limitations arise mainly because all electrical signals are limited by the speed of light. Various electrical gating transistors are now operating in the nanosecond range; in this time, light travels only 1 foot. Since signals must travel completely across the sequential computer in each time step, the physical dimensions assume great importance. At the present time, some computers are already operating near these theoretical limits. It is obvious that other methods such as parallel operation must be used to improve greatly the performance of future digital computing machines.

TABLE 4

Basic Limitations of Sequential computers

1. Signal Speeds —Signal speeds in central processing unit and memory limited to speed of light.
2. Problem Areas —Design inappropriate for "parallel" problems and many other "large" problems.
3. Slightly parallel design —Lack of basic design principles for "slightly parallel" sequential computers.

A serious limitation on the use of sequential computers is the fact that many important problems require very lengthy calculations. Some problems, such as partial differential equations, are appropriate to parallel rather than sequential computers. Efforts have been made toward parallel operation in such computers as IBM Stretch and CDC 6600, where a few processors can operate simultaneously. However, these machines do not have general parallel design features which will solve the serious problems of parallel computers as listed in Table 5.

1.6 Problems in the Design of Parallel Computing Machines

There are many serious problems in the design and operation of highly parallel computers (more than 1,000 parallel processors). Previous machines and proposals for parallel computers have failed to solve adequately all the basic problems as outlined in Table 5. The problems can be grouped into four categories. Any practical proposal for parallel computers must solve all of these problems in order to provide any general design features for a family of similarly operating computers which are thus capable of continued improvements and expansion in the number of cells of the digital machine. The first problem is the programmability of the computer. The design and operation of the computer should be general purpose for some new significant problem areas. As defined previously, a competent programmer should be able to write a program for any such problem in the area and have it run in a reasonable time on the computer. The instructions of the cells must be well chosen so that the computer will actually enter and execute the program automatically and record the results on external storage devices.

The second problem concerns the feasibility of constructing a family of computers which have common design and operation features such that the following features are independent of the number of cellular elements in the computer (i.e., the size of the computing array): (a) the cycle time of the computer; (b) the regions where data or instructions are transferred from or to external digital devices; the cellular interconnections, the power and clock pulse supply lines; and (c) the cellular instructions and method of coding problems.

The third basic problem is the means of information transfer among the cells and to the external storage devices. Uniform designs must be selected so that programs can be entered and executed rapidly and independently of any size limitations on the computing array. The coding principles must be uniform so that the programming procedures are independent of the size of the computing array. This is essential in order to prevent obsolescence of the computer, the basic designs, or the programs, which would be developed for various problems.

The fourth problem concerns certain technological problems. In any such complex device errors in operation and construction are bound to occur; thus, means must be used to prevent them from ruining the calculations. Since there are so many electrical gates necessary for large parallel computers, BASIC is necessary to use batch fabricated circuitry techniques such as integrated circuits to make the construction economical; the design principles must be appropriate for such techniques. Any gating devices generate variable amounts of heat which must be removed or the gates will become inoperative. The design must allow for such heat, the methods of removal depending on the specific technology of the realization and not on the size of the array. Noise problems will occur in such systems having so many gates, so the design and operation features must solve these problems independently of array size.

TABLE 5

Basic Problems of Parallel Computers

1. Programmable: (a) write, (b) Enter, (c) Activate, (d) Execute, (e) Stop, (f) Record results of parallel computer programs, (g) Necessary instruction sets of cell, (h) Utility for various problem areas.
2. Expandable: Construct a family of larger and larger computers where all use the same (a) cell cycle time, (b) design, and (c) operation principles.
3. Information transfer: Rapid transfer of data or instructions, as (a) Operands, or (b) Results of cell functioning during the program.
4. Technological: (a) Execute program in spite of random or permanent errors of defective cells. (b) Construct cells and their connections using batch fabrication circuitry. (c) Solve heat, noise and stray signal problems.

The first three basic problems are critical to the design philosophy of parallel computers.

1.7 Attempts at Design of Highly Parallel Computing Machines

Previous to the short wire computers of this invention, there have been many unsuccessful attempts to design parallel computers with uniform design and operation principles which would be independent of the number of processing cells in the array. The variety of the proposals and the magnitudes of the various efforts clearly show that the basic design principles for parallel computers are neither obvious nor simple.

There are a variety of reasons which have prevented these previous attempts from producing uniform design and operation in parallel machines: (a) use of long wires to carry information (the impedance and travel distance greatly slow down signal travel times); (b) inability to arbitrarily expand the size of the computing array without slowing down the basic cycle time; (c) ignorance of the autonomous functioning tendency of highly parallel computers which would prevent the stopping of certain active programs in order to read in a new one (d) use of an overall command structure which necessitates long wires, delayed information travel times, complex programming problems, or weak autonomous functioning of cells; (e) delay in execution of most of the cellular operations till data arrive from any distant part of the computer; (f) lack of automatic entry of programs under the control of the cellular array; (g) lack of universality principles of operation and/or design for either the cells or the array; (h) insufficient means of autonomous information transfer among the cells; (i) lack of general programming principles and procedures which are appropriate to the design principles of the given parallel computer.

Various proposals for parallel computers are listed in Table 6. The letters behind each name indicate the specific parallel computer problems, of those previously listed, which each fails to solve. In the recent book, Advances in Computers—Volume 7, ed. F. L. Alt and M. Rubinoff, Academic Press, New York, 1966, the subject of highly parallel computers is discussed in depth. In view of both the statements presented and those omitted, the basic views are supported which are presented in this patent: specifically, (a) there is no generally useful proposal for the design and functioning of parallel computers, and (b) the various proposals (included in TAble 6) have several serious flaws which preclude their general utility.

TABLE 6

Attempt to Develop Generally Useful Ideas for Parallel Computers

1. Solomon—*a, b, d, e, f, g*
2. Holland—*a, b, c, e, f, g, i*
3. Comfort —same as 2
4. Gonzales—same as 2
5. Squire—same as 2
6. Unger and Illiac III—*a, b, d, f, g, h, i*
7. Multiple Instruction or Function—*a, b, d, g, i*
8. Several abstract studies—were never proposed as actual systems for parallel computers; they usually have—*a, b, c, d, g, i*
9. Distributed Logic Memories—*a, b, c, d, f, g, h, i*

There have been a variety of abstract mathematical studies in the area of highly parallel computers, none of which was seriously proposed to be an actual parallel computer system; consequently, the serious problems associated with parallel computers (see TAble 5) were never seriously attacked. The various studies usually had the same basic difficulties as those listed in Table 6.

OTHER REFERENCES

"Short Wire Theory I, " J. H. Case and N. C. Stewart, A.C.M. Repository, 1966.

*Advances in Computers, Volume* 7, ed. F. L. Alt and M. Rubinoff, Academic Press, 1966.

"Dielectric Properties of Thin Insulating Films of Photoresist Material, " J. T. Pierce and J. P. Pritchard, Jr., *I.E.E.E. Transactions on Component Parts*, Vol. CP–12, Number 1, March 1965.

"Impact of Batch Fabrication on Future Computers—Proceedings of the National Symposium, " *Institute of Electrical and Electronic Engineers*, 1965.

SUMMARY OF THE INVENTION

II. GENERAL DESCRIPTION AND USES 2.1 General

This invention is a type of general purpose digital computer having an array of information processing and transferring cells, with word organization, which operate independently and in parallel. It was developed as a practical realization of ideas produced by the inventors in some basic theoretical studies on parallel computers. The invention has several basic component parts, which are useful by themselves in the field of digital information processing: (1) a parallel computing array of "short wire" type (see Tables 7 and 8); (2) information storage systems of 1-, 2-, or 3-dimensional organization, which are themselves built of special information storing and transferring cells; (3) an addressable memory storage array which is a combination of the simple type 1 cells (having branching and duplicating instructions) wherein many of said cells have attached respectively to them at least one information storage system of type 2; (4) a general information processing system, which is composed of two or more machines of type 1, an optional number of types 2 or 3, connection network of type 1 cells which itself forms an array of type 1, external digital devices attached to special input-output regions in the array, such as: card read-punch machines, magnetic tape or other storage machines, optical read or display devices, printers, multiple access relay terminals, data input devices for process control, etc.

There are certain critical characteristics of such "short wire" systems: (1) use of "short wires"—that is, the information transferring lines between cells connect any given cell in the array to only a few neighboring cells; the connections are related to the means for addressing neighboring cells from the given cell—this influencing region, including the addressed cells, is necessarily small since the word length in a cell is limited; it is called the "region of influence" or "influence area" of the cell; the connecting lines do not connect any cells which are not in each other's influence areas; this is important for batch fabrication procedures, and also it eliminates the high impedance and slower operating times associated with signal lines which traverse most of the diameter across the array; (2) the cells contain information words and instructions, and operate independently in parallel without any overall command organization or overall data transferring means; (3) the array may contain an arbitrarily large number of cells since each cell operates independently and all of the information transferring lines are "short"; (4) external digital devices of most any type may be readily connected to the computing array (see Chapter VIII) in order to increase the computing power and flexiblity; these may be other "short wire" arrays of cells which are interconnected by a network of additional cells; (5) the information processing systems have been shown (see section 2.2) to have important theoretical properties in modelling arbitrary digital information processing systems and in concerning their speed of operation; (6) the general "short wire" computing machines and systems have general programming principles which are uniform no matter what size the array of cells of the arrangement of the subdivisions; they may have information and programs readily entered from external devices through localized input-output regions containing only a few cells (see Chapters VI and VII)—a simple code will automatically enter and load a small program, which will itself automatically enter and load and activate any program into the array; (7) the operation of a program in the computing array (see Table 9, section 2.10) has three major features—cells execute an instruction using only information available within the region of influence; long distance transfer of information occurs only through programming so that cells pass the information to their neighbors in "bucket brigade" fashion till it reaches its destination; cells execute their instructions and then pass on their "activity" to other cells, or themselves, in their influence region, as designated by the instruction word addresses; (8) increases in the computing and processing capabilities of the array may be easily made by the direct addition to various cells of new submodules having these capabilities or by use of the cellular storage systems attached to such cells.

This invention represents an important advance in the field of digital computers and thus opens up new problem areas to economical computer solution. It is not only a vastly more powerful computer, but it also provides basic design and programming principles for a new family of computers of arbitrarily large size. The advantages (Table 9) of the invention are not only remarkable, themselves, but also the entire development is itself an unexpected result in view of the many unsuccessful efforts by others to develop ideas which are generally useful for the design of parallel computers (Table 6).

This invention expands the field of digital computers into new problem areas (see Table 3)—some of the very large problems (5, 6, 7, of Table 3) can be solved readily by the "short wire" computing machine, while they are usually not practically solvable by the present-day digital computers. It solves the basic limitations inherent in sequential computers (Table 4) and provides solution of the basic problems of parallel computer design, construction and operation (Table 5), which all other proposals have failed to do (Table 6). It provides many important advantages for economical construction and operation (Table 9), such as: use of "short wires" only; simplicity and uniformity of design and operation; applicability of batch fabrication techniques (see reference "Impact of Batch Fabrication on Future Computers," *I.E.E.E.*, 1965); simple power and clock supply lines; the feasibility of building a single cell on more than one integrated circuit chip; more powerful instructions may be added to certain cells directly so as to provide more powerful special purpose computers.

As a simple example of the power of the "short wire" system the large present-day sequential computers can calculate the digits of the number $\pi$ to one million places in about one day. A "short wire" computer having one million cells and operating at the same basic cycle time could to it in one minute. Thus, this very long problem has shifted from the realm of near economic unfeasibility to that of easy realization.

Some problems, however, such as calculating prime numbers, tend to be basically sequential in nature and are consequently solved about as well on sequential computers as on short wire computers.

2.2 Short Wire Theory

The work in "Short Wire Theory I," J. H. Case and N. C. Stewart *A.C.M. Repository*, 1966, was performed to find if the basic problems of parallel computers (Table 5) could be solved at all, in order to develop general design and operation principles. The paper dealt with abstract mathematical models, but it showed that the problems could be solved by extreme means. In this patent, machines are described in terms of existing practice which were indicated in an abstract manner in the paper, such as: short wire computer, short wire storage systems of dimensions 1, 2, 3, and various combinations.

In the theoretical paper, it was shown in principle that any information processing machine can be modeled as a short wire cellular information processing system with features as summarized in Tables 7 and 8. Consequently, the short wire computers have a strong universality principle in the modeling of other digital devices. In addition, the simple abstract mathematical models described in the paper (and realized in this patent) were shown to have another strong universality principle in that their speed of calculation of any problem would be equal to that of any other short wire computer of the same size multiplied by the ratio of the effective cycle time of the other computer to that of this short wire computer.

These two universality principles are of extreme practical importance for they mean that the basic design principles given in this patent will provide for a family of parallel computers which are extremely versatile and fast in operation and may be improved in performance by improvements in the basic cell without any changes in the overall design or operation of the computer. This situation contrasts sharply with other proposals for parallel computers which either were for special purpose machines or else did not have any capability of expanding the basic array size without drastic changes in design and/or cycle time.

In the theoretical paper, general programming techniques are presented for the short wire computers. These procedures are independent of the size of the array and help to satisfy the programmability problems of Table 5.

2.3 Short Wire Information Processing System

The short wire computer (Table 8) is an example of a short wire information processing system (Table 7) which also includes the three special variations of the basic elements of this invention—the pure data processing array, the memory arrays of 1-, 2-, or 3-dimensions, and the data transfer system.

TABLE 7

Basic Features of Short Wire Systems

Short Wire Information Processing Systems and Short Wire Computing Machines:

1. An array of word organized cells operating independently and in parallel.
2. Use of short wires to transfer information among the cells.
3. Use of power supply lines providing power to all cells simultaneously or in wave synchrony.
4. Use of clock pulses common to all cells simultaneously or in wave synchrony.
5. Short connections from external digital devices to only a few cells in the array for information transfer to or from the systems.
6. Influence regions of cells do not include all of the cells of the array.
7. Operates at "short wire" speeds, independently of size of array.
8. Arbitrary number of cells in array.
9. Important theoretical universality features for parallel computers.

Short Wire Computing machines:

10. Deactivating means for the computing cells of the array.
11. Start "button" to begin the entry of a self-loading program from external storage devices.

TABLE 8

Components of Short Wire Computers

Three basic types of independent components:

1. Computing cells which operate simultaneously
2. Storage cells which operate simultaneously
3. Internal information transfer means Other components:

4. Relatively small input-output regions having connections to external devices
5. Deactivating means
6. Start "button"
7. Localized influence regions of the cells
8. External storage or input devices
9. Uniform power and clock pulse lines and sources A cellular short wire information processing system consists of a stack of information processing cells together with a power supply unit, a clock pulse generator, a gridwork of bus lines which carry the power and the clock pulses to the cells in the stack, and input-output means connected to one, several or many of the cells in the stack. The stack contains an arbitrary number of cells but only of a fixed number of different designs. That is, all of the cells in the stack are exact copies of one of a fixed set of cells. It may be that there is only one cell in this set as in the universal short wire computer; in the 1-dimensional short wire storage system there are three cells in the set. The clock pulse generator generates cyclic frames of pulses and transmits them through the gridwork of bus lines to the cells. The basic cycle time is the length of the time interval between the start of one frame of clock pulses and the start of the next frame. Each cell is a distinct information processor.

During or at a given time step the given cell can be in any of a certain finite number of configurations called states of the cell. Each cell has certain input and output connecting points. There are short leads connecting the output points of one cell to the input points of certain neighboring cells in a prescribed manner. "Short" means that the length of these leads is independent of the number of cells in the stack. The state of a given cell at a given time step depends only upon the state of the cell itself and the states of the neighboring cells connecting to it by the short connecting leads at the preceding time step. There is is a certain exception to this in that the input to the whole information processing system may occur at the input points of one, several, or many cells in the stack.

In "Short Wire Theory I" it was shown that in principle any type of information processing machine can be modeled as a short wire cellular information processing system. In such models the transfer of information along long wires is represented by a sort of bucket brigade transfer of information. That is, a chain of cells is established such that one cell passes the information to the next cell in the chain during one cycle time. Such information transfer appears at first to be slow. In this machine such information transfer is faster than it would appear due to the phenomena of wave synchrony and short wire speeds inherent to short wire cellular information processing systems. Information can be transferred across the computer very rapidly.

The practical utilization of these phenomena form an important part of this patent. Designate as the influence area of a cell the collection of all cells which have their output points connected to input points of the given cell plus the given cell itself. The state of a cell at a given time step depends only upon the states of the cells in its influence area at the preceding time step. The diameter of any influence area will be bounded by twice the bound on the length of the connecting leads plus three times the diameter of the longest cell. The clock pulse frames emanate out from the clock pulse generator in waves which propagate through the gridwork of bus lines carrying the appropriate signals to the cells. Since the state transition of a given cell from one time step to the next depends only upon the states of the cells in the influence area of the given cell, the waves can be as close together as the diameter of the influence area plus the distance the wave travels in the functioning time of the cell. Therefore, the basic cycle time depends only upon the diameter of the influence area and the functioning time of any one cell not upon the number of cells in the stack. This phenomenon is called "wave synchrony" and the operation speeds so obtained as "short wire speeds." A cellular short wire information processing system operating at short wire speeds can transfer information by means of the bucket brigade method essentially as fast as a conventional computer can transfer information by means of long wires.

The influence areas of all of the cells of the array must be smaller than the entire array. The fact that all wires are shorter than any diameter of the array partially guarantees this.

There are other advantages to the short wire organization other than the wave synchrony and short wire speeds. If the clock pulse generator operates slowly enough so that each wave transverses the stack of cells before the next wave starts through then the short wire cellular information processor is operating in pure synchrony as is the case with most parts of a conventional computer. Even if a cellular short wire computer is designed to operate in pure synchrony there are advantages to the organization. One such advantage is the relative ease with which short connections can be made. Another is the iterative arrangement of the circuits. (Some of the short wire computers are iterative circuit computers but not all iterative circuit computers are short wire computers.) A third advantage and possibly the most important is the realization of very large electronic information processing systems that do not contain large current carrying loops with currents that are to be switching rapidly. The occurrence of such large current carrying loops causes the occurrence of large magnetic fields which are difficult to switch rapidly. In an electronic realization of a short wire cellular information processing system the cells are magnetically shielded from one another by metal plates or films which have small holes or openings in them for transferring information to and from neighbors. In the cryogenic realization the shielding metal plates or films carry electronic current to insure the shielding. A fourth advantage to the short wire organization is simply means to build information processing systems of arbitrary size.

2.4 The Computer Array and the Cell

The major part of the theoretical development was in showing the existence of a universal short wire computer. This theoretical development was done on the hypothesis that machinery which materializes certain states and transitions thereof could be constructed. In this patent such machinery is described in terms of existing practice and further we describe a universal short wire computer in terms of existing practice.

This short wire computer is universal in that it can compute any problem that any other short wire computer can compute in a length of time roughly proportional to the length of time it takes the other computer to do the problem times the ratio of the basic cycle time of the universal short wire computer to the basic cycle time of the other short wire computer. Also, in view of the properties of bucket brigade information transfer at short wire speeds this universal short wire computer is a universal parallel computer. General programming techniques for such computers are given in the paper "Short Wire Theory I."

The universal short wire computer consists of a short wire cellular information system together with a deactivating mechanism. The cells are in the form of rectangular solids but we refer to them as cubes because they can be stacked like cubes. The influence area of a typical cell consists of the cell itself plus its six nearest neighbors—those fully adjacent to its six faces. The stack may be any shape but for purposes of explanation let us assume that it is in the form of a rectangular solid. The number of cells in the stack is arbitrary.

For purposes of programming it would be convenient to have a larger influence area as is shown in the theoretical development in Short Wire Theory I. However the problem of making so many connections is serious. From a practical point of view it is better to make only nearest neighbor connections. The short wire computer incorporates novel means of resolving these problems. According to the basic cycle time of the machine which we call the minor cycle time, the influence area includes only the cell itself plus its six nearest neighbors. However, we also make use of a major cycle time which is 66 times as long as the minimum cycle time. A frame of clock pulses in the major cycle time consists of 66 consecutive frames of pulses in the minor cycle time. According to the major cycle time the influence area consists of a cube of cells 15 on a side with the given cell in the center. The instructions are designed from the point of view of the major cycle time and the programming is done from the point of view of the major cycle time. We designate this procedure "increasing the influence area by indirect addressing."

Although many storage systems may be connected to the computer by connecting them to the input and output points of one, several, or many cells, the programming can be accomplished by means of one linear storage system attached to one cell at the boundary of the stack, plus a start button, and the deactivating mechanism. As mentioned earlier, such a powerful computer may be potentially unprogrammable unless special care is taken in the deign. This is the purpose of the deactivating mechanism. In this computer this serves the function of setting every cell in the computer to a (not necessarily all the same) quiescent state. Each cell stores a binary word of information one bit of which is called the switching bit. If the switching bit is one in a given time step then this cell is in a quiescent state and it prescribes no changes in itself or its neighbors for the next time step. Therefore, if the switching bit in each cell has zero value then the whole computer is in a quiescent state. The deactivating mechanism performs the function of setting all of the switching bits to zero when a certain switch is manually depressed.

In "Short Wire Theory I" the deactivating mechanism on the mathematical modeling was slightly different. In that paper the cells were assumed to have priorities of function one to another and the cell in a certain corner of the array had the highest priority. An erasing program was entered from this special corner and performed the function of setting every cell to a quiescent state. An advantage to the method given here is that the programming of the computer can be carried out automatically by means of a linear storage machine connected to any cell on the boundary of the array.

Since our input-output method given here in the patent differs slightly from that in the paper we give here a bootstrap routine for automatically entering an arbitrary program by means of a linear storage system attached to any one cell at the edge of the stack.

2.5 The 1-, 2-, and 3-Dimensional Storage Systems

Full utilization of the universal short wire computer requires the combined use of high capacity storage machines having cycle times the same as that of the short wire computer. In the theoretical paper a mathematical short wire model of a tape loop machine was developed along with the analogous machine of dimensions 2 and 3. In this patent we describe practical machines which realize the states and transitions thereof as described in our theoretical paper. They are special types of short wire cellular information processing systems We designate them as short wire cellular information storage machines. They are capable of short wire speeds of operation and form natural companions to the universal short wire computer for the purpose of storing programs, storing data lists for calculations, and storing the results of calculations. The universal short wire computer itself could be used as an information storage machine but such use would be rather uneconomical because the cells in the universal short wire computer are much more complicated, and hence probably much more expensive, than the cells in the short wire information storage machines. In addition these short wire information storage machines require no deactivating mechanism.

The 1-dimensional (linear) short wire storage machine is a 1-dimensional short wire cellular information processing system. By 1-dimensional we mean that the stack of cells is in a line and each cell has information carrying connections only to its neighbors in the line. We shall give an intuitive description of the information flow inside the stack of cells. The information is stored like cells in a tape loop. The loop is collapsed into a line of cells. One fold in the tape loop is in one end cell and the other fold in the tape loop is at the other end cell. Inputs and outputs to the system are all accomplished by means of connections to one end cell. The tape is divided into squares each of which holds a block of information. The tape may be moved one square in either direction by an appropriate signal entering the input-output cell. We designate the square in the input-output cell to be the accessible square. The information in this cell may be changed or sensed by machinery attached to this input-output cell. In a movement of the tape by one square in either direction the various parts of the tape do not move in unison. Instead a wave of motion propagates down the line of cells. On one side a small wrinkle in the tape is carried along by the wave and on the other side a small gap in the tape is carried along by the wave. When the wave reaches the opposite end of the line of cells the wrinkle and the gap cancel each other and the move is complete. However, after the wave of motion has left the vicinity of the input-output cell, there is no more transfer of information in this vicinity due to the tape movement under consideration. In our machine it takes four basic cycles for the wave to be out of this vicinity. Also after the wave has left this vicinity any other move by one square in either direction can be initiated. In effect the tape can be shifted at short wire speeds.

If the linear short wire storage machine were operated at low enough speeds it would be functioning somewhat like a conventional storage machine or ring counter. However, the conventional organization is in the form of a single line of storage registers and shift registers with the first connected to the last by long wires. With the usual pulsing arrangements it is not obvious that these can attain short wire speeds of operation.

In the 2-dimensional short wire cellular information storage machine, the intuitive idea is that the information moves like it were on an inner tube folded flat by two folds. Shifts of the inner tube occur in four directions and proceed in a wavelike manner.

In the 3-dimensional short wire cellular information storage machine, the intuitive ideal of he flow of information is like on a 3-dimensional torus. Unfortunately, only a mathematician thinks intuitively of a 3-dimensional torus. Suffice it to say that as an inner tube (a 2-dimensional torus) can by two folds and a little stretching be laid on a planar rectangle so can a 3-dimensional torus by three folds and a little stretching be laid out on a rectangular solid.

2.6 Dimensionality

The dimension of a short wire cellular information processing system is not entirely obvious from the appearance of its stack of cells. The dimension from the point of view of information transfer has to do with the interconnections of cells in a stack. There is one relationship with the appearance of the stack and it is that the dimension of the cellular information processing system cannot exceed the dimension of the stack of cells. For example a linear (1-dimensional) stack of cells cannot form a 3-dimensional cellular information processing system. However, a linear stack could be reformed into a cubical (3-dimensional) stack by folding the linear stack back and forth. The resulting information processing system would still be one dimensional in view of the connections.

For a system to be three dimensional the cells should be capable of transmitting to and receiving information from neighboring cells in a spanning set of three-space directions—such as right, left, up, down, forward, and backward. Similarly, for a system to be two-dimensional the cells should be capable of transmitting information to and receiving information from neighboring cells in a spanning set of two-space directions.

In this patent application only the 3-dimensional version of the universal short wire computer is developed. There is no essential simplification in the explanation of a 2- or1-dimensional such system. Moreover, the 2- and 1-dimensional versions are not universal as was shown in "Short Wire Theory I." However, the cells which are given here are simplifications thereof and could be used to form 2- or 1-dimensional short-wire computers.

In the Case of the short wire cellular information storage machines all three dimensions are given. This is done partly for purposes of exposition and partly since all three are very useful machines.

2.7 Variations of the Cell

The basic cell, as described in this patent, can have several variations made quite readily in its structure. These variations involve no new developments since they are basically additions to the cell. A large short wire storage system of 1-, 2-, or 3-dimensions may be added to any cell through the unused unitary operations. Simple additional addressing circuitry could be incorporated by anyone skilled in the art of digital computers.

Similarly, additional arithmetic operations could be added by standard state of the art procedures to perform such operations as floating point arithmetic including addition, subtraction, multiplication, and conversion to fixed point representation.

There are probably several ways in which the function of any particular part of the cell could be achieved using standard variations of electronic circuits; the only features of importance in the cell are the ways in which the various parts interact to produce short wire functioning within a short wire cellular array.

2.8 Feasibility for Mass Production

The cells of the short wire computer could be constructed in a variety of fashions depending on the particular technology used and the availability of batch circuitry such as integrated circuits. Since the connections of the cells extend only to nearest neighbor cells, there is the possibility of forming a number of cells at once on a planar substrate. Connections among layers would be direct with no necessity of connecting information transfer lines across several planes. The planes can be readily separated from each other in multiple layer technologies such as that of cryotrons. An electrical insulating layer may be made with the techniques as reported in "Dielectric Properties of Thin Insulating Films of Photoresist Material," J. T. Pierce and J. P. Pritchard, Jr., *I.E.E.E. Transactions on Component Parts*, Vol. CP-12, Number 1, March 1965.

The power and clock pulse buslines can connect from the edge of the array across planes or between them. Similarly, cooling means could be placed naturally between planes, such as using superconducting lead layers between the active planes; or tubes could go through the planes between cells and their interconnecting wires.

The problems of noise and random defects can be handled in a variety of ways again depending on the chosen technology. Some useful procedures would be redundant circuitry within the standard gate elements and redundant use of the gates. In addition various error correcting codes could be used in the logical design of the parts. The use of redundant programming and error detecting procedures could supplement actual circuit means.

The problems of Table 5, part 4, lend themselves to natural solution in view of the arrangement of the cells into planes with nearest neighbor connections only.

2.9 General Short Wire Computing and Information Processing Systems

The short wire storage systems solve the problem of providing fast enough means for information transfer into and out of the universal short wire computer. Any of these storage systems can be connected to any cell in the stack of the universal short wire computer.

In making such connections a delay problem arises if the number of short wire storage systems to be connected to the short wire computer is large enough so that not all of the storage systems can be placed adjacent to the short wire computer. Such a problem, apparently introduces long wires again. One means is given for solving this problem by connecting the stock of the short wire computer to a given storage system at a distance by a line of general computing cells as in the stack of the short wire computer. Such lines of cells can have a cross section of more than one cell for purposes of making the line have a higher information carrying capacity; also, such lines may branch. The information flow in such lines is programmed as in the short wire computer. Moreover, such lines are simply extensions of the stack of the short wire computer. Such a system of branching lines of cells has general utility as a programmable system, of information transfer.

Hence, the general computing and information processing system is in three parts, processing, storage, and transfer; each of which has ability by itself.

In the general computing and information processing system, information is transferred to and from other more conventional information storage machines by means of the short wire information storage machine. The short wire storage machines are so designed that they can exchange information with other storage machines which have slower basic cycle times.

2.10 Summary

The basic sequence of operation in the short wire computer is given in Table 9. A summary of various important features and advantages is provided in Table 10.

TABLE 9

Basic Elements of Operation of Short Wire Computers

1. Activate the power supply and the "accept" inputs from external storage.
2. Enter the computer program in an inactive state by "-bootstrap" or loader routines.
3. Activate the program by "branching" operations which spread over the computing array.
4. Cells execute their instructions using only data within their influence regions.
5. Information is transmitted outside of influence regions by "bucket brigade" means.
6. Information transmitted to/from external storage devices by programs similar to loader routines.
7. Computer deactivated uniformly over large regions.
8. Ready for new program.

TABLE 10

Features and Advantages of Short Wire Computers

1. Expands computer technology into new problem areas and provides general prôgramming capability.
2. Provides general methods of programming independent of size or speed of computer with programming vastly facilitated by overlapping influence areas.
3. Attains short wire speeds independent of number of cells in array.
4. Expandable to arbitrary size without change of design, operation, programming or cell speeds.
5. Makes efficient use of "batch circuit" techniques for single cells and interconnections.
6. Each of three major elements (Table 8) is useful as separate system or in conjunction with other systems — computing array, memory array, data transfer array.
7. The memory systems can be arbitrarily large and yet operate at short wire speeds.
8. Optimizable for special problem areas by adding extra operations to some of the basic cells.
9. One or a few localized input-output regions.
10. Cells may operate in a general synchronous, partly synchronous, or asynchronous fashion.
11. Long distance information transfers in short wire computer by short connections only—"bucket brigade".
12. Provides two universality principles—modeling of arbitrary information processing systems, and speed relative to other parallel computers.

Due to their generality and speed, these universal short wire computers have a multitude of uses. The universal short wire computer is most useful for computing problems that have natural divisions into large numbers of subproblems that can be solved simultaneously (in parallel). The computation of the decimal expansion of $\pi$ is a fairly good example for comparison purposes because it is basically a sequential problem. Mathematically $\pi$ is given as a single series expansion in terms of fractions. However, each fraction requires its own series expansion. Therefore from the computational point of view it is a double or 2-dimensional series expansion. Similarly, a double series expansion of fractions such as the expansion of Euler's constant amounts to a 3-dimensional series expansion on the computer. Such an expansion would fully utilize the power of the universal short wire computer. Expanding a triple series of fractions could not be accomplished very quickly even on our universal short wire computer because it is a 4-dimensional computation problem. It can be done but the fourth dimensional part is absorbed by time in computing the problem in parts sequentially.

The typical time dependent, 3-dimensional partial differential equations problems such as occur in thermodynamics, elasticity, magnetoelectrodynamics, and weather prediction are basically 4-dimensional computation problems. These can be computed about as easily as the sequential computers can compute 1-dimensional problems. The typical time dependent, 3-dimensional partial differential equations problems mentioned above overtax the capabilities of sequential machines.

Our universal short wire computer can also be used beneficially in the computation of complicated 1-dimensional problems which are now solved by computers which are mostly sequential. One such problem is the computation of the trajectory of a rocket or satellite. Although such problems are basically 1-dimensional and are solved by an iterative procedure each step in the iteration involves of the order of 100 parts which could be computed in parallel if the computer had the capability. Therefore, our universal short wire computer operating at the sample cycle rate at the mostly sequential machine could compute these problems approximately 100 times as fast as the mostly sequential computers.

Other uses are: real time control of any kind of machinery or system, cryptography, simulation of biological systems, a general information exchange such as a telephone exchange, control of visual displays, a pattern recognizer, a fingerprint classifier and identifier.

Our short wire information storage machines could be used for storing any kind of information. Such applications are: as a sound recording machine, as a video recording machine, as a store for books, as a store for still pictures, as a store for computer programs.

DESCRIPTION OF THE DRAWINGS

FIG. 1 is a perspective, schematic diagram of the general computing and information processing system. It is appropriate to give this schematic drawing in perspective to illustrate the 3-dimensional stacking features of the computing (information processing and transferring) cells and the storage (storage and transferring) cells disclosed herein. The crosshatched blocks, lines, rows, and columns in the drawing indicate stacks of either computing cells or storage cells. The two largest stacks are composed of the computing cells and constitute programmable general purpose parallel computers. The stacks labeled short wire storage systems are composed of stacks of the storage cells described herein. The general programmable network is composed of stacks of the computing cells. These stacks are made in any convenient manner. A communication line composed of such cells is made several cells thick in order to have more information carrying capacity. Also, an information interchange of cells is formed by a stack of the computing cells of a size appropriate to the complexity of the interchange problem. In forming such stacks the rules that have to be observed are: (1) the cells all have the same orientation; (2) the power and clock pulse lines have to be attached to the cells in a somewhat regular manner so that the waves of power and clock pulses sweep through the entire system without mutual interference. There is no inherent limit to the size of the system thus obtained, other than the capacity of the power supply and buslines.

Figure 2A:
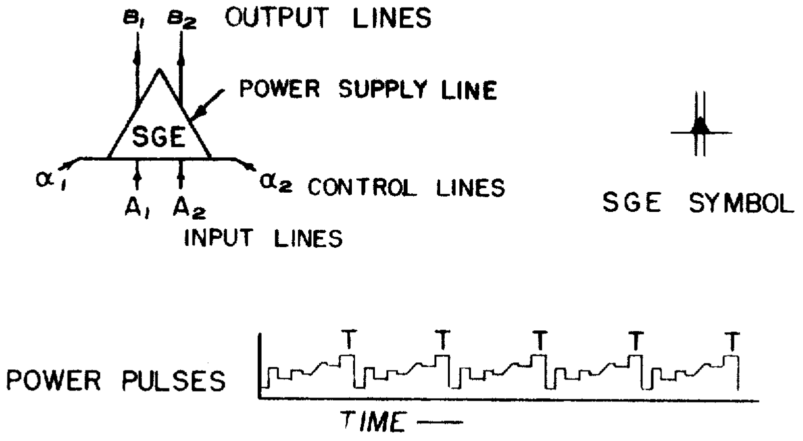

FIG. 2*a* includes block diagram symbols for the standard gate element and a graphic description of the transmission pulse T.

Figure 2B:
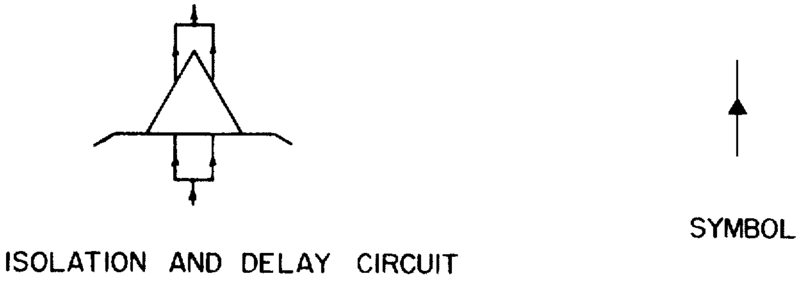

FIG. 2*b* shows the circuit and the block diagram symbols for a simple combination of a delay and isolation circuit in terms of a single standard gate element.

Figure 2C:
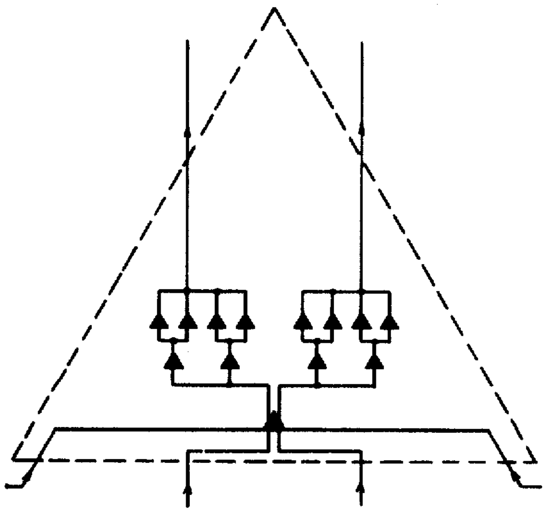

FIG. 2*c* shows how to make a new standard gate element with increased fanout from a given standard gate element.

FIG. 3 is a schematic diagram of a standard gate element made out of magnetic cores and signal transmission wires. This drawing also includes a graphic display of the pulsing for this standard gate element and the branching of the information carrying lines.

FIG. 4 is a schematic diagram of a standard gate element made out of electromechanical relays.

FIG. 5 is a schematic diagram of a standard gate element made out of crossed-film cryotrons.

FIG. 6 is a schematic diagram of a standard gate element made out of transistors.

Figures 7, 7D:
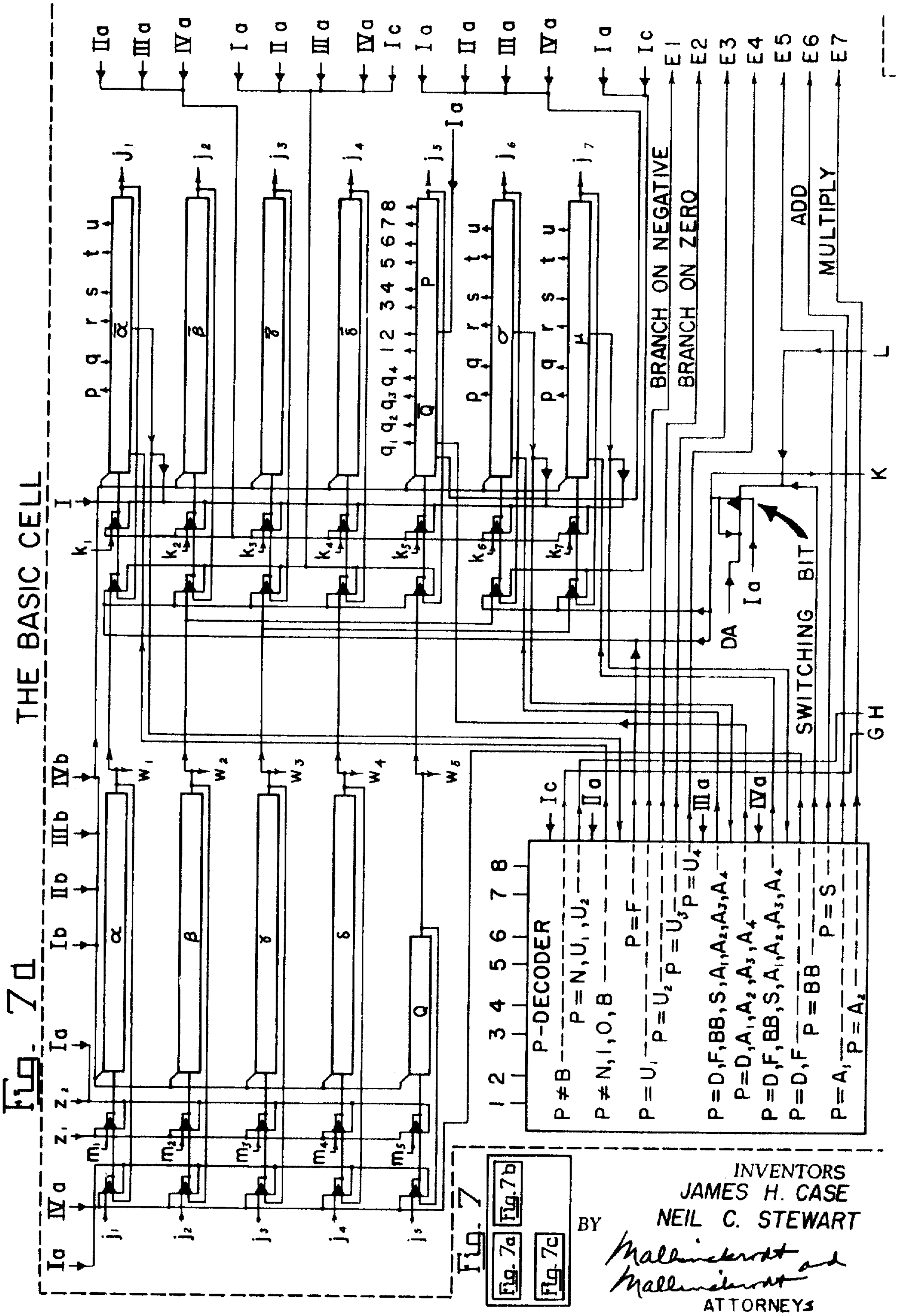
Figure 7B:
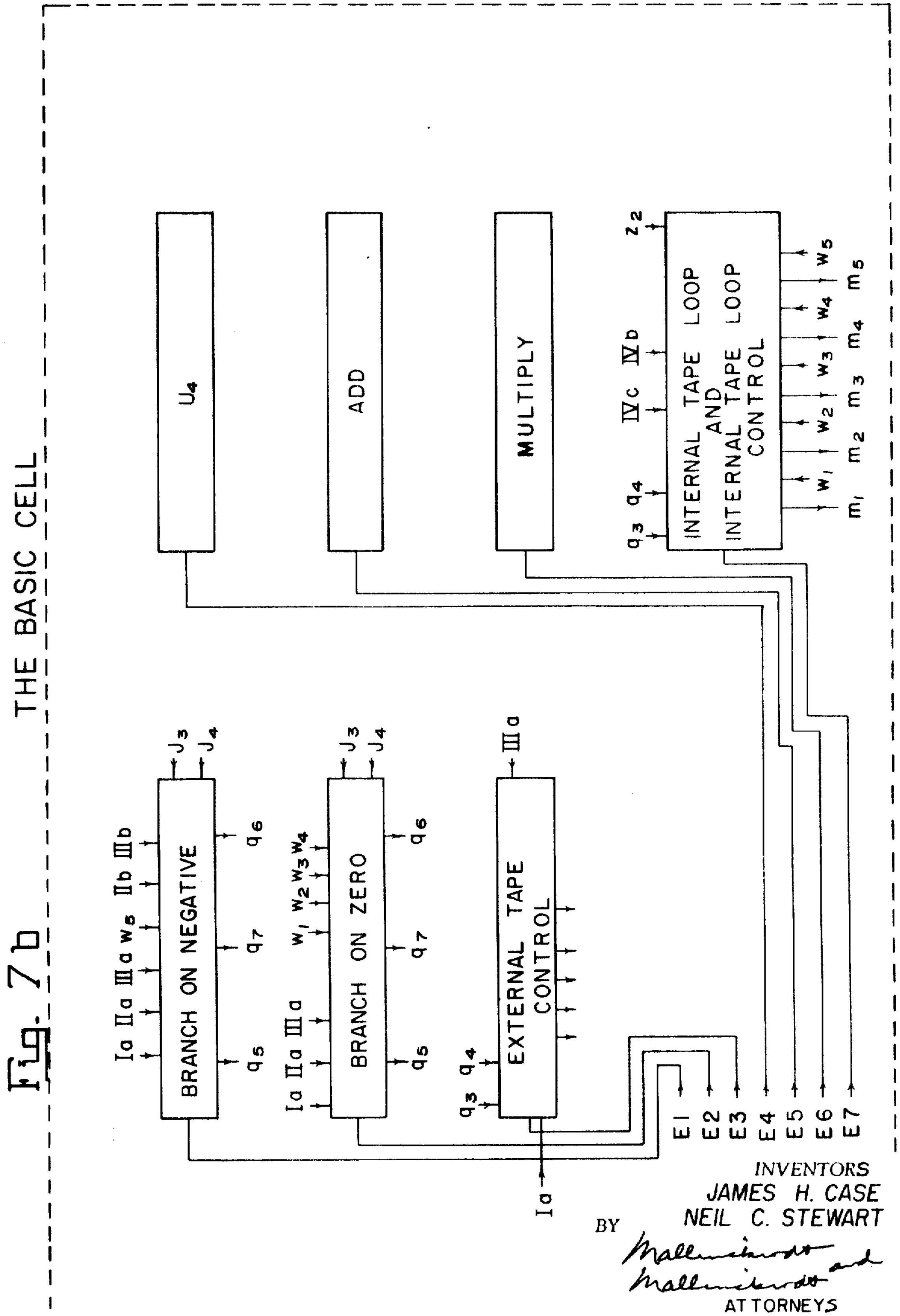

FIG. 7 is a block diagram indicating the correlation of FIGS. 7*a*, 7*b*, and 7*c*.

FIG. 7*a* is a schematic diagram of the central processing part of the basic cell.

FIG. 7*b* is a schematic diagram of extra parts that are added to the basic cell for purposes of economy, ease in programming, and ease in the attaching of input and output mechanisms.

FIG. 7*c* is a schematic diagram of that part of the basic cell that controls the exchange of signals between this cell and its neighboring cells.

Figure 8:
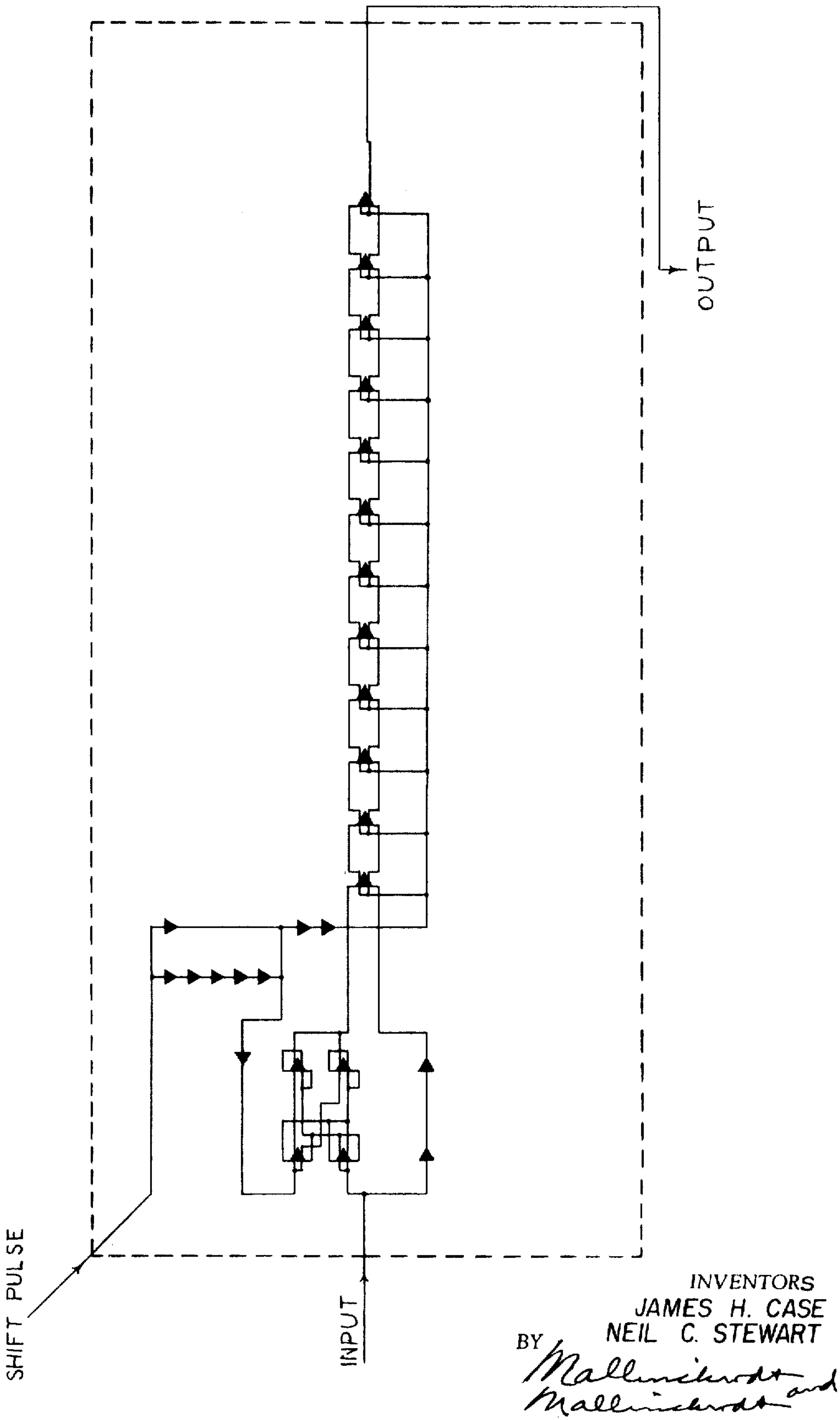

FIG. 8 is a schematic diagram of the $\alpha$-register. The submodules $\alpha$, $\beta$, $\gamma$, $\delta$, $\bar{\beta}$, $\bar{\gamma}$, and $\bar{\delta}$ of the basic cell are exactly alike and have this design. These registers are 12-bit shift registers of a special design which require 12 shift pulses to shift from one to another and use two gates between shift registers in a typical circuit.

Figure 9:
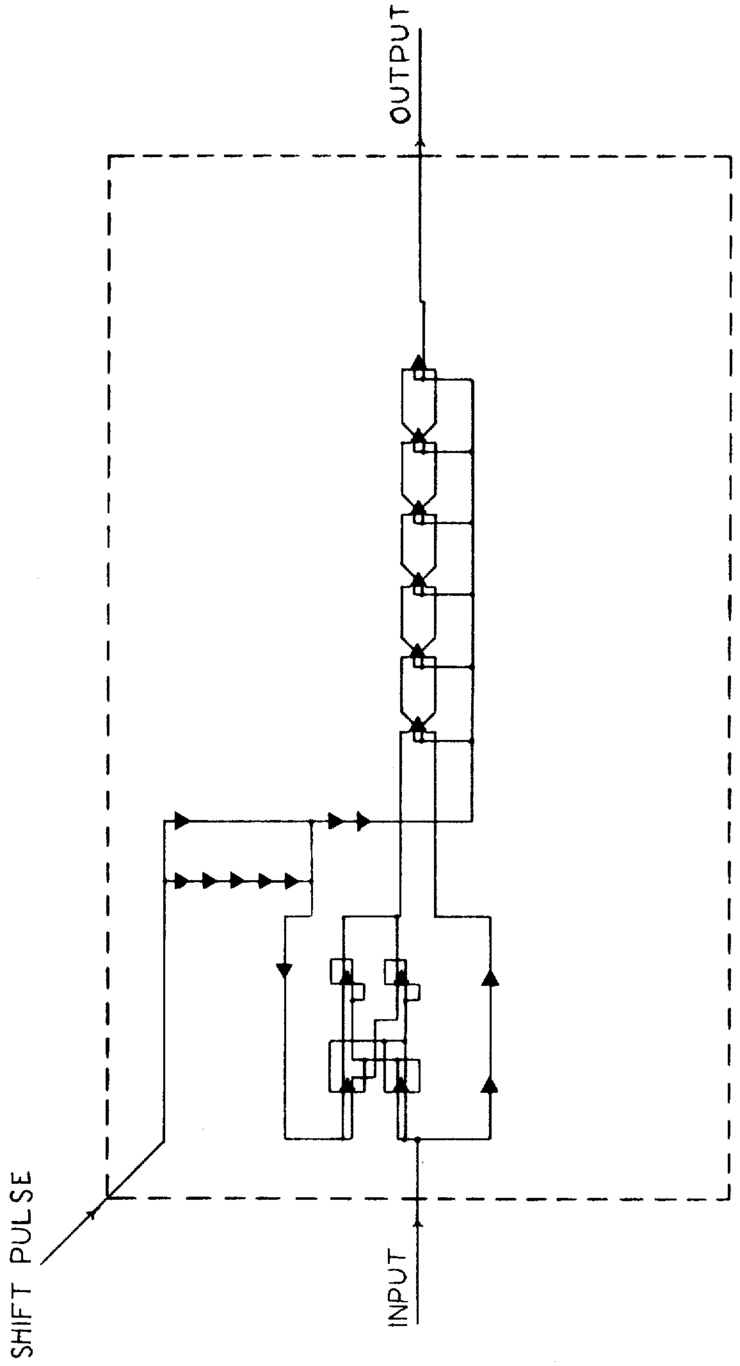

FIG. 9 is a schematic diagram of the Q-register of the basic computing cell. It is a 6-bit shift register of a special design and is designed for circuits in which there are two gates between shift registers.

Figure 10:
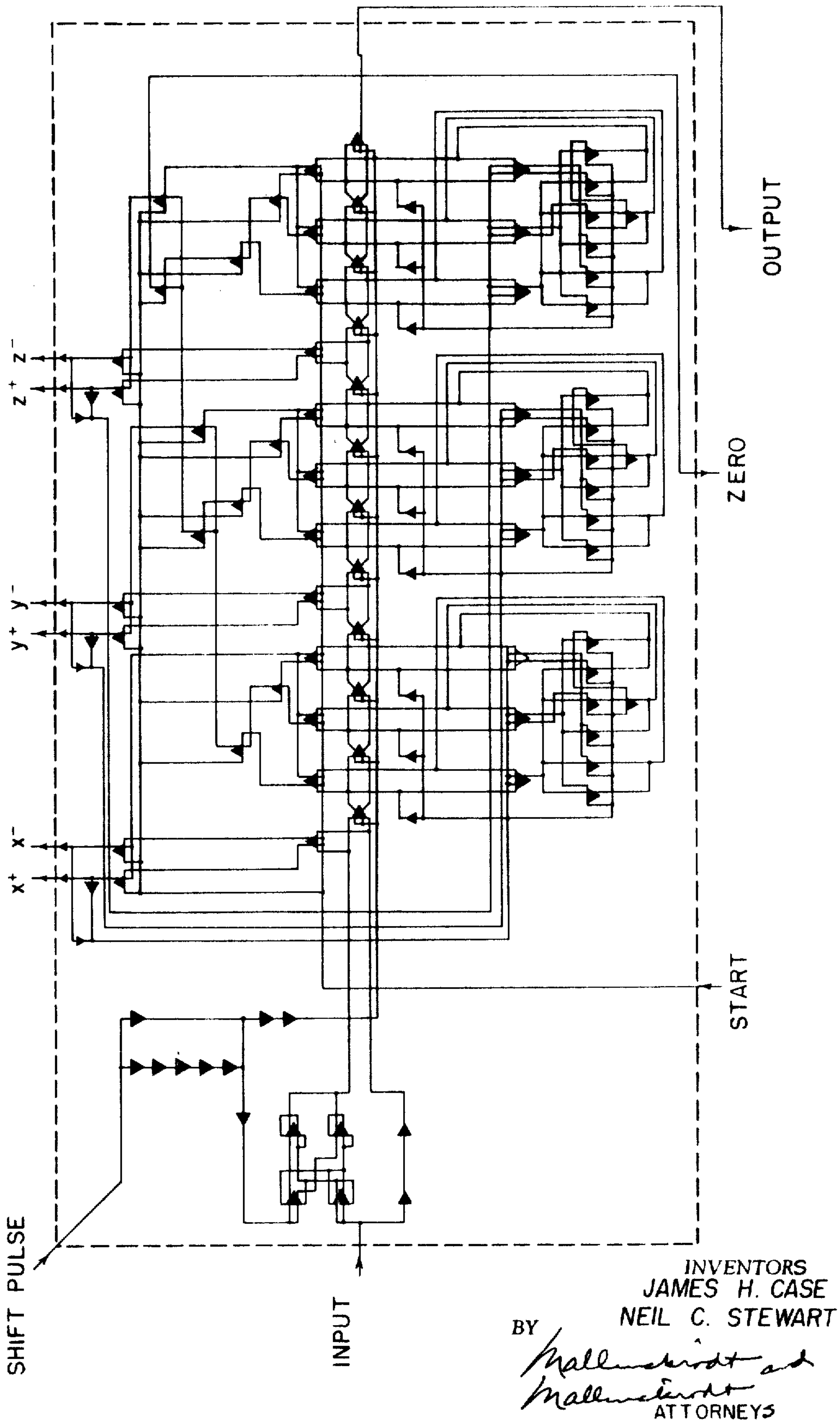

FIG. 10 is a schematic diagram of the $\sigma$-register. The submodules $\bar{\alpha}$, $\sigma$, and $\mu$ of the basic computing cell are all like this. Under certain settings this operates like the $\alpha$-register. Under other settings it performs logical operations on the information stored in it and has various outputs.

Figure 11:
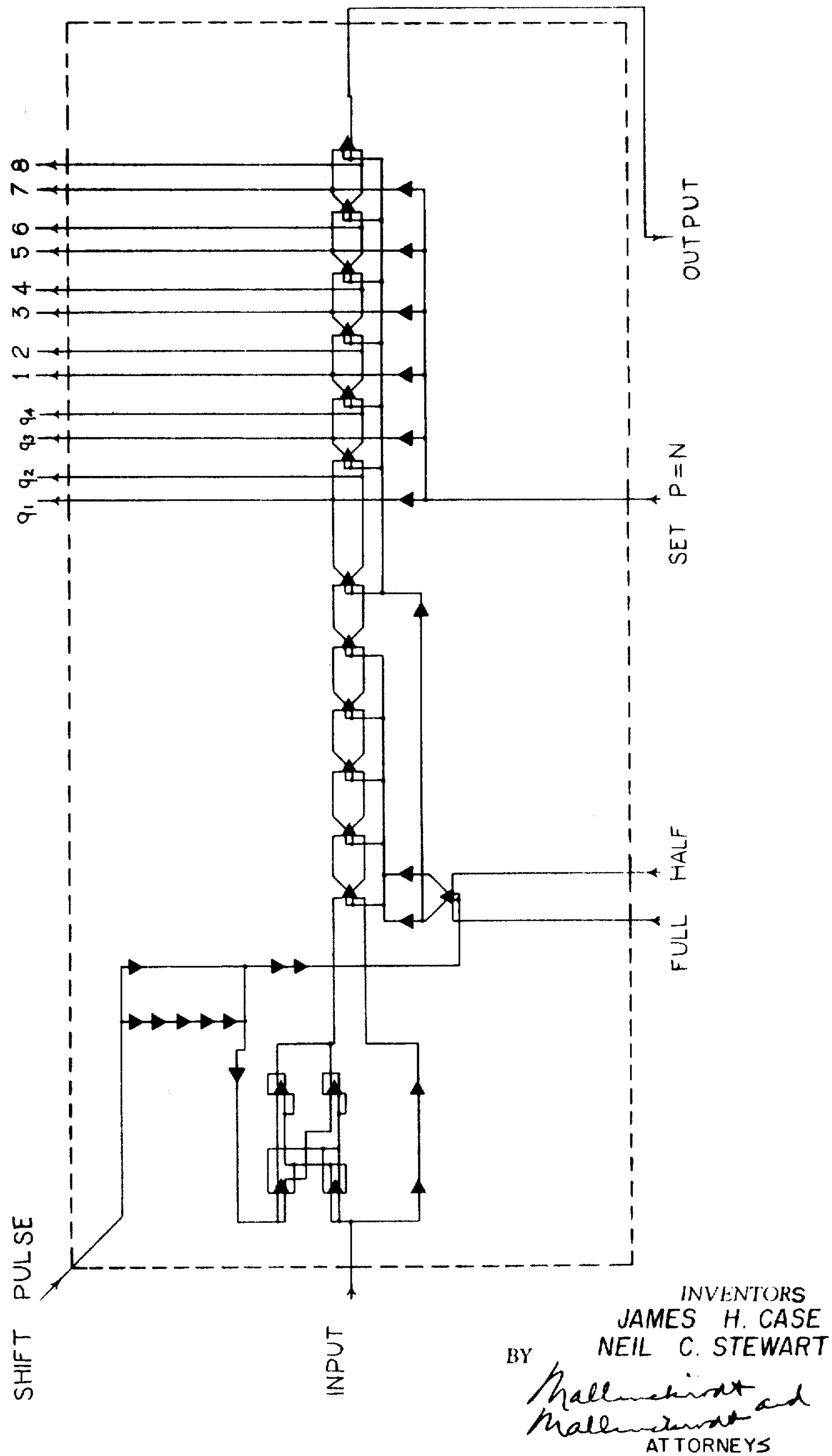

FIG. 11 is a schematic diagram of the $\bar{Q}$P-register of the basic computing cell.

Figure 12:
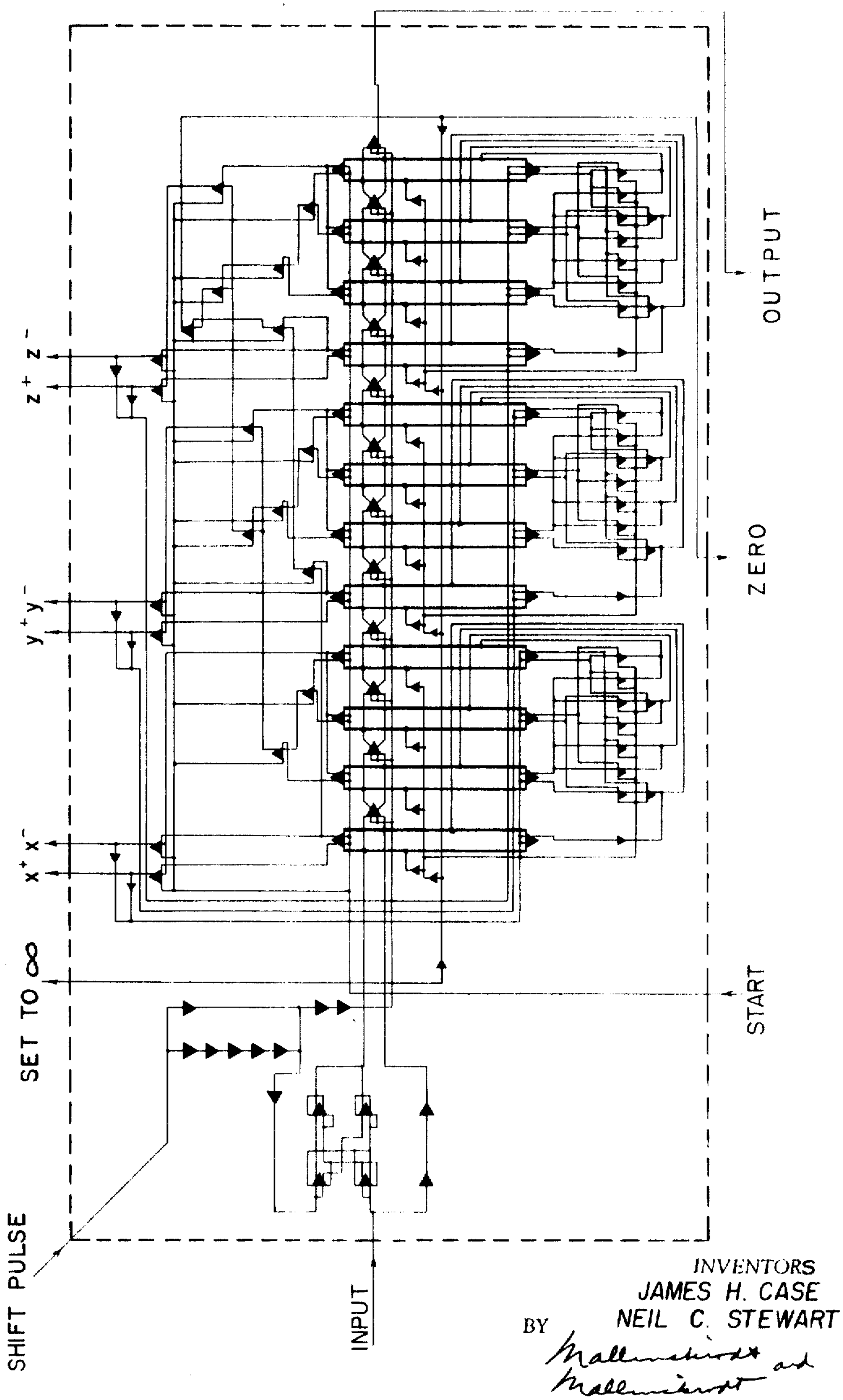

FIG. 12 is a schematic diagram of the $\tau_i$-register. The submodules $\tau_1$, $\tau_2$, $\tau_3$, and $\tau_4$ of the basic cell all have this design.

Figure 13:
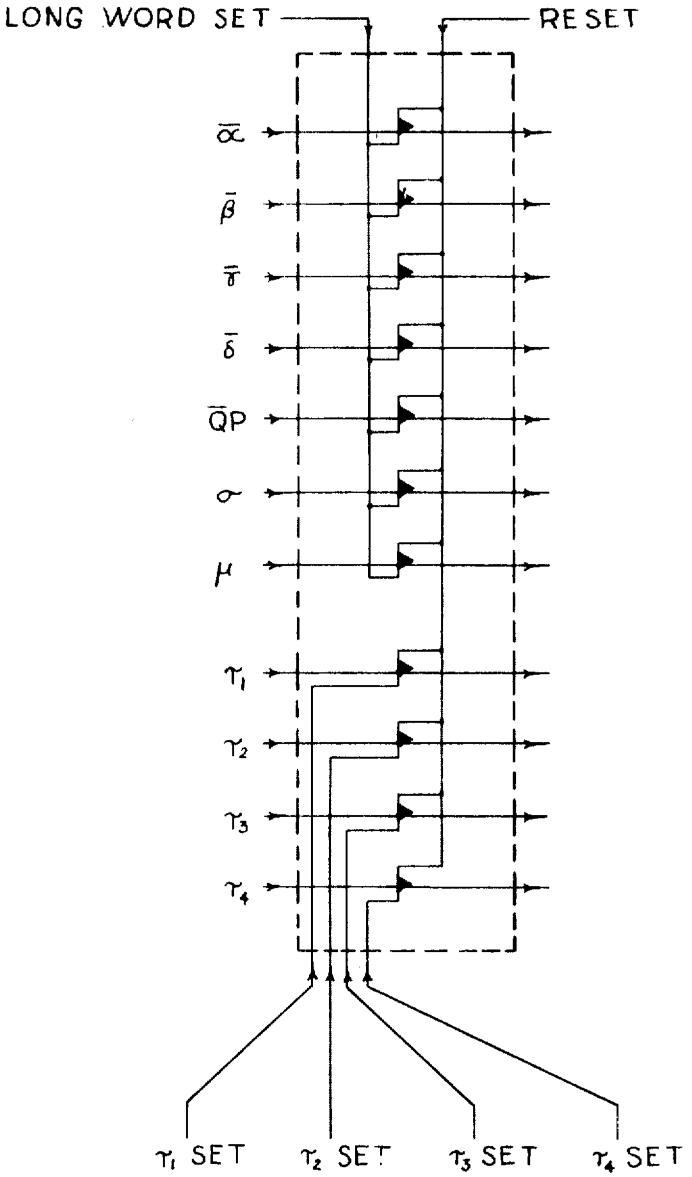

FIG. 13 is a schematic diagram of the submodule of gates on a face of the basic computing cell. All of the submodules $x^1$, $x^+$, $y^1$, $y^+$, $z^1$, and $z^+$ of the cell have this design. The cell has six faces. Near each face there is one of these submodules. This submodule controls the information output from the cell to the neighboring cell adjacent to the face.

Figure 14:
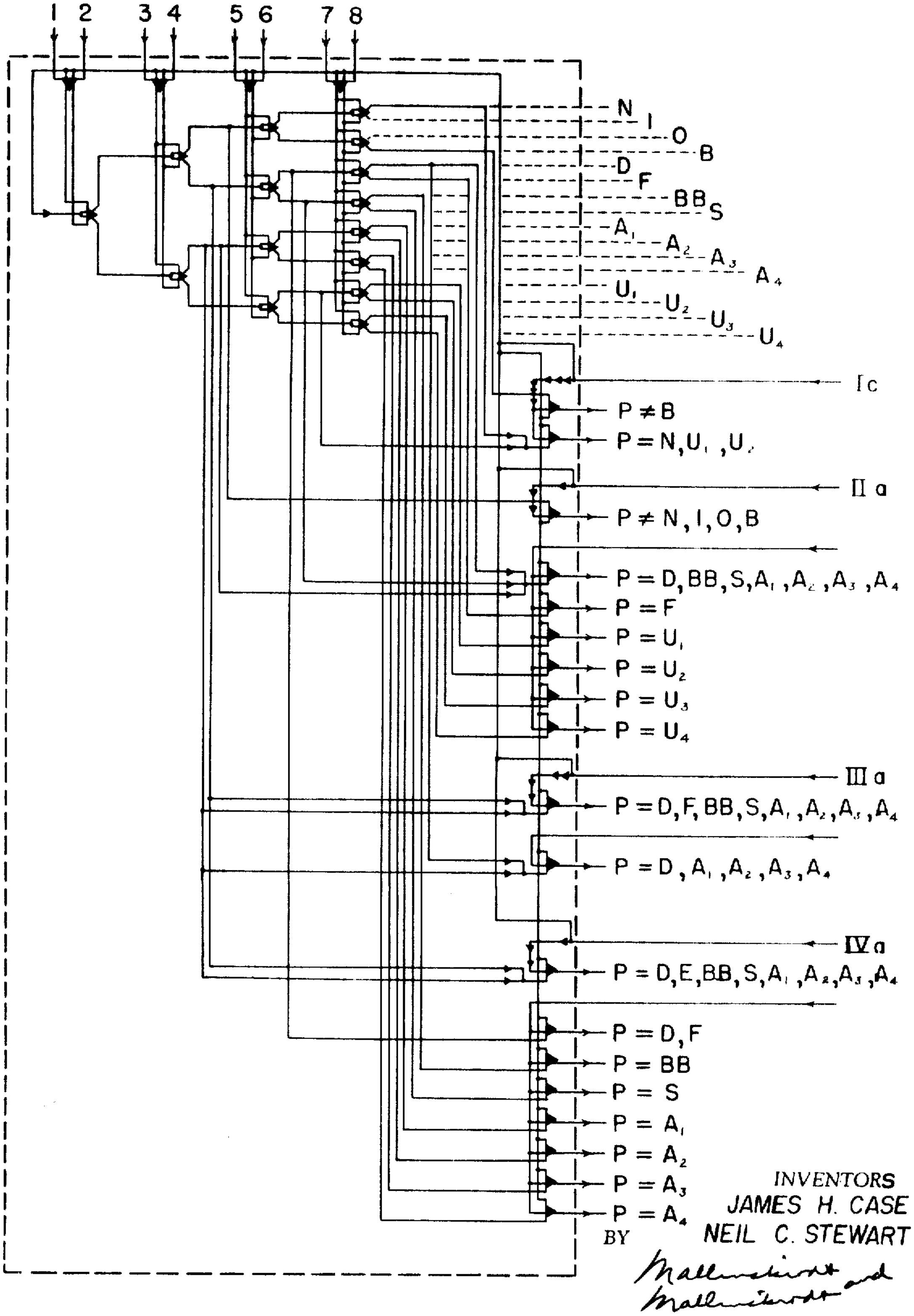

FIG. 14 is a schematic diagram of the P-decoder submodule of the basic computing cell. The letter P indicates the instruction. The outputs labeled $P=A_3$ and $P=A_4$ are not shown in the drawing of the cell for they have no function in our particular design.

FIG. 15 is a schematic diagram of the branch on negative submodule of the basic computing cell.

FIG. 16 is a schematic diagram of the branch on zero submodule of the basic computing cell.

FIG. 17 is a schematic diagram of the external tape control submodule of the basic computing cell. This is essential only in the cell labeled $\bar{A}$ in FIG. 28. In the basic computing cells of the stack constituting the computer, this submodule has no function.

Figure 18:
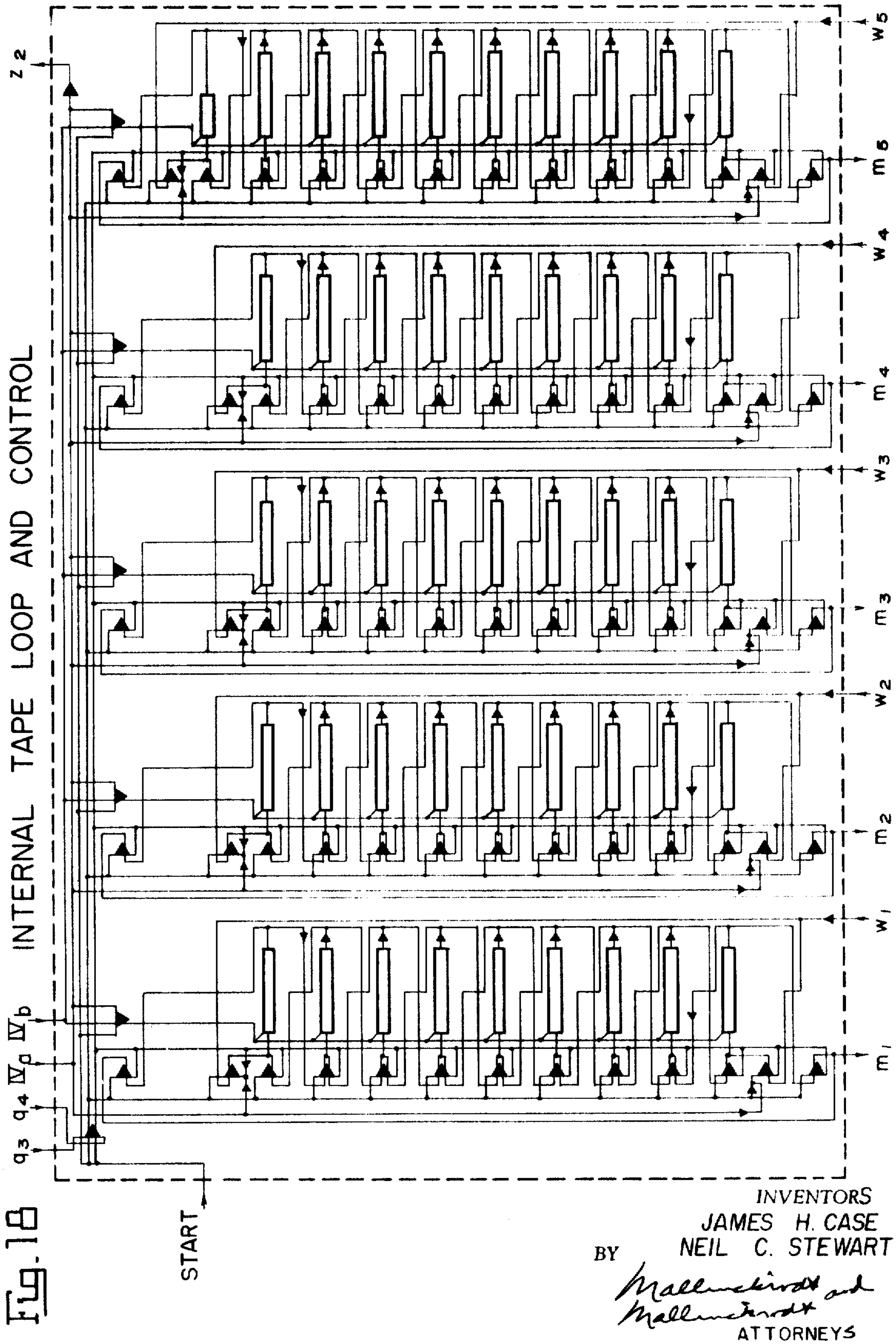

FIG. 18 is a schematic diagram of the internal tape loop and internal tape loop control submodule of the basic cell. Here we are using the term tape loop to indicate a word organized, cyclic memory which can be stepped forward or backward one word at a time by certain controls.

FIG. 19 is a graphical display of the clock pulses for the basic computing cell.

FIG. 20*a* is a schematic diagram of a 1-dimensional short wire storage system. Although the storage system shown in this drawing has only eight cells the connection pattern between cells is shown so that the system can be made of any length. In addition this drawing shows how the cells at the ends of the line of cells differ from those in the middle. In a cell the boxes containing arrows indicate double register submodules and the boxes containing no symbol indicate control submodules. This drawing also shows how the cells are constructed out of the double register submodules and control submodules.

Figure 20B:
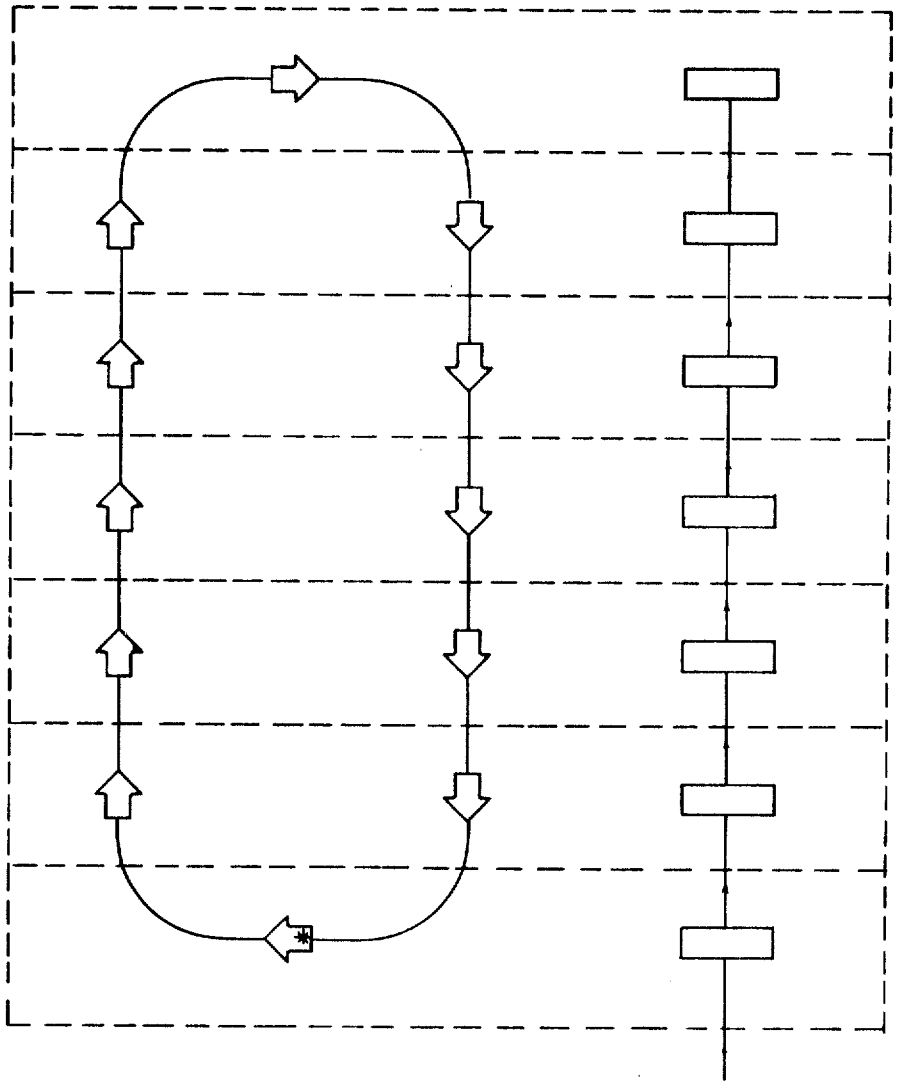

FIG. 20*b* is an abbreviated form of FIG. 20*a*. This abbreviated drawing aids in understanding the 2-dimensional storage system.

Figure 21:
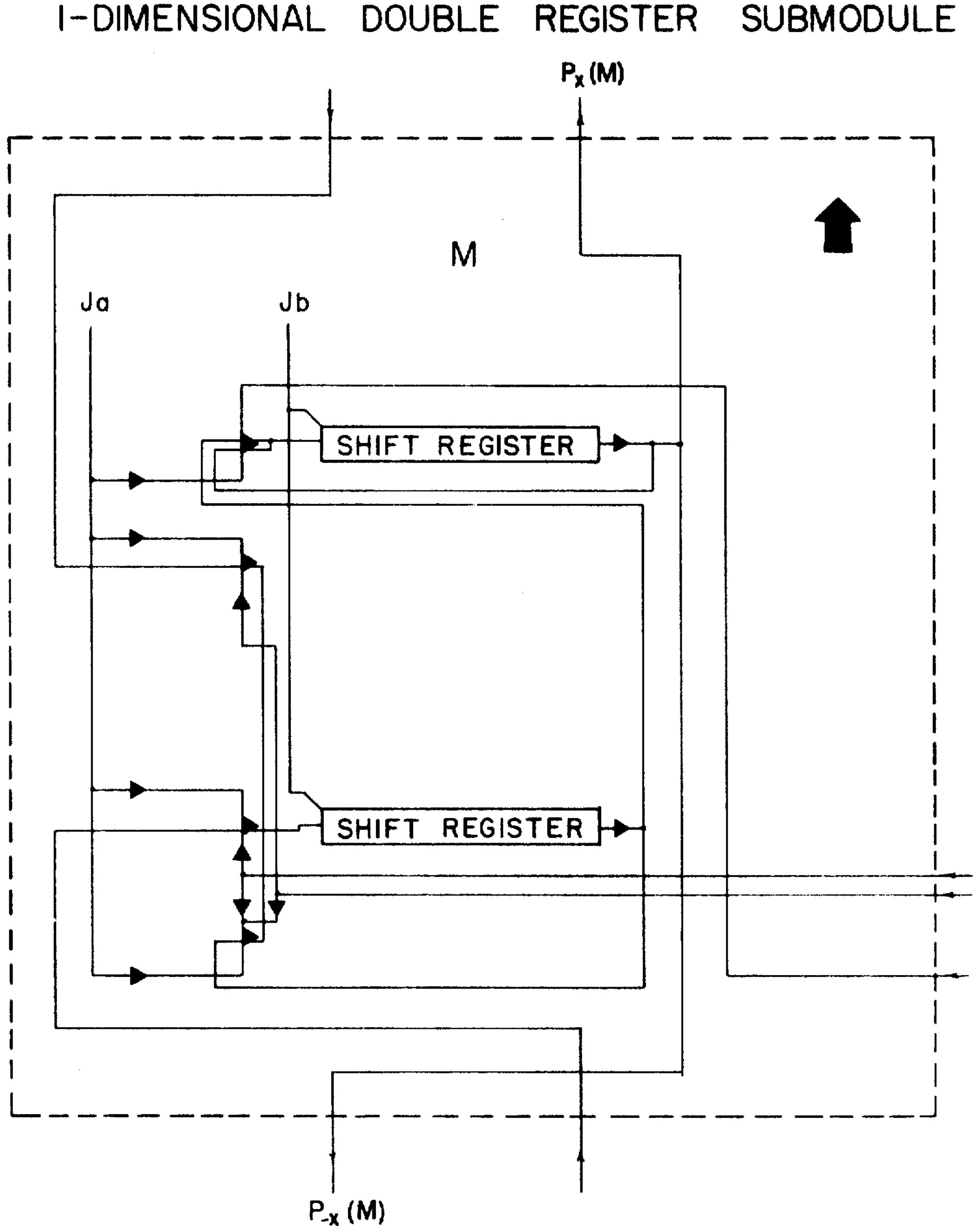

FIG. 21 is a schematic diagram of the 1-dimensional double register submodule used in the 1-dimensional storage system.

Figure 22:
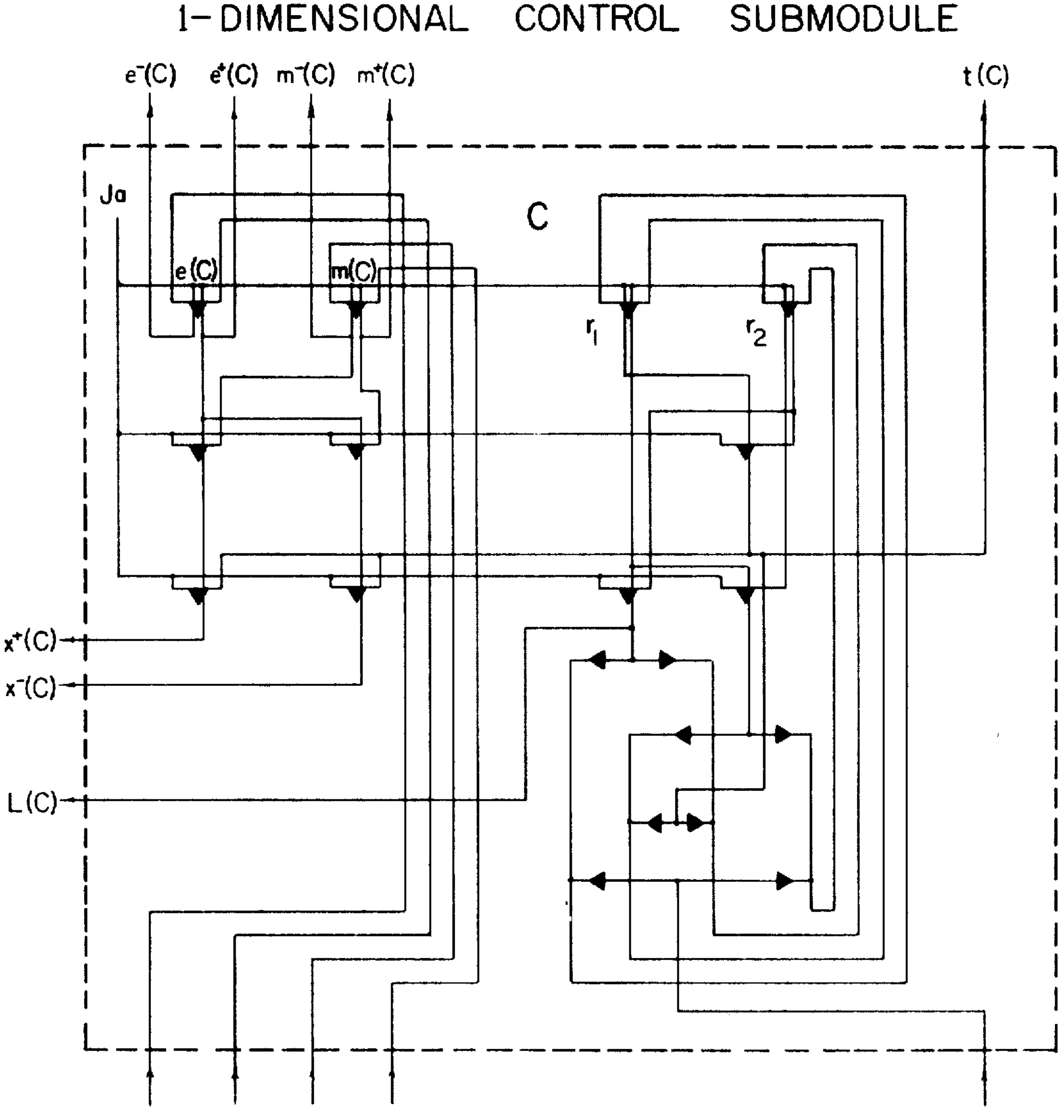

FIG. 22 is a schematic diagram of the 1-dimensional control submodule used in the 1-dimensional storage system.

Figure 23:
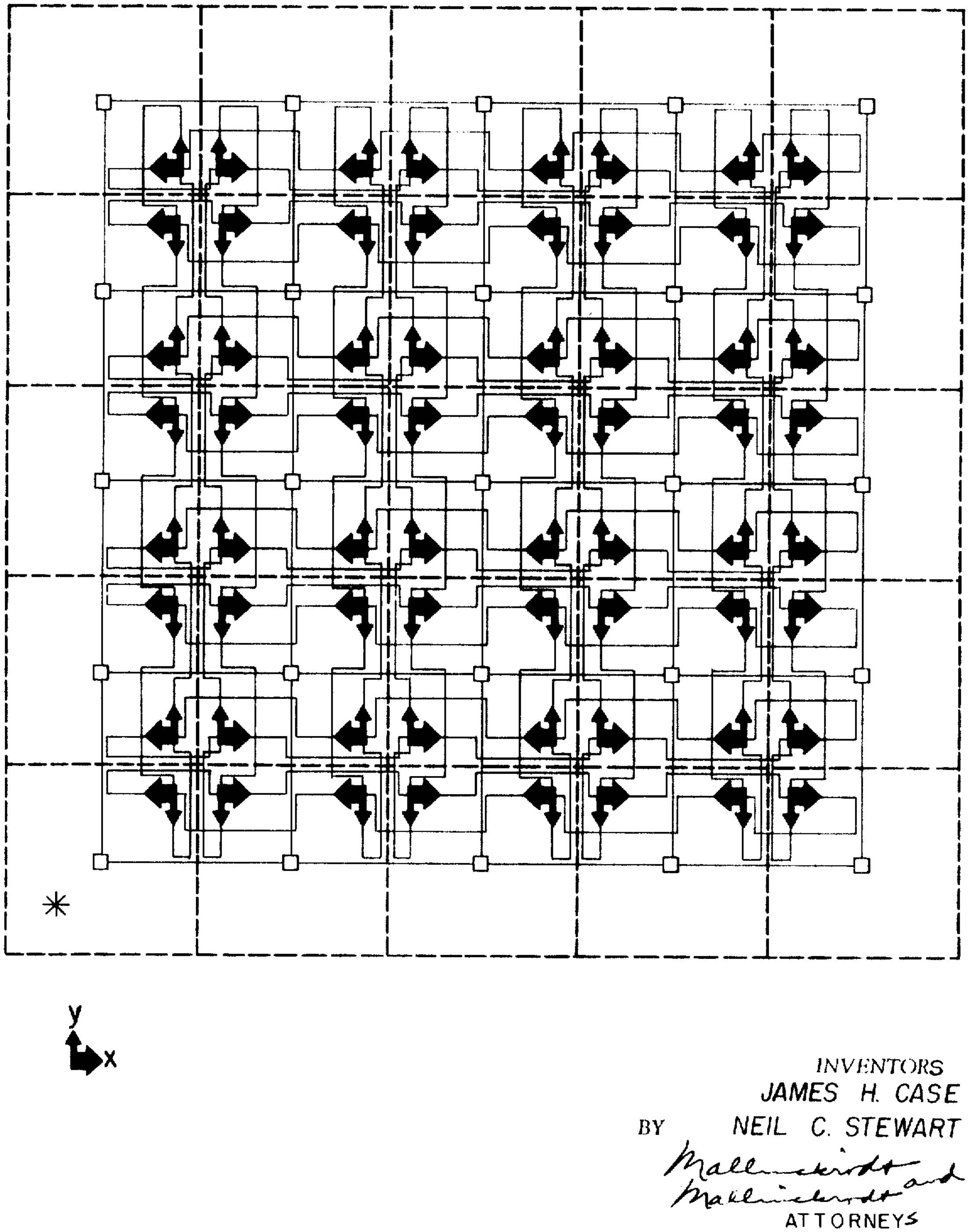

FIG. 23 is a schematic diagram of a 2-dimensional short wire storage system. Although it contains only 25 cells the connection pattern is shown between the cells and this is the same for such systems of any size. This drawing also shows how the cells are constituted in terms of the 2-dimensional double register submodules (indicated by double arrows) and 2-dimensional control submodules (indicated by the small empty squares in the middle of each cell).

Figure 24:
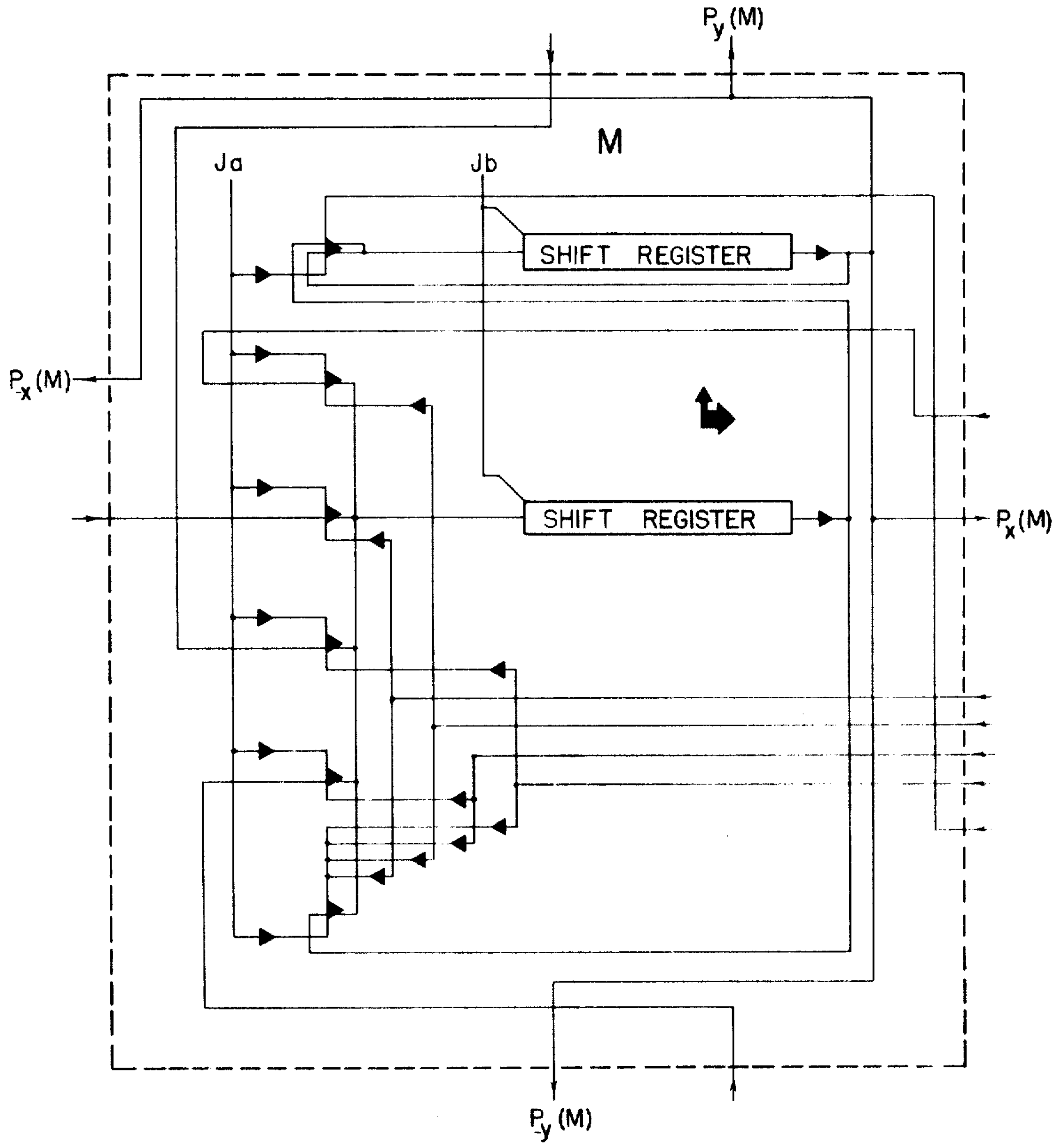

FIG. 24 is a schematic diagram of the 2-dimensional double register submodule used in the 2-dimensional storage system.

Figure 25:
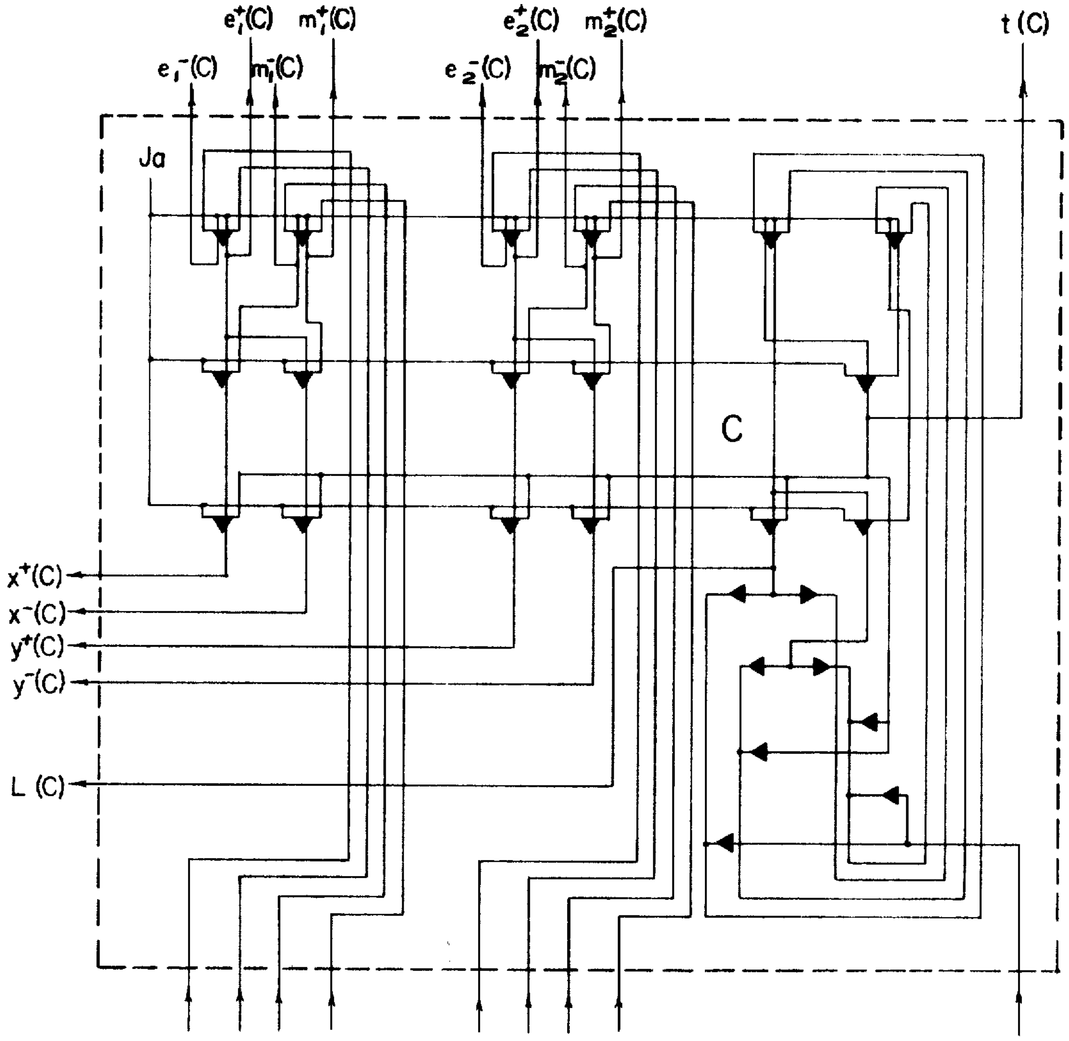

FIG. 25 is a schematic diagram of the 2-dimensional control submodule used in the 2-dimensional storage system.

Figure 26:
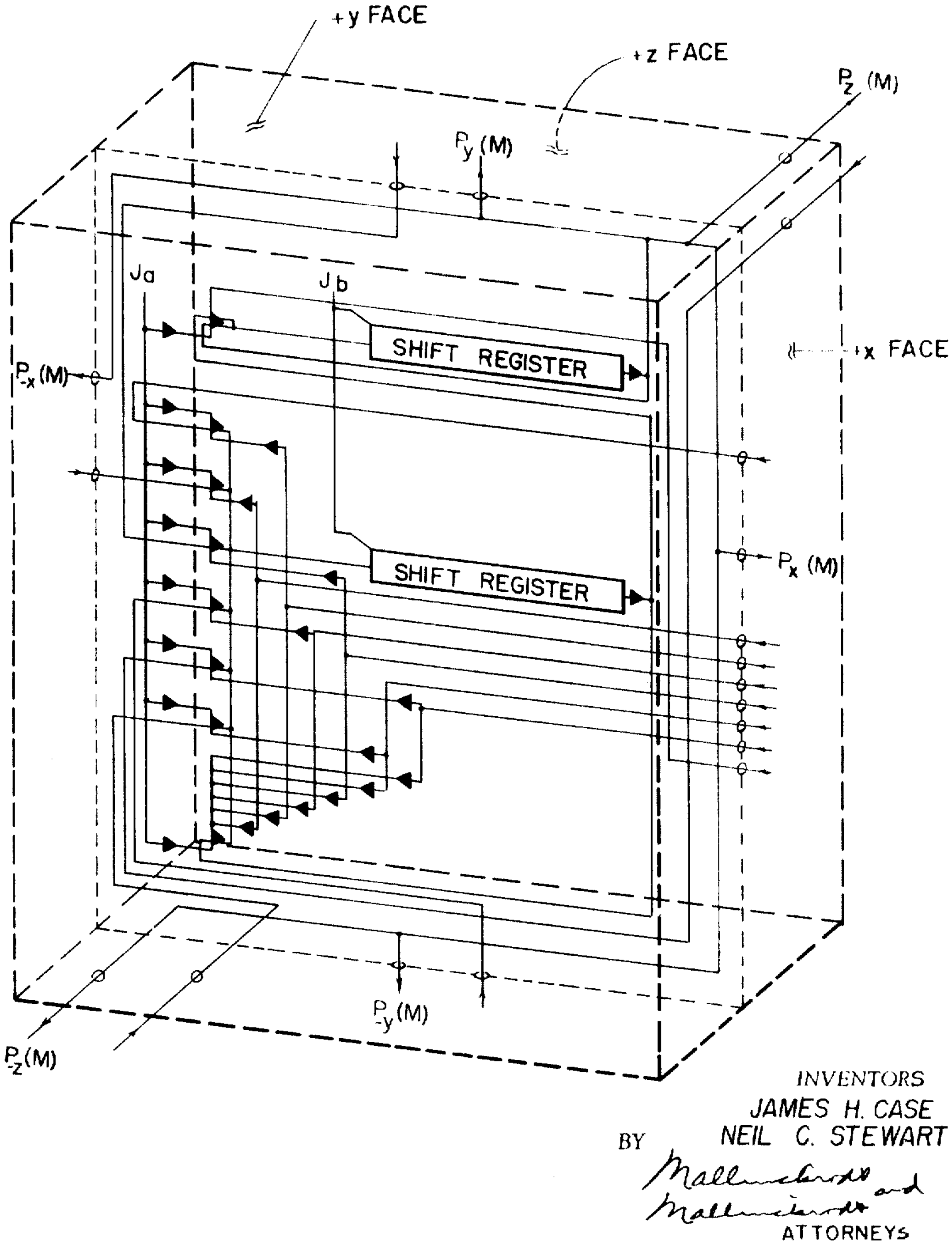

FIG. 26 is a schematic diagram of the 3-dimensional double register submodule used in the 3-dimensional storage system.

Figure 27:
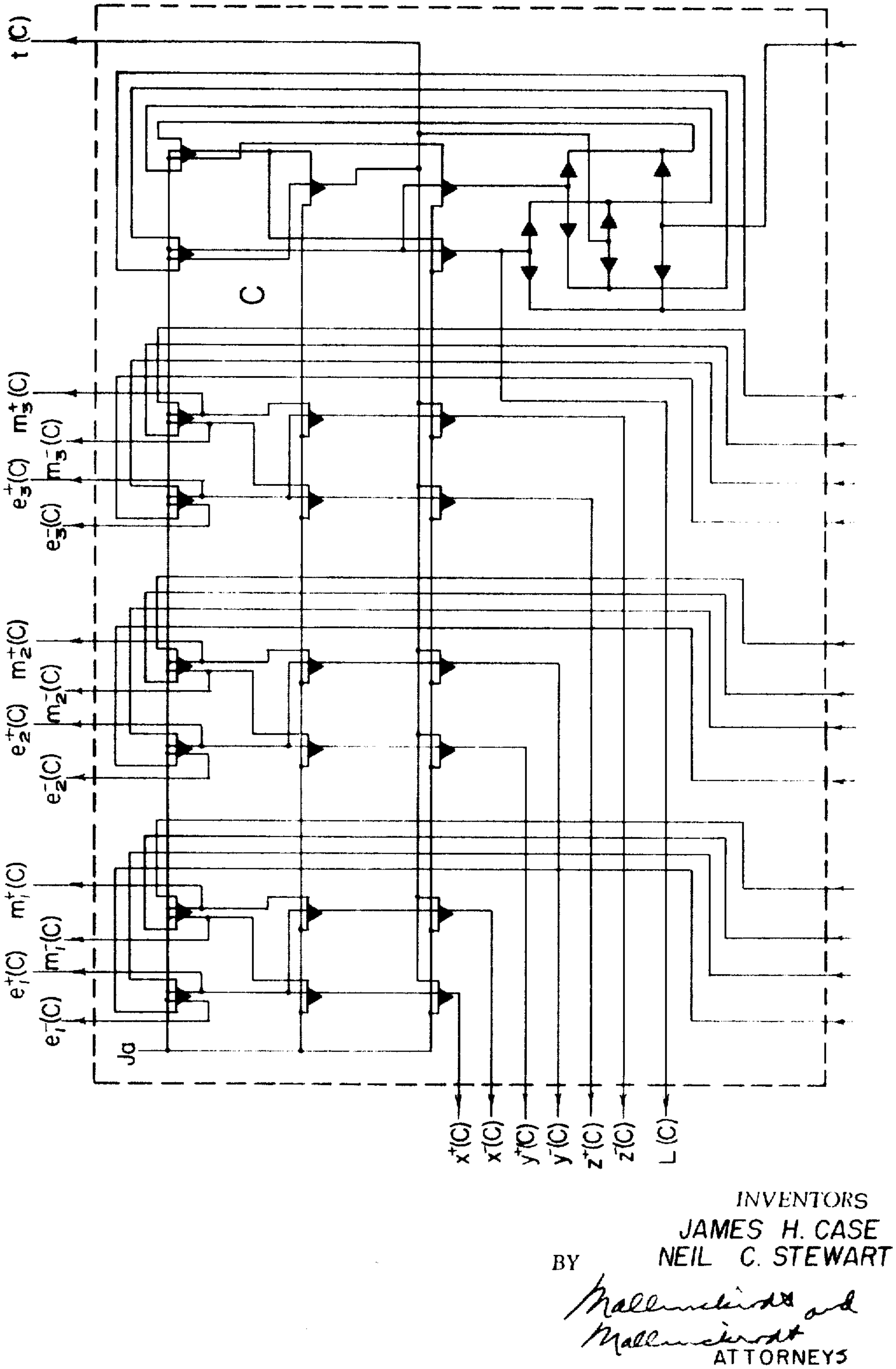

FIG. 27 is a schematic diagram of the 3-dimensional control submodule used in the 3-dimensional storage system.

Figure 28:
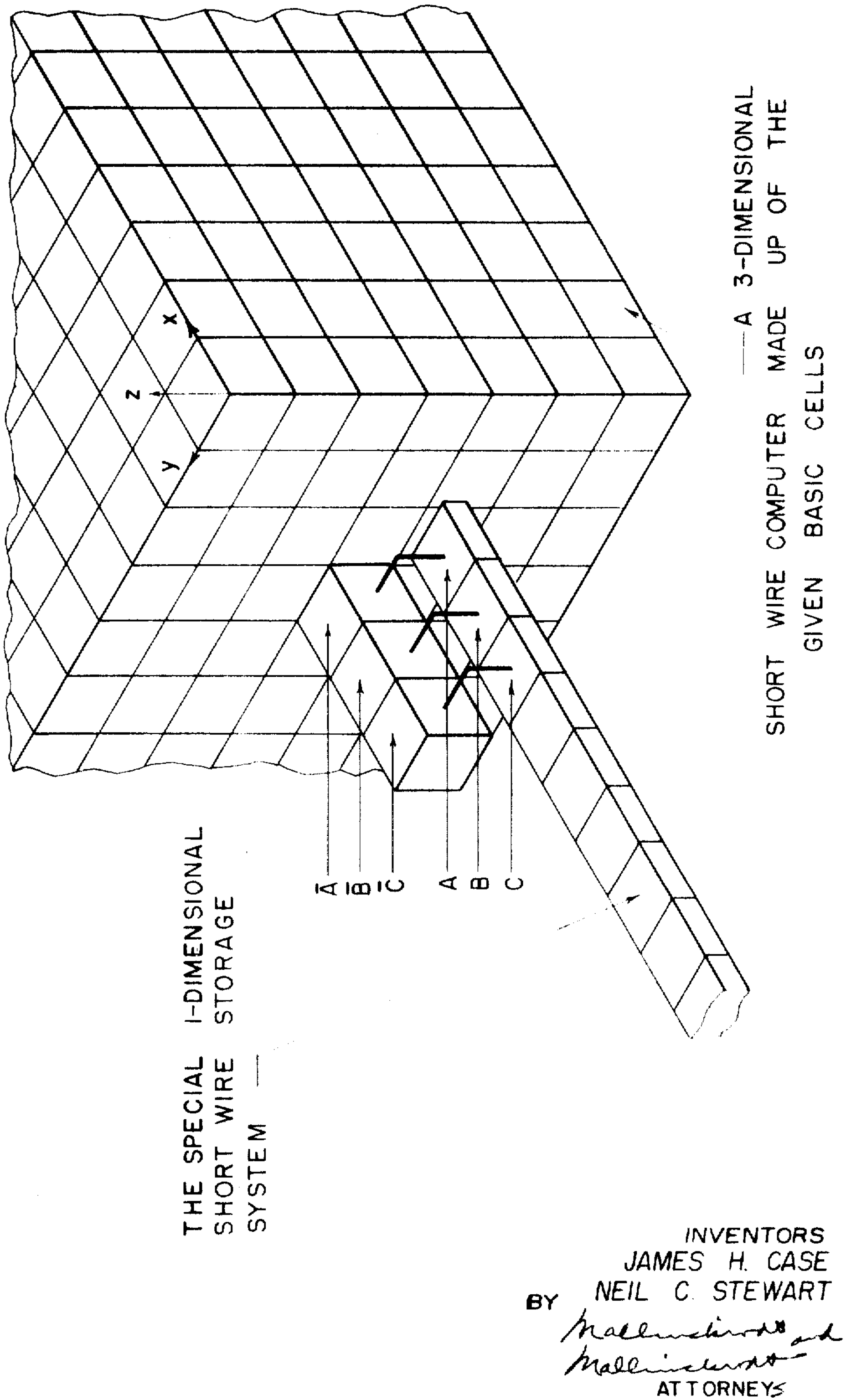

FIG. 28 is a perspective, schematic diagram of the attachment of the special 1-dimensional storage system to a computer composed of a stack of the given basic computing cells. In this drawing the cells $\bar{A}$, $\bar{B}$, $\bar{C}$ are considered as part of the connecting mechanism.

Figure 29:
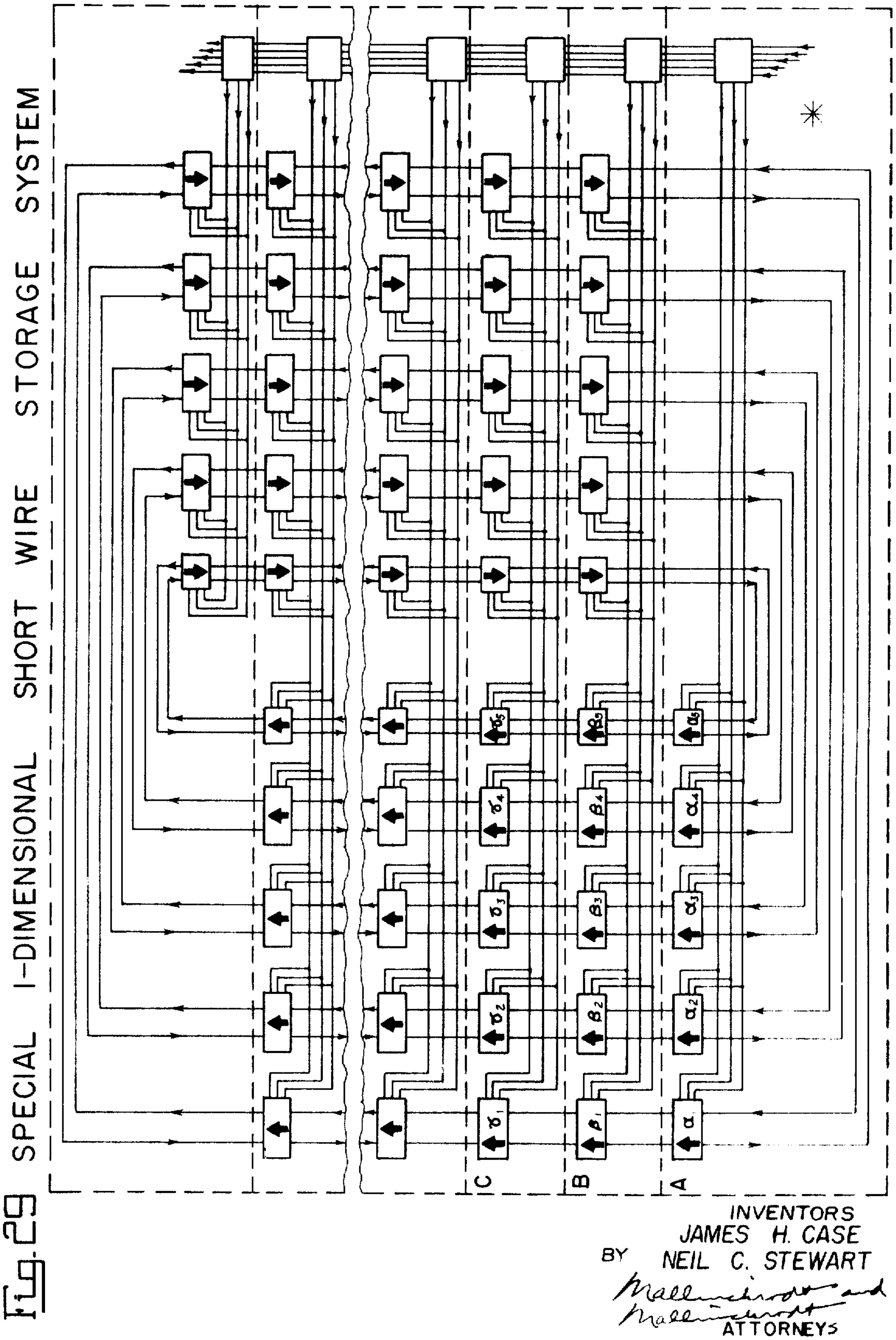

FIG. 29 is a schematic diagram of the special 1-dimensional short wire storage system. The control submodule here is the same as that in the general 1-dimensional storage system. The long unmarked double register submodules (in the long boxes containing arrows but no Greek letters) are the usual 1-dimensional double register submodules in which the shift registers are $\alpha$-registers as in the basic computing cell. The short unmarked double register submodules (the short boxes containing arrows but no Greek letters) are the usual 1-dimensional double register submodules in which the shift registers are Q-registers as in the basic cell. The double register submodules containing Greek letters are special and are given in FIGS. 30, 31, and 32.

Figure 30:
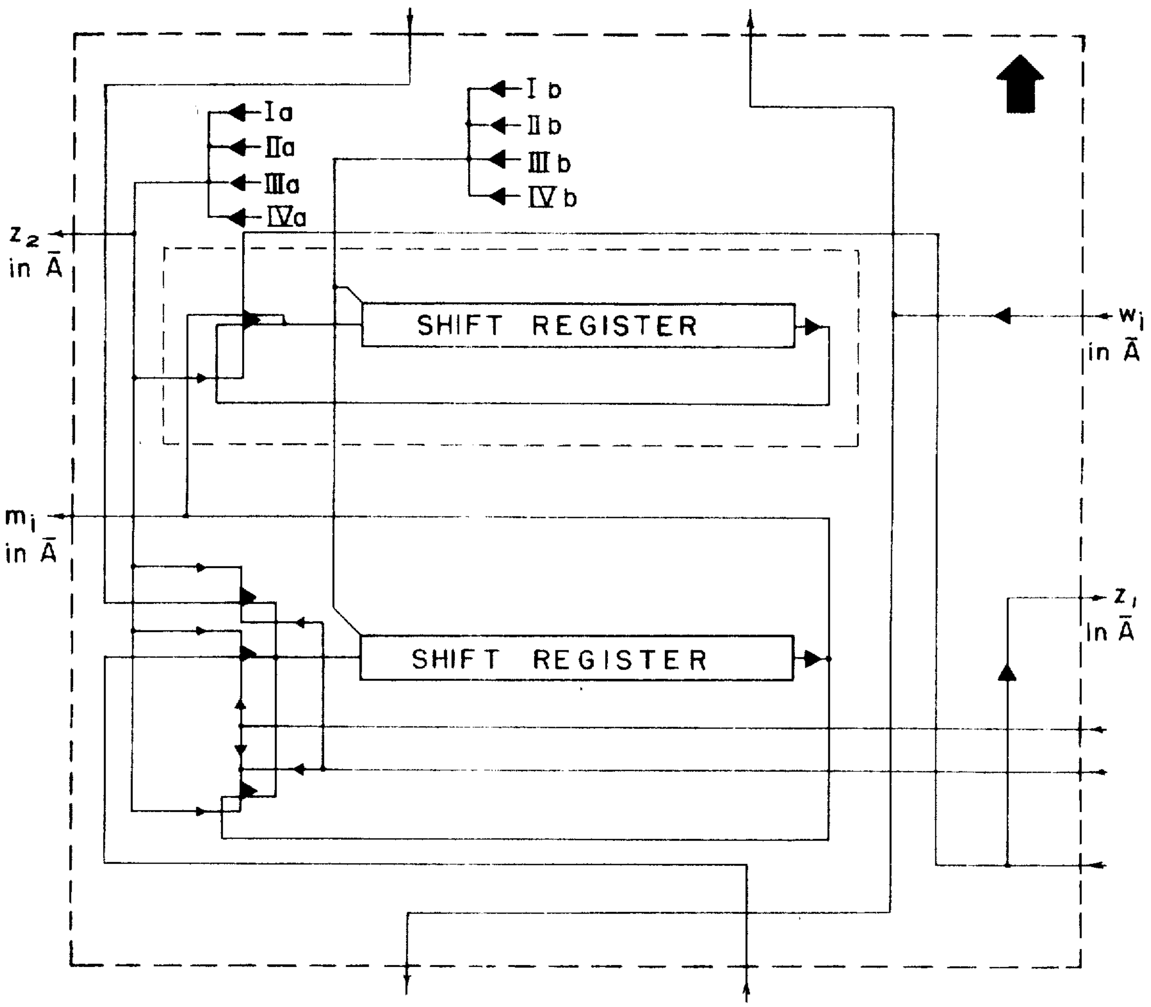

FIG. 30 is a schematic diagram of the special double register submodule $\alpha_i$ in A. The part of the figure in the inner dotted line box is nonfunctional and is presented for purposes of comparison with the usual 1-dimensional double register submodule. If $i=1$, 2, 3, or 4 then the shift registers are like the $\alpha$-register in the basic computing cell. If $i=5$ then the shift registers are like the Q-register in the basic computing cell. This drawing also includes the connections between the storage cell A and the basic computing cell $\bar{A}$.

Figure 31:
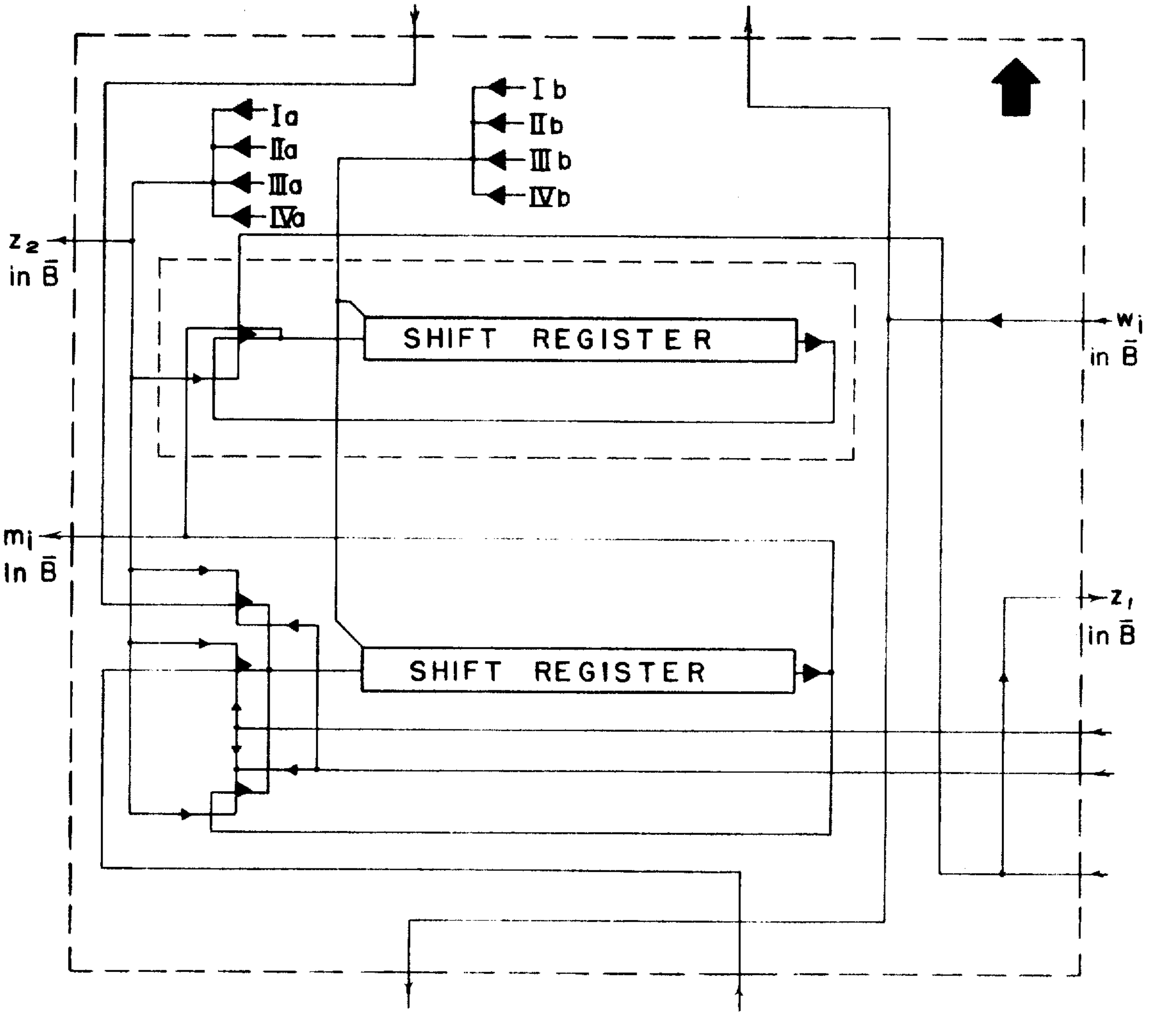

FIG. 31 is a schematic diagram of the special double register submodules $\beta_i$ and B. The part of the figure in the inner dotted line box is nonfunctional and is presented for purposes of comparison with the usual 1-dimensional double register submodule. If $i=1$, 2, 3, or 4, then the shift registers are like the $\alpha$-register in the basic computing cell. If $i=5$ then the shift registers are like the Q-register in the basic computing cell. This drawing also shows the connections between the storage cell B and the basic cell $\bar{B}$.

Figure 32:
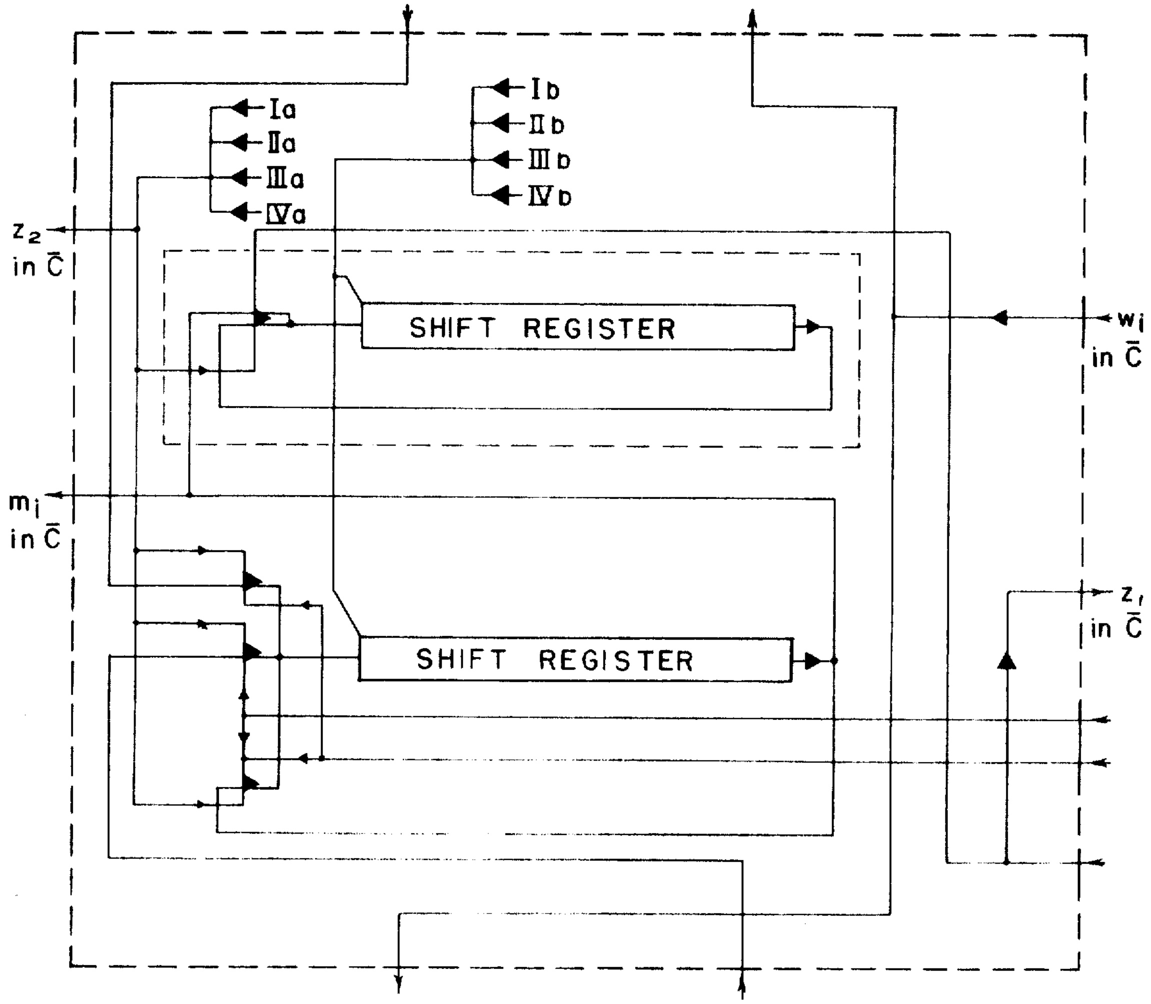

FIG. 32 is a schematic diagram of the special double register submodules $\beta_i$ in C. The part of the figure in the inner dotted line box is nonfunctional and is there for purposes of comparison with the usual 1-dimensional double register submodule. If $i$=1, 2, 3, or 4 then the shift registers are like the $\alpha$-register in the basic computing cell. If $i$=5 then the shift registers are like the Q-register in the basic computing cell. This drawing also shows the connections between the storage cell C and the basic computing cell $\overline{C}$.

DETAILED DESCRIPTION

III. THE STANDARD GATE ELEMENT

There are two important reasons for using a standard gate element (conveniently designated by SGE) in describing short wire storage systems.

1. This kind of description of the devices (short wire computers and short wire storage systems) shows the essential relationships between the functioning of the various parts no matter which of several methods or technologies are used in the construction of the devices. (By first showing how to construct the standard gate element in several technologies and then giving a circuit diagram for a particular device in terms of standard gate elements we will have shown how to construct the device in several different technologies.)

2. This kind of description of the devices (short wire computers and short wire storage systems) facilitates the design and construction of the devices in any given technology because it eliminates special balancing and provides appropriate isolation features for special circuits. That is, the standard gate elements are prebalanced so that if any circuit is made of them, within their general limitations on fan-in and fanout, to perform a specified logical functioning, then this logical functioning will be carried out by the circuit without further balancing. This feature of the standard gate element is useful for designing large circuits.

3.1 Principles of Operation

General description: The standard gate element is a bistable gating element which amplifies weak input signals to produce constant strength output signals. The operation is synchronous with delay and isolation for pulse based systems.

Detailed description: In FIG. 2$a$ the power P is supplied in a special cycle of pulses. One of the pulses in the cycle is called the transmission pulse and is denoted by the symbol "T." Any pulse occurring at this time we call a transmission pulse. Signals between various standard gate elements in a circuit occur only at the time of T and are sent only on the transmission lines which are indicated by lines in the circuit diagram.

In these diagrams a simple crossing of lines does not indicate that the crossing transmission lines are connected. A dot on the crossing indicates a connection between transmission lines. In all further such diagrams we shall omit the lines indicating power transmission lines. For the short wire computers and storage systems described here we make the following requirements on the power pulses and signal transmission lines: There is a bound on the length of signal transmission lines. The power pulses emanate out in waves from a point or surface so that there is sufficient time between power pulses arriving at any given standard gate element in the circuit for that gate element to send and receive its signal pulses along the signal transmission lines connecting it to other gate elements and time for the gate element to function. This is what we call wave synchrony.

In the diagram of the standard gate element (FIG. 2$a$) two of the signal transmission lines, $B_1$ and $B_2$, are for transmitting output signals from the SGE and four of the lines, $\alpha_1$, $\alpha_2$, $A_1$, $A_2$, are for transmitting input signals to the SGE.

The SGE has two stable states, $S_1$ and $S_2$, which will maintain themselves unless changed by some input. A signal pulse in line $\alpha_1$ sets the state of the SGE to state $S_1$. A signal pulse in the line $\alpha_2$ sets the SGE to state $S_2$. If signal pulses arrive in lines $\alpha_1$ and $\alpha_2$ simultaneously, the resulting state can be either $S_1$ or $S_2$. In all of our devices we avoid use of this situation. However, it may be convenient to have majority rule in the case of several such contradictory pulses in order to facilitate redundant wiring.

For $i$ being either 1 or 2, if the state of the SGE is set to or is already $S_i$ and a signal is received in $A_i$ at the time of one transmission pulse, then at the time of the next transmission pulse a signal emanates from $B_i$.

There is no back flow of pulses from the output lines or at least not enough back flow to affect the functioning of the SGE.

The amount of fanout of a SGE is the maximal number of other SGEs that can be consistently controlled by the given SGE. The amount of fan-in of a SGE is the maximal number of input lines which can transmit signals into the SGE without destroying its logical functioning. The fan-in might be different for different ones of the input lines $\alpha_1$, $\alpha_2$, $A_1$, and $A_2$. The fanout might be different for the different output lines.

If the fanout or fan-in of a SGE is too small for a given application, then the SGEs can be combined as in FIG. 2$c$ to form a new SGE having the required fan-in or fanout.

Thus the SGE is seen to be very adaptable in spite of limitations on a specific SGE.

If an SGE is seen to be very adaptable in spite of limitations on a specific SGE.

If an SGE has a certain probability of failure, then by judicious combinations of these SGEs a new SGE can be constructed which has lower probability of failure. The failures may be such that any particular fail occasionally or else a few SGEs will fail permanently. The failure is assumed to be passive, so that it will not disrupt the power supply nor damage other SGEs by heating or otherwise.

The signals between various gate elements are transmitted during the time of the transmission pulse and at no other time.

The lines with arrows in FIG. 2$a$ represent transmission lines. The light lines are for transmission of signals and the heavy lines are for transmission of power pulses. These transmission lines will be realized differently in different technologies. In the transistor technology they will be conducting wires. In the magnetic core technology they will be pairs of conducting wires. In the metal oxide on silicon technology they would be thin, vapor deposited strips of aluminum on a silicon oxide substrate. In a particular cryogenic technology they would be thin strips of vapor deposited lead.

3.2 The Magnetic core Realization of the Standard Gate Element Core

The magnetic core realization is our first example because it attains the proper isolation features most easily.

In FIG. 3 the circles $a_1$, $a_2$, $a_3$, $b_1$, $b_2$, $b_3$, $c_1$, $c_2$, and $c_3$ represent magnetic cores. The ground is positive. The power pulses arrive on the bundle of wires $P_1$, $\bar{P}_1$, $\bar{\bar{P}}_1$, $P_2$, $\bar{P}_2$, $\bar{\bar{P}}_2$, $P_3$, $\bar{P}_3$, $\bar{\bar{P}}_3$. The high levels on the power pulses are all the same, and are high enough with a sharp enough rise time to switch any of the cores, and are high enough to predominate over any of the signals arriving at a given core from the switching of other cores. The lower levels on each curve are different for the different cores giving the appropriate biasing for the logical functioning and fan out.

The biasing is chosen so that: 1. Cores $a_2$, $b_2$, $c_2$ act as a ring counter. That is, unless a signal arrives in lines $\alpha_1$ or $\alpha_2$, the state of $a_2$ will be carried to $b_2$, then to $c_2$, and then back to $a_2$ by the interlocking power pulses.

2. If the state of $a_1$ is zero (that given by the power pulse), then a signal in $A_1$ setting $a_1$ to a certain state will be carried to $b_1$, then to $c_1$, and then out line $B_1$ in one cycle of the three time periods. A corresponding signal $A_2$ will not be carried out of $B_2$.

3. If core $a_2$ is set to 1, the state opposite to that given by the power pulse, then a signal in $A_2$ will be transmitted to $B_2$ in one cycle of the three time periods. In this case no signal will be transmitted from $A_1$ to $B_1$.

The factors such as the biasing, the winding ratios, or the size of cores are adjusted to give these effects.

The amount of fanout is increased by increasing the size of cores $c_1$ and $c_3$, and at the same time making necessary changes in biasing.

The wiring arrangement and pulsing insure the necessary isolation characteristics.

In addition this realization of the standard gate element has majority rule on inputs.

3.3 Other Realizations of the Standard Gate Element

The magnetic core realization is adaptable directly to a thin magnetic film realization.

We give other realizations in FIGS. 4, 5, and 6.

IV. THE BASIC CELL (OR BUILDING BLOCK) OF A UNIVERSAL 3-DIMENSIONAL SHORT WIRE COMPUTER 4.1 General Description This short wire computer is to be constructed by stacking in a certain regular fashion the basic cells which we are about to describe. For the purposes of this description it is best to think of one of the electrical or electronic realizations of the standard gate element. For convenience we think of the circuitry for each cell as being contained in a cubical box made of some insulating material having some rigidity such as ceramics or plastics. Each of the six faces of the cube have a number of holes for output wires and input wires. These cubical basic cells are stacked into a solid pile which is cubical or in the form of a rectangular solid. This stacking is regular so that any face of any one cube matches up exactly with a face of some neighboring cube. An additional requirement of the stacking is that all of the cubical basic cells have the same orientation.

To facilitate the description of this orientation let us name the six faces of a given cube by the symbols $x^+$, $x^1$, $y^+$, $y^1$, $z^+$, and $z^1$. The $x^1$ face is opposite the $x^+$ face, the $y^1$ face is opposite the $y^+$ face, and the $z^1$ face is opposite the $z^+$ face. In the stacking of the cubes to form the computer the following additional requirements must be met:

1. If a given cube has a neighboring cube which has a face adjacent to the $x^+$ of the given cube, then this adjacent face on this neighboring cube is the $x^1$ face of the neighboring cube.

2. If a given cube has a neighboring cube which has a face adjacent to the $y^+$ face of the given cube, then this adjacent face on this neighboring cube is the $y^1$ face of the neighboring cube.

3. If a given cube has a neighboring cube which has a face adjacent to the $z^+$ face of the given cube, then this adjacent face of this neighboring cube is the $z^1$ face of the neighboring cube.

On each face where two cubular basic cells meet, the input wires of one are connected to the output wires of the other as indicated in the schematic diagram, FIG. 7, of the basic cell. In the diagram the six faces are listed as a column instead of in their 3-dimensional geometric positions because the diagram is not a perspective drawing. Therefore, the basic cells have only nearest neighbor connections. Power pulses and clock pulses are supplied to all of the basic cells by lines that either go straight through the cells or go between them. Powerlines and clock pulse lines going straight through the basic cells are included as part of the basic cells and these extra connections are made between adjacent faces. If the computer is large, then the power lines and clock pulse lines are connected to the basic modules in a regular fashion so that the wave type of synchrony is achieved.

The cells operate in synchrony (perhaps in a wave type of synchrony) in discrete time steps. In passing from one time step to another the state of a given cell is affected by the states of any or all of seven cells, namely, the cell itself and its six nearest neighbors. The cells on the boundary of the stack have fewer than six nearest neighbors.

Such a cellular computer, having only nearest neighbor connections, tends to present difficulties in programming. As shown in our paper the programming is easier if longer connections are allowed so that there is direct information transfer to somewhat removed neighbors. Let us call the totality of cells which may influence a given cell during one time step, the "influence area of the given cell." In summary, the larger the influence area, the easier the programming; and the smaller the influence area, the easier the construction.

This invention offers a way of making use of the best parts of these two effects by incorporating two time steps—a major time step and a minor time step. There are 67 minor time steps in a major time step. (There is a third time step called a micro time step.) As measured by the minor time step the influence area includes only the cell itself and its six (or fewer) nearest neighbors. However, by the cascading of information flow during the 67 minor time steps in a major time step, the influence area as measured by the major time step is much larger. If the given cell is sufficiently far away from the boundary of the stack of cells, then its influence area is a cube of cells such that this cube has 29 cells on an edge. We have designed the basic cells from the point of view of giving them natural logical functions at the major time step level.

Input and output to and from this short wire computer is achieved by attaching external storage systems (for example, magnetic tape storage systems) to individual cells on the boundary of the stack. We shall describe the input and output mechanisms after describing the basic cell.

In each basic cell there are 187 standard gate elements used to store specific information. There are many more gates used in logical operations on this specific information. We shall use the following symbols to denote the specific information content of a given basic cell:

$\alpha\,\beta\,\gamma\,\delta\,Q\,e$ $\bar{\alpha}\,\bar{\beta}\,\bar{\gamma}\,\bar{\delta}\,\bar{Q}\,P\,\sigma\,\mu$ $\tau_1\,\tau_2\,\tau_3\,\tau_4$ The symbols $\alpha$, $\beta$, $\gamma$, $\delta$, $\bar{\alpha}$, $\bar{\beta}$, $\bar{\gamma}$, $\bar{\delta}$, $\sigma$, $\mu$, $\tau_1$, $\tau_2$, $\tau_3$, $\tau_4$, each represent 12-bit words stored n different 12-bit shift registers as indicated in FIG. 7. In these shift registers each bit of a given 12-bit word is stored by means of the state of a specific standard gate element. The symbol Q represents a 6-bit word stored in the 6-bit shift register indicated in the figure. The symbol $\bar{Q}$ indicates the 6-bit word which is stored in the first half of the 12-bit shift register $\bar{Q}P$ indicated in the figure. The symbol P indicates the 6-bit word stored in the last half of the 12-bit shift register $\bar{Q}P$ indicated in the figure.

The symbol $e$ represents a single bit called the "switching bit" stored in the single standard gate element indicated in the figure. In addition it is convenient to introduce the symbol W to represent the 54-bit word $\alpha\beta\gamma\delta Q$ and the symbol $\bar{W}$ to represent the 54-bit word $\overline{\alpha\beta\gamma\delta Q}$. We shall call W, "the main word"; $\bar{W}$ "the auxiliary word"; and $\overline{\alpha\beta\gamma\delta Q}P\sigma\mu$, "the long word."

The main word W and the switching bit $e$ contain the only specific information used on the level of major time steps. The rest of the specific information is used in the 67 minor time steps that occur in the transition from one major time step to the next. In accord with our earlier discussion the 55 bits in W and $e$ together constitute the total information content of the cell as far as programming is concerned. (We make a modification of the basic cell in which extra words like W are stored on an internal tape loop. This will be discussed in section 4.8.)

4.2 A Detailed Description of the Main Word and Switching Bit

We shall begin with a general description of the functioning of the switching bit $e$. If the switching bit is 0 at a given major time step, then this cell will not prescribe changes nor logical operations upon the information in any cells during the next major time step. If the switching bit in a given cell is 1 at a given major time step, then the main word in this given cell may prescribe and make changes or perform logical operations on the main words and switching bits in the cells in the influence area of the given cell during the next major time step. In the latter case the cell is said to be a command cell (or active). If $e=0$, the cell is said to be inactive. The main word in a command cell is said to be a command word. Note that in two consecutive major time steps, the command cells may not be the same. (If one likes to think of it that way, one may say that the command moves.)

In conventional computer terminology one may think of this short wire computer as operating like a multitude of overlapping, four address, sequential computers.

The command word W may be thought of as having two organizations. The organization already given, that is $\alpha\beta\gamma\delta Q$ is called the command organization. Here the 12-bit words $\alpha$, $\beta$, $\gamma$, and $\delta$ represent local addresses, and the 6-bit word Q represents the instruction. The other organization is called the data organization. In this organization the 48-bit word $\alpha\beta\gamma\delta$ represents a numerical quantity (that is, a quantity having numerical significance), and the first bit in the 6-bit word Q represents the sign of the numerical quantity, so that the combined 49 bit word represents a signed number.

4.3 Local Addresses

The 12-bit words $\alpha$, $\beta$, $\gamma$, and $\delta$ represent local addresses of other cells relative to the command cell. Each such 12-bit word is broken into three 4-bit words representing the $x$, $y$, and $z$ coordinates, respectively, of the local address. The first bit of each such 4-bit coordinate indicates the sign of this coordinate and the remaining three bits represent the magnitude. In converting binary numbers to the usual counting number notation we have that 000 represents 0
001 represents 1
010 represents 2
011 represents 3
100 represents 4
101 represents 5
110 represents 6
111 represents 7

Incorporating the sign bit we have, for example, that 0011 represents +3 and 1110 represents −6.

We are using the convention that 0 represents a plus sign and 1 represents a minus sign.

We prescribe that the first four bits of a 12-bit local address represent the $x$-coordinate, the second four bits represent the $y$-coordinate, and the last four bits represent the $z$-coordinate of the local address. For purposes of exposition we also prescribe that the $+x$ direction is to the right, the $-x$ direction is to the left, the $+y$ direction is forward, the $-y$ direction is backward, the $+z$ direction is up, and the $-z$ direction is down. By way of example, the local address 1011 0111 1010 represents the numerical local address (−3, +7, −2) which in turn would represent the cell to the left 3 cells, forward 7 cells, and down 2 cells from the command cell. The local address of the command cell could be (+0, +0, +0); (+0, −0, −0); (−0, +0, −0); (−0, −0, +0); (−0, −0, −0); (−0, +0, +0); (+0, −0, +0); or (+0, +0, −0). There is this redundancy that +0=−0 numerically, but +0 and −0 are represented differently in the gate elements. We make use of this by using (+0, +0, +0) for a special purpose, and we shall denote (+0, +0, +0) by the symbol ∞.

4.4 THE INSTRUCTIONS

Let the last four bits of Q denote the instruction in a command word. We use the following symbols, names, and binary representations of the instructions N = 0000 (no operation)
I = 0001 } (unspecified input and output instructions)
O = 0010
B = 0011 (branch)
D = 0100 (duplicate)
F = 0101 (fan)
BB = 0110 (block branch)
S = 0111 (shift internal tape loop)
$A_1$ = 1000 (addition)
$A_2$ = 1001 (multiplication)
$A_3$ = 1010 (unspecified arithmetic instructions)
$A_4$ = 1011 (unspecified arithmetic instructions)
$U_1$ = 1100 (branch on negative)
$U_2$ = 1101 (branch on zero)
$U_3$ = 1110 (external tape control)
$U_4$ = 1111 (unspecified unitary operation)

First, we shall give a description of the operations in terms of the end results after a major time step. This will give the major part of the information necessary for programming. The reason that such information for programming is not complete is that there is a possibility of interference between the logical operations specified by nearby command cells. After our description of the detailed function of the basic cell, we will describe the additional programming rules to be used to avoid these interactions. However, there is one principle that we can state now. The programmer should avoid configurations in which two different command cells specify two different, contradictory resulting information sets in a third cell.

THE SWITCHING BIT. As described earlier a cell at a given major time step will be called active or a command cell if the switching bit in that cell is set to 1. Otherwise, it is called inactive. In general the switching bit will be zero at a given time step unless the word in a command cell at the previous time step specifies that it be 1. If the word in command cell M at a given major time step specifies that the word in the cell N is to be made active at the next time step, we may say that "the command shifts to N" or if $\delta$ is the local address of N relative to M, we may say that "the command goes to $\delta$." Under such shift of command, we make the convention that ∞ is not the local address of any cell. So that if the command shifts to ∞, then it goes to no cell. This ∞ convention is used only for shifting command. For all other purposes the local address ∞ refers to the command cell itself.

N (*no operation*). If the instruction in a command cell is N, then no operation is specified to be active at the next major time step including this cell itself.

B (*branch*). If the command word is $\alpha\beta\gamma\delta Q$ and the last 4-bit word in Q is B, then the cells having local addresses $\alpha$, $\beta$, $\gamma$, and $\delta$ relative to the command cell are specified to be active at the next major step. However, in this connection the local address ∞ is interpreted as not referring to any cell.

D (*duplicate*). Again suppose that the word in the command cell under consideration is $\alpha\beta\gamma\delta Q$ and the last 4-bit word in Q is D. Let M denote the command cell under consideration. Let $C_\alpha$ denote the cell having local address $\alpha$ relative to M. Let $C_\beta$ denote the cell having local address $\beta$ with respect to $C_\alpha$. Let $C_\gamma$ denote the cell having local address $\gamma$ with respect to $C_\alpha$. Let Z denote the rectangular block of cells having $C_\alpha$ in one corner and $C_\beta$ in the opposite corner. Let Z′ denote the block of cells obtained by translating the block Z so that the corner $C_\alpha$ goes into the cell $C_\gamma$ so that $C_\gamma$ is the cell in the corner of Z′ corresponding to the $C_\alpha$ corner of Z.

Let $C_\delta$ be the cell having local address $\delta$ relative to M if $\delta \neq \infty$. The cell $C_\delta$ is specified to be active at the next major time step.

Also, at the next major time step the main word in any given cell in Z′ is specified to be the word in the corresponding cell in the block Z at the present time step. In case Z and Z′ overlap the new values take precedence. In brief, the words in the block Z are duplicated into the corresponding positions in block Z′. No cell is specified to be active by this command cell except $C_\delta$.

F (*fan*). In the description of this instruction we use the same notation as in the description of the duplicate instruction. The fan instruction differs from the duplicate instruction in the following manner:

Instead of specifying that at the next major time step the main word in a given cell in block Z′ is to contain a copy of the main word which is in the corresponding cell in block Z at the present time step—it is specified that at the next major time step the main word in any cell in block Z′ is to contain a copy of the main word which is in the cell $C_\alpha$ at the present time step.

As in the duplicate instruction, the cell $C_\delta$ is specified to be active at the next major time step.

BB (*block branch*). Suppose the word in the command cell is $\alpha\beta\gamma\delta Q$ where the last 4-bit word in Q is BB. We use the same notation as in the duplicate instruction. However, in the case of block branch no change is specified in the main words in the cells in the block Z′. However, the switching bits in these words are specified to be 1 at the next major time step.

In addition command goes to δ.

S (*shift internal tape loop*). *This is an optional feature that requires extra components in the basic cell. If this option is used, then the basic cell contains a version of a tape loop realized in the given technology. It is a word organized cyclic storage in which the main word of the cell is but one word. All of the other word positions in this cyclic storage should be of the same length as the main word.*

Suppose that the word in the command cell under consideration is $\alpha\beta\gamma\delta Q$ where the last 4-bit word in Q is S. Let $q$ denote the second bit in Q. Then Q is the bit immediately preceding S. Again using the same notation as in the description of the duplicate instruction, each internal tape in each cell in the block Z' is shifted one step in the positive direction if $q$=0 and one step in the negative direction if $q$=1 during this major time step. Command goes to δ.

A (*addition*). Suppose that $\alpha\beta\gamma\delta Q$ is the word in the command cell under consideration and that the last 4-bit word in Q is $A_1$. Using the same notation as in the description of the duplicate operation, the signed number in the main word of any cell in block Z is added to the signed number in the main word of the corresponding cell in block Z' and the result is prescribed to be in this cell in Z' at the next major time stop. Command goes to δ. $A_2$ (*multiplication*). Suppose that $\alpha\beta\gamma\delta Q$ is the word in the command cell under consideration and that the last 4-bit word in A is $A_2$. Using the same notation as in the description of the duplicate operation, the signed number in the main word of any cell in block Z is multiplied by the signed number in the main word of the corresponding cell in block Z', and the result is prescribed to be in this cell in Z' at the next major time step. Command goes to δ.

$A_3$ and $A_4$ (*unspecified arithmetic instructions*). These instructions are not used in the present cell, but it would be a routine matter to use them for other arithmetic operations such as floating point multiplication or division. Their only function is to shift command to δ.

$U_1$ (*branch on negative*). Suppose that $\alpha\beta\gamma\delta Q$ is the word in the command cell M and the last 4-bit word in Q is $U_1$. Let $C_\alpha$ be the cell having local address α with respect to M; let $C_\gamma$ be the cell having local address γ with respect to $C_\alpha$; and let $C_\delta$ be the cell having local address δ with respect to $C_\alpha$. If the sign of the number in the main word of $C_\alpha$ is positive, then command goes to $C_\delta$. If the sign of this number is negative, then command goes to $C_\gamma$.

$U_2$ (*branch on zero*). Suppose that $\alpha\beta\gamma\delta Q$ is the word in the command cell M and the last 4-bit word in Q is $U_2$. Let $C_\alpha$ be the cell having local address α with respect to M, let $C_\gamma$ be the cell having local address γ with respect to $C_\alpha$, and let $C_\delta$ be the cell having local address δ with respect to $C_\alpha$. If the magnitude of the number in the main word of $C_\alpha$ is positive, then command goes to $C_\delta$. If the magnitude of the number in the main word of $C_\alpha$ is zero, then command goes to $C_\gamma$.

$U_3$ (*external tape control*). This instruction is used for input and output purposes.

Suppose that $\alpha\beta\gamma\delta Q$ is the main word in the command cell M and the last 4-bit word in Q is $U_3$. Let $q$ denote the second bit in Q. Then $q$ is the bit preceding $U_3$ in Q. Let $C_\alpha$ denote the cell having local address δ relative to M. Command goes to δ.

Nothing else is specified unless $C_\alpha$ is one of the special cells added to the stack of cubical basic cells and adjacent to the stack as described in the section on input and output to the computer. If it is such a special cell, then the external tape loop attached by this special cell is shifted three words in the positive direction if $q$=0 and three words in the negative direction if $q$=1.

$U_4$ (*unspecified unitary operation*). This operation is not used here to specify a change. Its only function is to shift command to δ. It can be used for control of additional external equipment similar to $U_3$.

4.5 A Detailed Description of the Parts of the Basic Cell

We have already described the principal results of the operation at the level of major time steps. We proceed to show how these results are achieved by means of operation at the minor time step level.

4.5.1 The Clock Pulses (FIG. 19)

Each major time step is divided into four periods. A certain sequence of clock pulses issues from a clock pulse generator near the power pulse generator (or power source) and goes through lines parallel to and having the same geometry as the power lines. This sequence is cyclic and each complete cycle occurs during one major time step. Accordingly, this cycle is divided into the same four periods as the major time step. Each of these four periods except the first is divided into 22 subperiods (called minor time steps) each of length 30 standard gate elements cycle times. The first of the four periods is of length 30 standard gate element cycle times so that it consists of but one minor time step. In all there are 67 minor time steps in a major time step.

In the diagram of the clock pulses, in FIG. 19, during the first time period the small subdivisions in time correspond to the cycle time of the standard gate elements. Each nonzero clock pulse arrives during the last third of the cycle for the standard gate element and, in the terminology of the description of the standard gate element, is a transmission pulse.

The second time period is divided into 22 like subperiods (minor time steps) each containing 30 basic gate element cycle times.

The third time period (minortime steps) each containing 30 basic gate element cycle times.

The fourth time period is divided into 22 like subperiods (minor time steps) each containing 30 basic gate element cycle times.

Therefore, there are 67 subperiods (minor time steps) of length 30 basic gate element cycle times in each major time step, and there are 2010 basic gate element cycle times in each major time step. Hereafter let us refer to the time step of the basic gate element as a micro time step. There are 30 micro time steps in a minor time step and 67 minor time steps in a major time step. Also each major time step is divided into four periods. The first period includes only one minor time step and each of the other three periods includes 22 minor time steps.

4.5.2 Terminology Concerning the Basic cell

Note that FIG. 7 contains both triangular symbols representing standard gate elements and blocks indicating submodules. Circuit diagrams for these submodules are given in terms of the standard gate elements on separate pages. Some of the submodules in the basic cell have identical circuit diagrams. For example, $\tau_1$, $\tau_2$, $\tau_3$, and $\tau_4$ have the same circuit diagrams. That is, they are copies of the same circuit. Also, the α, β, γ, and δ submodules are the same. The $\bar{\alpha}$, σ, and μ submodules are the same. The $\bar{\beta}$, $\bar{\gamma}$, and $\bar{\delta}$ submodules are the same. The $x^+$, $x^1$, $y^+$, $y^1$, $z^+$, and $z^1$ submodules are the same.

Each of the submodules α, β, γ, δ, $\bar{\alpha}$, $\bar{\beta}$, $\bar{\gamma}$, $\bar{\delta}$, $\bar{Q}P$, σ, μ, $\tau_1$, $\tau_2$, $\tau_3$, and $\tau_4$ can operate only as 12-bit shift registers. However, with certain settings they can act otherwise. The submodules α, β, γ, δ, $\bar{\beta}$, $\bar{\gamma}$, and $\bar{\delta}$ can operate only as 12-bit shift registers. The submodule Q operates only as a 6-bit shift register. The $\bar{Q}P$ submodule operates as either a 12-bit or as a 6-bit shift register depending upon its setting.

The registers α, β, γ, δ, and Q together hold the main word W of the basic cell. The registers α, β, γ, δ, and the first half of the $\bar{Q}P$ register hold the auxiliary word $\bar{W}$. We shall call the contents of the registers $\bar{\alpha}$, $\bar{\beta}$, $\bar{\gamma}$, $\bar{\delta}$, $\bar{Q}P$, σ, μ, the "long word." In symbols the long word is $\overline{\alpha\beta\gamma\delta Q}P\sigma\mu$ or, alternatively, $\bar{W}P\sigma\mu$.

Note that there are two columns of gates in front of the main word registers and two columns of gates in front of the long word registers. We assign them ordinal numbers from left to right. So that the second column of gates in front of the main word registers is the column closest to the main word registers and the second column of gates in front of the long word registers is the column closest to the long word registers.

Before giving the detailed description of the integrated functioning of the basic module, we give descriptions of the functionings of the essential submodules (those indicated by the solid line boxes).

4.5.3 The α-Register (FIG. 8)

The submodules $\alpha$, $\beta$, $\gamma$, $\delta$, $\bar{\beta}$, $\bar{\gamma}$, and $\bar{\delta}$ are all like this. In the figure the output is a single line going out to the right and the input is a single line coming in from the left. This is a special sort of 12-bit shift register constructed out of the standard gate elements in the given technology. The 12 gate elements in the horizontal row and having a regular wiring arrangement store the 12 bits of information. For any of these 12 gate elements the state which gives transmission through the lower half (in the figure) corresponds to storage of the bit "1" while the state corresponding to transmission through the upper half corresponds to storage of the bit "0." The rather complicated part of the register to the left of the regular row of 12 standard gate elements is a combination delay and negator. The reason that the negator is so complicated is that we wish to shift the contents of the register to another register by a sequence of 12 T pulses in consecutive micro time steps. The usual more simple type of negator would require a separate micro time step and T pulse to reset before being ready to negate again. This could have been avoided by giving a shift pulse only every other micro time step. Alternatively, it could have been avoided by having two output lines and two input lines, but this would have increased the number of interbasic-cell connections.

The shift pulses arrive at the shift register by means of the line in the upper left corner (according to the figure) of the shift register. The shift pulses are T pulses arriving in groups of 12 consecutive micro time steps. Groups of pulses would arrive on one of the clock pulse lines $I_b$, $II_b$, $III_b$, or $IV_b$. (One can see from the graphs of the clock pulses that the $I_b$, $II_b$, $III_b$, and $IV_b$ lines carry groups of pulses of this type. The $\alpha$-registers are designed for use in the situation where there are two gates in series between $\alpha$-registers. That is, a signal coming out (on the output line) of one $\alpha$-register in a basic module will pass through two gates before entering into another such register (in this or a neighboring basic module) and hence will be delayed by the amount of 2 micro time steps. In addition, the negator in the $\alpha$-register causes a delay of 2 micro time steps. Therefore, there is a delay of 4 micro time steps between the time a pulse leaves the last bit position in one $\alpha$-register and enters the first bit position in the next $\alpha$-register. In view of this we see that the total time for transferring the information from one of these 12-bit shift registers to another is 16 micro time steps even though only 12 shift pulses (in 12 micro time steps) are used.

Note that the information in an $\alpha$-register may be retained during one of the sequences of 12 shift pulses by connecting the output back to the input through two gates in series.

4.5.4 The Q-Register (FIG. 9)

The Q-register is like the $\alpha$-register, except for the fact that it stores only 6 bits instead of 12 bits. However, it is still shifted by the sequence of 12 shift pulses, $I_b$, $II_b$, $III_b$, or $IV_b$. If we have a feedback connecting from the output to the input (through two gates in series), then the information in this Q-register will be retained through any of the sequences of 12 shift pulses, because it will be read back into the register two times. Therefore, if such a feedback is assumed then the information in one Q-register may be read into another Q-register by such a sequence of 12 shift pulses. In this situation the information will be read into the second Q-register two times. Also, if such a feed back is assumed, then the information in a Q-register may be read into an $\alpha$-register by such a sequence of 12 pulses. In this case the information in the Q-register will be copied into the $\alpha$-register two times—once in the first half of the $\alpha$-register and once in the second half.

4.5.5 The Submodule of Gates on a Face (FIG. 13) $y^1$, (Submodules $x^1$, $x^+$, $y^+$, $z^1$, $z^+$)

These six submodules are all the same but are positioned differently; each one is near a different one of the six faces of the cubular basic cell. They control the output of the basic cell to its nearest neighbors.

There are 11 standard gate elements in this submodule. Only the lower half of each is used for transmission of signals. They are all reset to the no transmission position by a single pulse in the reset line. The first seven can be set to the transmission position by a single pulse in the "long word set" line. The seven inputs to these first seven gates correspond to outputs from the seven registers containing "the long word."

The last four gates can be set to the transmission position separately. The four inputs to the last four gates are the outputs from the $\tau_i$-registers.

4.5.6 The $\sigma$-Shift Register (Submodules $\bar{\alpha}$, $\sigma$, $\mu$) (FIG. 10)

These three submodules are the same but fall in different positions in the circuit of the basic cell.

The submodule is the same as an $\alpha$-module with extra circuitry. That is, it contains an $\alpha$-module. If no pulse has arrived on the start line for 10 micro time steps, then it functions exactly like an $\alpha$-module.

The other functioning is initiated by a single pulse (T pulse) in the start line. During the time of this other functioning the contents of the register are not to be shifted (as in the $\alpha$-register mode of operation). After the functioning has been initiated by a single pulse in the start line, two general results appear:

1. A logical decision is made resulting in a single pulse output on one and only one of the seven lines $x^+$, $x^1$, $y^+$, $y^1$, $z^+$, $z^1$, and "zero."
2. The 12-bit word (considered as a local address) is "reduced by one." Both of these results require further explanation.

The result (1) is as follows:

If the local address in the register has each of its three coordinates of magnitude zero, then a single pulse output issues from the "zero" line. (This situation includes the $\infty$ local address.)

If the first coordinate (that is, the $x$-coordinate) of the word in the register is positive, then a single pulse goes out the $x^+$ line. (In the basic cell circuit this pulse goes to the "long word set" line in the $x^+$ gate submodule on the $x^+$ face of the basic cell.) If the first coordinate of the word in the register is negative, then a single pulse goes out the $x^1$ line. If the first coordinate is zero and the second coordinate is positive, then a single pulse goes out the $y^+$ line. If the first coordinate is zero and the second coordinate is negative, then a single pulse goes out the $y^1$ line. If the first two coordinates are zero and the third coordinate is positive, then a single pulse goes out the $z^+$ line. If the first two coordinates are zero and the third coordinate is negative, then a single pulse goes out the $z^1$ line.

The result (2) is as follows:

If at least one of the three coordinates of the local address in the register is nonzero in magnitude, then the first such nonzero coordinate, moving from left to right, is reduced by one in magnitude. We call this operation "reduction" of the local address.

4.5.7 The $\overline{Q}$P-Register (FIG. 11)

If a pulse has most recently entered on the "full" line, then this register operates like an $\alpha$-register.

The twelve outputs $q_1$, $q_2$, $q_3$, $q_4$, 1, 2, 3, 4, 5, 6, 7, 8 are direct readoffs of the states of the last six standard gate elements in the register.

A single pulse in the line "set $P$=$N$" sets the last six standard gate elements to their zero positions.

A single pulse in the line "half" sets the register so that it operates like a Q-register for input but has no output.

4.5.8 The $\tau_i$-Register (Submodules $\tau_1$, $\tau_2$, $\tau_3$, $\tau_4$)(FIG. 12)

This submodule is like the $\sigma$-register, except for the fact that the local address $\infty$ is not considered as the local address of the command cell nor of any cell. Let us go into more detail on this point. If the $\alpha$-register mode of operation is not being used, a single pulse has arrived in the start line, and the local address contained in the register is $\infty$, then no changes are made and no output issues from the $x^+$, $x^1$, $y^+$, $y^1$, $z^+$, $z^1$ or "-zero" lines. Otherwise the local functioning of the outputs on the lines $x^+$, $x^1$, $y^+$, $y^1$, $z^+$, $z^1$, and "zero" is the same as in the "$\sigma$-register." However, the reduction is different. If in the reduction of a local address having not all three of its local coordinates zero, the result will be zero in a coordinate where it previously was nonzero, then this zero is recorded as −0. Also the reduction of a local address having all its coordinates zero is ∞, that is, (+0, +0, +0).

Finally, a single pulse in the line "set to ∞" will set all of the 12 storage gates in the register to their zero position; that is, it will set the stored local address to ∞.

4.5.9 The P-Decoder (FIG. 14)

This submodule merely acts as a logical decoder to find the instruction stored in the last four bits of the 12-bit word in the $\overline{Q}$P-register. Four different inputs to this are used in the four different time periods as indicated in the diagram of the basic cell. The results of the logical decisions are labeled on the diagram. This submodule is the main control for the other submodules.

4.5.10 The Addition and Multiplication Submodules

The addition and multiplication submodules have standard design features which are routine for anyone skilled in the art.

4.6 A Description of the Operation of the Basic Cell In Terms of the Operation of the Submodules (FIG. 7)

The main word in a given basic cell remains unchanged until after the first period of the major time step. If transfer of information is indicated by some command word, then this information is moved by moving the long words. The $\tau_1$, $\tau_2$, $\tau_3$, and $\tau_4$ submodules are used only for shifting operation.

4.6.1 The Operation OPERATION During the First Period of the Major Time Step

The single pulse $I_a$ acts as a reset pulse for the whole basic cell. It resets the gate submodules $x^+$, $x^1$, $y^+$, $y^1$, $z^+$, $z^1$ associated with the six faces of the cell so that no information will be transmitted to neighboring basic cells until some "set" pulse arrives at these gates. The two columns of gates in front of the main word registers and the two columns in front of the long word registers are set to the down position for recycling the contents of these registers in the event of pulse trains $I_b$, $II_b$, $III_b$, or $IV_b$. The gates in front of the $\tau_i$-registers are set to the closed position so that no intracell information will be entered into the $\tau_i$-registers.

In addition, the $I_a$ pulse enters the switching bit gate. If the switching bit is 0 nothing is changed. If the switching bit is 1, then three results occur:

1. The switching bit is set to zero.
2. The gates in front of the $\tau_i$-registers are opened (switched to the position where intracell information can be received).
3. The first column of gates in front of the long word registers are switched to the up position.

Also, $I_a$ sets the register $\overline{Q}$P to act as an α-register, and the last six bits in the $\overline{Q}$P register are set to zero. This concludes the results of the $I_a$ pulse.

The $I_b$ train of pulses has different results depending upon the setting of the gates by the $I_a$ pulse which in turn depended upon the switching bit at the beginning of the first time period.

When the switching bit is zero, the $I_b$ train of pulses recycles all of the registers in the main word and the long word and it sets every gate in the $\tau_i$-register to the zero position (that is, it sets the contents of each $\tau_i$-register to ∞).

If the switching bit is 1 then:

1. The contents of the registers in the main word recycle (leaving the results the same).
2. The 12-bit word in the α-register is copied into the $\overline{\alpha}$-register and the $\tau_1$-register.
3. The word in the β-register is copied into the $\overline{\beta}$-register, the σ-register and the $\tau_2$-register.
4. The word in the γ-register is copied into the $\overline{\gamma}$-register, the μ-register, and the $\tau_3$-register.
5. The word in the δ-register is copied into the $\overline{\delta}$-register and the $\tau_4$-register.
6. The word in the Q-register is copied into the $\overline{Q}$P-register two times leaving two copies of it in the $\overline{Q}$P-register.

There are no more results of the $I_b$ pulse train.

The $I_c$ pulse enters the P-decoder. If the last 4-bit word in the $\overline{Q}$P-register is an instruction other than B, then the contents of the registers $\tau_1$, $\tau_2$, $\tau_3$ are set to ∞. Also, if this instruction is N, $U_1$, or $U_2$, then the word in $\tau_4$ is also set to ∞. Pulse $I_c$ also resets the first column of gates in front of the long word registers to the recycle position and resets the gates by the $\tau_i$-registers so that no intracell information can enter the $\tau_i$-registers.

There are no other results from the $I_c$ pulse.

4.6.2 The Second Time Period

A crude description of the operation in the second time period is reduction on $\overline{\alpha}$. That is the long word is moved to the cell at local address α relative to the command word by reducing the local address $\overline{\alpha}$ one bit of one coordinate at a time and moving the long word one cell in the direction of this reduced bit until $\overline{\alpha}$ is (b 0, 0, 0) and the long word is in the appropriate cell. The movement is completed when $\overline{\alpha}$=(0, 0, 0) and at that time the movement stops and some logical function may occur.

Simultaneously and independently, there is reduction on $\tau_1$, $\tau_2$, $\tau_3$, and $\tau_4$. When these are reduced to ∞, motion stops and if they were unequal to ∞, then the switching bit in the new cell (or cells) is set to one.

Recall that the second time period is broken into 22 subperiods, minor time steps. In each of these minor time steps a single T pulse $II_a$ occurs, followed by a delay and then a train $II_b$ of 12 consecutive T pulses. The operation during each minor time step in the second time period is the same, and therefore we shall describe this operation for a typical minor time step in the second time period.

The $II_a$ pulse acts first as a reset pulse as follows:

1. It resets the first column of gates in front of the long word to the recycle position.
2. It sets the second column of gates in front of the long word to the nonrecycle position so that information can enter the long word registers from the neighboring cells.
3. It resets the $\overline{Q}$P-register so that the $\overline{Q}$P-register operates like an α-register.
4. It resets all of the gate submodules $x^+$, $x^1$, $y^+$, $y^1$, $z^+$, $z^1$ to the no transmission position.

The $II_a$ pulse also initiates logical functions as follows:

1. It enters the P-decoder; and if the last 4-bit word in the $\overline{Q}$P-register is an instruction other than N, I, O, or B, then a pulse emanates from the P-decoder and starts the reduction logic in the $\overline{\alpha}$-register. If the local address in the $\overline{\alpha}$-register is other than (0, 0, 0), then reduction of the local address by one bit occurs and the long word gates on the appropriate face of the cell are set in readiness for transmission of the long word to a neighboring cell (by the $II_b$ pulse train). If the local address $\overline{\alpha}$ is already (0, 0, 0), then a pulse emanates from the "zero" wire of the $\overline{\alpha}$-register, sets the second column of gates in front of the long word registers to the recycle position, and also enters the P-decoder. If the last 4-bit word in the P-decoder is one of the unitary operations $U_1$, $U_2$, $U_3$, or $U_4$, then a pulse goes to the appropriate one of these submodules. If the last 4-bit word in the $\overline{Q}$P-register is F (fan), then a pulse emanates from the P-decoder, sets the $\overline{Q}$P-register to act as a Q-register for input and sets the first column of gates in front of the $\overline{W}$-registers to the up position so that information can be received from the W-registers (the main word registers).
2. The $II_a$ pulse initiates the reduction logic in each $\tau_i$-register. If the local address in a given $\tau_i$-register is ∞, then it is left that way and no action occurs. If the local address in a given $\tau_i$-register is neither (0, 0, 0) nor ∞, then reduction of the local address by one bit occurs and a pulse emanates out from this $\tau_i$-register to set the appropriate gate in the appropriate gate submodule (on a face) so that this reduced local address may be transmitted to a neighboring cell by the $II_b$ pulse train. If the local address in a given $\tau_i$-register is (0, 0, 0) but not ∞, then it is set to ∞ and the switching bit is set to 1.

The $II_b$ pulse train moves information between the registers according to the way that the gates were set by the $II_a$ pulse. For example the long word may be moved to a neighboring cell; the reduced local address in a $\tau_i$-register may be moved to the corresponding $\tau_r$-register in a neighboring cell, the information in the W-register may be copied into the corresponding W-registers. Note that the information in the long word registers and the $\tau_i$-registers may be erased (all standard gates set to their zero position). In general only active information is retained in the long word registers and $\tau_i$-registers. In the long word register the active information may not be used until the third or fourth period, however.

Note that it takes only 21 minor time steps to reduce $\bar{\alpha}$. The 22nd step is for executing the unitary operations and copying W into $\overline{W}$ in the case of the fan instruction.

4.6.3 The Third Time Period

Generally, the long word was moved out to the $\alpha$ local address in the second time period, and the unitary operations were executed at the end of the second time period. For the most part, the third and fourth time periods have to do with the "block instructions" D, F, BB, S, $A_1$, $A_2$, $A_3$, and $A_4$. The main function in the third time period is preparation of the "-block" for movement of information in the block by a "-fanout" operation from the cell in the $\alpha$ address by passing instructional information throughout the long words in the cells in the block. The "fanout" will be done by reduction on $\sigma$.

In addition the $\tau_i$'s will be reduced again as in the second time period. The reason that this has to be done again in this time period is that one of the unitary operations, such as branch on negative or branch on zero, may have set a $\tau_i$ to a word representing a local address other than $\infty$ (for the purpose of making another cell active at the next major time step).

The third time period is composed of 22, like, minor time steps as is the second time period. In each of these minor time steps there occurs a single pulse $III_a$, followed by a delay, followed by a train $III_b$ of 12 pulses. We need to describe only the action in one of these 22 minor time steps since they are all the same. We shall omit the description of the functioning of the $\tau_r$-registers since it is the same as in the second time period.

The $III_a$ pulse acts as reset pulse and as a pulse initiating logical functioning. The reset functioning is the same as the reset functioning of the pulse $II_a$ in the second time period.

The logical functioning is initiated by the entering of pulse $III_a$ into the P-decoder. If the last $\sigma$-bit word in the $\overline{Q}$P-register is one of the instructions D, F, BB, S, $A_1$, $A_2$, $A_3$, or $A_4$ (The block instructions), then a pulse emanates from the P-decoder and goes to the "start" line of the $\sigma$-register, starting the reduction logic in this register. If the local address stored in the $\sigma$-register is nonzero, then it is reduced by one bit and a pulse emanates from the $\sigma$-register to the gate submodule on the appropriate face and sets the long word gates for transmission to the neighboring cell adjacent to this face. If the local address in the $\sigma$-register is (0, 0, 0), then a pulse emanates from the $\sigma$-register out the "zero" line back to the P-decoder. On the way to the P-decoder this pulse sets the second column of gates in front of the long word register to the recycle position. Then if the last 4-bit word in the $\overline{Q}$P-register is any of the instructions D, $A_1$, $A_2$, $A_3$, or $A_4$ (that is, if the information in the main words in the block is to be moved), then a pulse emanates from the P-decoder, sets the $\overline{Q}$P-register to act as a Q-register for inputs, and sets the first column of gates in front of the $\overline{W}$-registers to the nonrecycle position so that the contents of the W-registers will be copied into the $\overline{W}$-registers by the $III_b$ pulse train.

The $III_b$ pulse train transfers the information between registers according to the gate settings made by the pulse $III_a$ and its associated logic.

4.6.4 The Fourth Time Period

The main functioning during the fourth time period has to do with the block movements and the final results of the block instructions D, F, BB, S, $A_1$, $A_2$, $A_3$, $A_4$. The block movements are accomplished by simultaneous reduction on the local addresses in the $\mu$-registers of every cell in the block.

The $\tau_i$ reductions are done again in the fourth timer period although there is no use for them unless other unitary instructions are incorporated.

As in the second and third time periods the fourth time period consists of 22 like minor time steps. Each of these minor time steps has a single pulse $IV_a$, followed by a delay, followed by a pulse train $IV_b$. Therefore, we describe the functioning only for one minor time step.

Again, the single pulse $IV_a$ resets gates and initiates logical functioning. The reset functioning is the same as for $II_a$ and $III_a$ except for the fact that it also resets the first column of gates in front of the main word registers.

The logical functioning initiated by $IV_a$ starts out by the entering of pulse $IV_a$ into the P-decoder. If the last 4-bit word in the $\overline{Q}$P-register is any of the instructions D, F, BB, S, $A_1$then $A_2$, $A_3$, or $A_4$ (the block instructions), then a pulse emanates from the P-decoder, goes to the $\mu$-register, and initiates the reduction logic in the $\mu$-register. If the local address in the $\mu$-register is not (0, 0, 0), then it is reduced by one bit and a pulse emanates from the $\mu$-register going to the gate submodule on the appropriate face of the cell and setting the long word gates for transmission to the neighboring cell. If the local address in the $\mu$-register is (0, 0, 0), then a pulse emanates from the $\mu$-register, goes out the "zero" line and back to the P-decoder. On the way it resets the second column of gates in front of the long word registers to the recycle position. After this pulse arrives at the P-decoder, the following results occur:

1. If the last 4-bit word in the $\overline{Q}$P-register is either of the instructions F or D (fan or duplicate), then a pulse emanates from the P-decoder and sets the first column of gates in front of the main word registers to the nonrecycle position (so that the $IV_b$ pulse train will replace the main word W by a copy of auxiliary word $\overline{W}$).
2. If the last 4-bit word in the $\overline{Q}$P-register is the instruction BB (block branch), then a pulse emanates from the P-decoder and sets the switching bit to 1.
3. If the last 4-bit word in the $\overline{Q}$P-register is the instruction S (shift internal tape loop), then a pulse emanates from the P-decoder, goes to the "internal tape loop and internal tape loop control" submodule, and starts the logical activity of this submodule.
4. If the last 4-bit word in the $\overline{Q}$P-register is one of the instructions $A_1$ or $A_2$ (one of the arithmetic instructions), then a pulse emanates from the P-decoder, goes to the appropriate arithmetic submodule, and actuates it.

The $IV_b$ pulse train makes the transfer of information between the registers as indicated by the gate settings determined by pulse $IV_a$ and its associated logic. The $IV_b$ pulse train is also used in the submodules for the arithmetic instructions and the internal tape loop.

4.7 Avoiding Interference Between Command Words

If one understands the operation at the minor time step level, there is no difficulty in avoiding interference between command words. HOWEVER, we can give some general rules that pertain to the major time step level.

Let us use the term, "rectilinear path from cell A to cell B," to denote the path from A to B obtained by moving first in the $x$-direction, then in the $y$-direction, and then in the $z$-direction—going from A to B. Then we can avoid interference of command cells by avoiding crossing of rectilinear paths related to information transfer specified by the two command cells. However, branch operations specified by different ones of the local address positions $\alpha$, $\beta$, $\gamma$, and $\delta$ can not possibly interfere with each other.

More specific rules could be given, but it is probably easier to learn the functioning at the minor time step level.

V. SHORT WIRE STORAGE SYSTEMS

The short wire storage systems have the same general properties as do short wire computers except that they function only as storage systems. In particular, the properties which they have in common with short wire computers are as follows:

1. They are made of stacks of basic cells (basic storage system cells).
2. They can be made into arbitrarily large stacks of cells without changing the basic cycle time.

3. They can be operated in a wave type of synchrony.
4. They can have their input and output carried out by connections to only one cell at the boundary of the stack. (More than one cell could be used for the input and output but the number of such input-output cells is independent of the size of the stack.)

The short wire storage systems are of three types depending upon the dimension of the stack. The basic storage system cells for the stacks of the three different dimensions are different. However, they make use of common principles. They each contain what we call double register submodules and a control submodule. Again, these are different in the different dimensions. We start by describing these six objects (the double register submodules for each of the three dimensions and the control submodules for each of the three dimensions) in terms of the standard gate elements in the technology under consideration. Then we describe the basic storage system cells in terms of these double register submodules and control submodules in each of the three dimensions.

5.1 The 1-Dimensional Short Wire Storage System

Once we have described the 1-dimensional short wire storage system it will be much easier to understand the 2-and 3-dimensional systems. Let us consider first the nonabbreviated form, FIG. 20*a*, of the diagram for the 1-dimensional short wire storage systems.

The boxes made of dashed lines indicate the cells. They are eight in number in this diagram and they are not all the same. However, they are all the same except for the one at the bottom of the page and the one at the top. The stack may be lengthened arbitrarily by adding more cells in the middle.

The submodule boxes containing the block arrows indicate 1-dimensional double register submodules. The boxes containing no arrow indicate 1-dimensional control submodules. Note that each cell except for the cells at the top and bottom contain two double register submodules and one control submodule. Note also that the double register submodules and their connections form a circle which is collapsed into a line. The block arrow, in the box indicating a double register submodule, indicates the orientation of the double register submodule. The cell at the top of the line differs from those in the middle because it contains the blend in the circle of double register submodules. The cell at the bottom of the line differs from those in the middle because it contains the other bend in the circle of double register submodules and also because it contains the input and output connections to the stack. The asterisk in the double register submodule of the bottom cell indicates that this submodule contains connections which allow the settings of its gates to be changed or sensed from the outside.

Let us consider the details of the 1-dimensional double register submodule (FIG. 21). First of all it contains two shift registers. Let us take them to be $\alpha$-registers from the design of the basic cell in the short wire computer. The $J_a$ and $J_b$ are clock pulses such that the $J_a$ pulse is a single T pulse and the $J_b$ is a train of 12 (in the case of the $\alpha$-register) successive T pulses. There is a delay of at least 6 micro time steps between the $J_a$ pulse and the beginning of $J_b$.

We call the upper register, in the double register submodule, "the main register" and the lower one "the auxiliary register." In general, a move of information around the circle of double register submodules is accomplished by moving the information first to the auxiliary register in the appropriate double register submodules and then moving this information from the auxiliary registers to the main registers.

The control modules (FIG. 22) give the gate settings for these movements. If a given control module is indicated by C, the gate $e$(C) tells whether or not a movement is to be made and the gate $m$(C) tells the direction of movement. However, no movement is made unless a pulse is received in $t$(C') from the control module C' below. Note that the $e$(C) and $m$(C) settings of the control module in the input-output cell are propagated to all of the other control modules in the stack by the $J_a$ pulses.

The $r_1$ and $r_2$ registers hold a counter. If the counter is set to 01 then it counts 10, 11, and 00 by successive $J_a$ pulses. The 00 value remains fixed under $J_a$ pulses. A pulse in the $t$(C') line, when C' is the control submodule in the cell below, sets the registers $r_1$, $r_2$ to the 01 position and the next $J_a$ pulse sends a pulse out the $t$(C) line to the control module in the cell above. Therefore, the 01 setting of the $r_1$ and $r_2$ registers propagate through the stack as do the settings of the $e$(C) and $m$(C) gates.

The counting of the $R_1$ and $R_2$ registers allows the setting of the gates in the double register submodules according to the settings of $e$(C) and $m$(C) and a delay of sufficient time so that the information is transferred from the main registers in the appropriate double register submodules to the auxiliary registers in the appropriate double register submodules of neighboring cells before the lifting operation of moving the information from an auxiliary register to the main register in a double register submodule is performed. The lifting operation is initiated by the count 11 of the $r_1$ and $r_2$ registers. This delay is necessary because the propagation of the move signal through the stack may be opposite to the direction of the move of stored information.

The general functioning, then, is in the form of three successive waves of activity. First, the move signal itself propagates through; then the movement of information in main registers to nearby auxiliary registers, and then the lifting of information from auxiliary registers to main registers. It is essential that there be a delay between the last two waves. Note that the three waves of activity move at the same rate, namely, one cell per $J_a$ pulse. The entire wave packet will have left the input-output cell after four $J_a$ pulses. The move of information will not be completed at this time but all the information necessary to the move will have been entered and, as far as any input and output at the input-output cell is concerned, the move is completed. Therefore, any other move can be initiated at the input-output cell after a delay of four $J_a$ pulses. (This delay would amount to four minor time steps in the short wire computer.)

5.2 The Abbreviated Form of The Wiring Diagram For The 1-Dimensional Short Wire Storage System (FIG. 20*b*)

This abbreviated figure should be compared with the nonabbreviated figure. These abbreviations are in preparation for describing the 2-and 3-dimensional storage systems. The block arrows indicate the 1-dimensional double register submodules. The boxes enclosed by dashed lines indicate cells. The small boxes enclosed by solid lines indicate 1-dimensional control submodules. The lines connecting the block arrows indicate how the 1-dimensional double register submodules are connected.

The arrowed lines indicate how the 1-dimensional control submodules are connected. It is assumed that the 1-dimensional control submodule in a given cell controls all of the 1-dimensional double register submodules in that cell. The block arrow containing the asterisk indicates the double register submodule having extra wires for input and output.

In all of these, the power lines and clock pulse lines have the same geometry as the lines connecting the control submodules.

5.3 The 2-Dimensional Short Wire Storage System

Only the abbreviated diagram, FIG. 23, for the 2-dimensional short wire storage system is presented here. The same conventions are used as in the abbreviated form of the diagram for the 1-dimensional system.

The boxes enclosed by the dashed lines indicate cells. Each cell contains one 2-dimensional control submodule indicated by the small solid line box. The crossed block arrows indicate 2-dimensional double register submodules. Note that any cell, unless it is on the boundary, contains four double register submodules. Assign coordinate directions to the stack. Suppose that the $x$-direction is increasing from left to right in the diagram and that the $y$-direction is increasing from bottom to top. Each interior cell contains four 2-dimensional double register submodules, one in each corner. They are oriented as follows:

1. The $x$-direction of any double register submodule is parallel to, but perhaps opposite in sense, from the $x$-direction of the stack and the $x$-direction of this double register submodule is pointed away from the corner of the cell in which it resides.
2. The $y$-direction of any double register submodule is parallel to the $y$-direction of the stack but perhaps may have opposite sense and the $y$-direction of this double register submodule is pointed away from the corner of the cell in which it resides.

For cells on the boundary of the stack, the double register submodules are omitted from the corners of the cells that touch the outer surface of the stack.

Now we specify the connections between the double register submodules (FIG. 24). The inputs which are in the lower, right corner of the 2dimensional double register submodule pertain only to the 2-dimensional control submodule. The $x^+$side of the submodule refers to the side having the $P_x(M)$ output and a nearby input. This is the side toward which the $x$-arrow is pointing. The $x^1$side of the submodule refers to the side having output $P_x-(M)$ and a nearby input. This is the side from which the $x$-arrow points. The $y^1$side of the submodule is the side having the $P_y-(M)$ output and a nearby input. This is the side from which the $y$-arrow points. For any other orientation the inputs and outputs are appropriately rotated or reflected. It is always the case that the $x^+$side of a double register submodule is connected to the $x^1$side of another double register submodule—outputs to inputs (neglecting the inputs from the control submodule). It is always the case that the $y^+$side of a double register submodule is connected to the $y^1$side of another double register submodule—outputs to inputs.

Now we can give a rule for the connections between the double register submodules in the 2-dimensional storage system. Consider a given double register submodule in a given cell. The $x^+$side of this submodule is connected to the $x^1$side of the double register submodule on the same $x$-line (the same horizontal line), pointing the same direction, in the next cell toward which the $x$-arrow in the given submodule is pointing. If there is no cell on that side of the given cell then the $x^+$side of the given submodule is connected to the $x^1$side of the double register submodule on the same $x$-line, pointing the opposite direction, in the cell on the opposite side. Thus the $x$ parts of the double register submodules are connected in circles lying on horizontal lines. Similarly, the $y$ parts of the double register submodules are connected in circles lying on vertical lines (lines in the $y$-direction of the stack).

The cell with the asterisk is the cell in which the input and output connections are made. The arrowed lines indicate the connections between the control submodules. As in the 1-dimensional case the control submodule, FIG. 25, in a cell is connected to and hence controls all of the double register submodules in that cell. One might note that the movement waves emanate out from the input-output corner cell in straight line waves. This is explained graphically in our paper, "Short Wire Theory I."

The power lines and clock pulse lines have the same geometry as the lines connecting the control submodules.

Although the stack described by the diagram consists of only 25 cells, it is clear that any size rectangular array can be used.

5.4 The 3-Dimensional Short Wire Storage System

We do not give the diagram for the 3-dimensional system because it would have to be in perspective and the number of interconnections is so great that it is easier simply to describe them.

We have given diagrams for the 3-dimensional double register submodules (FIG. 26) and the 3-dimensional control submodule (FIG. 27). A 3-dimensional short wire storage system is a stack of cells in the form of a rectangular solid. The cells are to have The properties which we are about to describe. For the purpose of this description it is convenient to give the stack an orientation. Therefore, we choose an "$x$", a "$y$", and a "$z$" direction for the stack. The arrows indicating these directions all point away from one corner of the stack. The cell in this corner will be the input-output cell.

Each cell will contain one 3-dimensional control submodule. Each cell not on the boundary of the stack will be cubical and contain eight 3-dimensional double register submodules. The cells on the boundary will have deleted the double register submodules which are in the corners nearest the outside surface. The orientation of these double register submodules will be so that the following conditions are satisfied.

1. The arrow indicating the $x$-direction of the orientation will be pointed in either the $x^+$or the $x^1$direction of the stack and so that it is pointed away from the corner of the cell in which this double register submodule resides.
2. The arrow indicating the $y$-direction of the orientation will be pointed in either the $y^+$or $y^1$direction of the stack and so that it is pointed away from the corner of the cell in which this double register submodule resides.
3. The arrow indicating the $z$-direction of the orientation will be pointed in either the $z^+$or $z^1$direction of the stack and so that it is pointed away from the corner of the cell in which this double register submodule resides.

The connections between double register submodules are like those in the 2-dimensional system except that there are three directions instead of two.

Let $w$ indicate any of the three directions $x$, $y$, $z$ of the stack. Consider a line of 3-dimensional double register submodules in the $w$-direction. The $w$-direction parts of these double register submodules are connected so that the following requirements are met.

1. The $w^+$side of any double register submodule in any given cell is connected to the $w^1$side of a double register submodule, which is in a line, in a neighboring cell.
2. The connection pattern forms a circle with the two folds in the circle occurring in cells on the boundary of the stack. Otherwise the connection path goes straight through the cells.

In each cell the 3-dimensional control submodule is connected to all of the 3-dimensional double register submodules in that cell. In addition the shift-data outputs in the control submodule in a given cell are connected to the shift-data inputs in the control submodules of the three adjacent cells in the $x^+$, $y^+$, and $z^+$directions (according to the stack orientation). Therefore, the shift data emanate out in planar waves from the input-output cell in the corner. The combinatorial and geometric properties of this shifting are explained in more detail in "Short Wire Theory I."

VI. A POSSIBLE INPUT-OUTPUT SYSTEM FOR THE UNIVERSAL SHORT WIRE COMPUTER

We refer to the diagram, FIG. 28, of the attachment of the special 1-dimensional short wire storage system to a 3-dimensional short wire computer. The special 1-dimensional short wire storage system is a variation of the short wire storage systems already described. The variation makes it comparable with the short wire computer made of a stack of the basic cells already defined.

In the diagram, the three blocks $\overline{A}$, $\overline{B}$, and $\overline{C}$ represent basic computer cells having but a few minor additions which will be described later in this chapter. In the diagram, the line of three cells, $\overline{A}$, $\overline{B}$, $\overline{C}$, is connected to a single cell on the $x^+$face of the computer. This line of three cells could be connected to any face of the computer. However, it is important that this line be perpendicular to the face it is connected to. The connections between cells $\overline{C}$ and $\overline{B}$, between cells $\overline{B}$ and $\overline{A}$, and between the cell $\overline{A}$ and the adjoining cell in the computer are the same as if these cells were internal to the stack constituting the computer.

The cells A, B, and C are cells in the special 1-dimensional short wire storage system. Cell A is the input-output cell of the storage system. There are no direct connections between any of these cells and cells in the computer stack. However, THERE ARE DIRECT CONNECTIONS BETWEEN A and $\bar{A}$, between B and $\bar{B}$, and between C and $\bar{C}$. These connections are given in the diagram for the special double register submodule in A, B, and C, respectively.

6.1 The Special 1-Dimensional Short Wire Storage System

In the diagram, FIG. 29, for the special 1-dimensional short wire storage system, the large boxes enclosed by the dashed lines indicate cells in the storage system. Each cell contains one 1-dimensional control submodule, FIG. 22, as given in the section on short wire storage systems. These are indicated by solid line boxes containing no symbol. Each cell contains a number of 1-dimensional double register submodules indicated by solid line boxes containing block arrows. Those also containing Greek letters are exceptional and are given in separate FIGS. (30, 31, and 32). In these figures the shift register in the dotted line box is nonfunctional and is given only for purposes of comparison with the 1-dimensional double register submodules. Note that these double register submodules occur in groups of five denoted by four long boxes and one short box. The long boxes indicate 1-dimensional double register submodules containing $\alpha$-registers (12-bit shift registers as in the design of the basic computer cell). The short boxes denote 1-dimensional double register submodules in which the registers are Q-registers (6-bit shift registers as in the design of the basic computer cell).

The main words in any one of the groups of five double register submodules constitute a word of the same length as the main word in a basic computer cell. Note that these groups operate in parallel under instructions from the control submodule in the cell. This is an illustration of combined parallel and sequential transfer of information between cells in the storage system. Such a combination can be used in the higher dimensional storage systems.

In the figure for the special 1-dimensional short wire storage system there are only seven cells and spaces for 12 words of the same length as the main word in a computer cell. As in the section concerning the short wire storage system, this special storage system could be made of any length.

6.2 Clock Pulses For The Special 1-Dimensional Storage System

The special 1-dimensional storage system uses the same power pulse generator and clock pulse generator as does the computer. The $J_a$ pulses are obtained by a join with isolation (and delay) of the $I_a$, $II_a$, $III_a$, and $IV_a$ pulses and the $J_b$ pulses are obtained by a join with isolation (and delay) of the $I_b$, $II_b$, $III_b$, and $IV_b$ pulses, as in the diagram.

6.3 The Connecting Cells $\bar{A}$, $\bar{B}$, and $\bar{C}$

The basic cell $\bar{C}$ is exactly like a basic cell in the computer except for the connections to the cell C in the special 1-dimensional storage system as indicated by FIGS. 30, 31, and 32. The basic cell $\bar{B}$ is exactly like a basic cell in the computer except for the connections to the cell B in the special 1-dimensional storage system as indicated by FIGS. 30, 31, and 32.

The basic cell $\bar{A}$ is exactly like a basic cell in the computer except for the following:

1. The connections to the cell A in the special 1-dimensional storage system are as indicated by FIGS. 30, 31, and 32.
2. It contains an external tape control submodule which in turn is connected to the control submodule of the cell A in the storage system.
3. It contains a start button.

6.4 The External Tape Control Submodule And The Start Button In $\bar{A}$

The external tape control submodule (FIG. 17) is necessary only in cell $\bar{A}$. It will be actuated near the end of the second time period if $\bar{A}$ is the cell having local address $\alpha$ with respect to the command cell. The command cell lies on a line with the cells $\bar{A}$, $\bar{B}$, $\bar{C}$, and $U_3$ is the instruction in the command word. The direction of motion of the tape (the contents of the 1-dimensional special storage system) is positive or negative depending upon whether a pulse enters the submodule on line $q_3$ or $q_4$ which depends in turn upon whether the bit just before the instruction in the command word is 0 or 1, respectively. The amount of motion of the tape (if moved) is always three words. This is arranged by the counter in the external tape control submodule.

There is one more necessary difference between $\bar{A}$ and the basic cells in the computer. $\bar{A}$ should have a control switch or button which the operator of the machine can push and which will set its switching bit to 1 for one major time step.

VII. PROGRAMMING BY MEANS OF THIS INPUT-OUTPUT SYSTEM 7.1 General Principles

Many such input-output systems may be connected to the computer. Computation within the computer may consist of moving the tapes and entering or reading information from all, or several, or just one, of the tapes simultaneously. In addition, one of these tapes can be used to program the computer; that is, to start it functioning to perform specified logical or numerical calculations. The general principles of this type of programming are given in considerable detail in "Short Wire Theory I." At least one of the special 1-dimensional storage systems is arranged with switches or some sort of detachable connections so that it can be disconnected from the computer and loaded with prescribed information (program instructions or data) by means of some switches, buttons, typewriter, or punch card equipment. This is the general physical arrangement for programming the computer. That is, one or more of the storage systems contains prescribed information. Then the storage systems are connected to the machine and then the start button on one of the $\bar{A}$ cells is activated setting the switching bit to 1 in this cell. Then if the information content of the tapes is suitable, the desired calculation will follow. The results of the calculation, including signals about the progress of the calculation, will come out of the computer into one or more of the storage systems. This information may be displayed using suitable equipment or stored in other media capable of bearing information. Storage systems of dimensions 2 and 3 could also be connected to the computer or if suitable buffers and connecting equipment were used, then any standard type of storage such as tape machines, core storage, disk storage, or drum storage could be connected to the computer.

The programming procedure is nontrivial and a good part of "Short Wire Theory I" is devoted to the problem. There is a basic feature of the cells that is essential to this programming: *all of the cells may be made inactive* (their switching bits set to zero) *by an outside control switch.* Along with the grid word of clock pulse lines there is a line which carries the signal from the deactive switch to the DA lead in the basic cell (see FIG. 7).

Another basic principle of the programming is that the desired program is initially fed into the computer in a passive state and then it is made active by setting the switching bit to 1 in a certain cell near the input-output area (the storage system where the program is being entered).

7.2 A General Bootstrap Routine

Although the principles of programming are given in "Short Wire Theory I" in terms of a mathematical model representing the information theoretic functioning of this type of computer, the particular information theoretic functioning of the input-output mechanism of the actual machine described here differs somewhat from the model in the paper. Therefore, a specific "bootstrap routine" is given which applies to the particular input-output system presented here. By the term "bootstrap routine" is meant a method of setting up the distribution of symbols on the tapes so that by pushing the start button on a particular $\bar{A}$ cell the machine will automatically enter the program under consideration.

For this purpose it is assumed that the special 1-dimensional storage system is connected to the stack of basic cells which constitute the short wire computer on the $x^+$face of the stack as depicted in the diagram.

The main principle used here is that of a "building path" as described in "Short Wire Theory I." Some authors have stated that the information may be entered by using a number recorded in a given main word of a basic cell a counter. The present method uses the building paths because this method is independent of the size of the stack.

To facilitate the description of the building paths some abbreviations are assumed for writing specific main words (referred to here simply as "words"). It is best to proceed by example: Using decimal notation the word $$12\bar{0}|01\bar{3}|\bar{7}10|\overline{000}|00D$$

shall indicate the binary word 0001 0010 1000|0000 0001 1011|1111 0001 0000|1000 1000 1000|000100.

In more detail, a local address is represented by three digits (barred or unbarred). An unbarred digit represents a positive coordinate and a barred digit represents a negative coordinate. Each digit in a local address represents a 4-bit binary number as follows:

| | |
|---|---|
| 0 represents 0000 | $\bar{0}$ represents 1000 |
| 1 represents 0001 | $\bar{1}$ represents 1001 |
| 2 represents 0010 | $\bar{2}$ represents 1010 |
| 3 represents 0011 | $\bar{3}$ represents 1011 |
| 4 represents 0100 | $\bar{4}$ represents 1100 |
| 5 represents 0101 | $\bar{5}$ represents 1101 |
| 6 represents 0110 | $\bar{6}$ represents 1110 |
| 7 represents 0111 | $\bar{7}$ represents 1111 |

Also, ∞ represents 000 which in turn represents 0000 0000 0000. In the example, the string of symbols 00D represents a 6-bit word, the first two of which are 00 and the last four of which are the instruction D which was defined to be 0100 in the beginning of the section describing the basic computer cell.

The words on the tape will occur in blocks of three, corresponding to the fact that the tape (storage) is moved three steps (three words) by a single application of the $U_3$ instruction. The programming will be initiated by setting the contents of the special 1-dimensional storage system of a particular one of the described input-output systems on the $x^1$face of the computer. This is called the primary input-output system.

Refer to the table for the starting tape distribution in the primary input-output system.

Block 1 consists of the three words in cells A, B, and C (as indicated) in the special 1-dimensional storage system corresponding to the main words in computer cells $\bar{A}$, $\bar{B}$, and $\bar{C}$, respectively. Block 2 consisting of three words follows consecutively on the tape so that a positive shift of the tape (the storage system) by three steps will cause the three words in Block 2 to be moved into the computer cells $\bar{A}$, $\bar{B}$, and $\bar{C}$ in the order in which these words occur in the list. In general, $k$ shifts of the storage system, by three steps per shift, will cause the words in Block K+1 to be in the computer cells $\bar{A}$, $\bar{B}$, and $\bar{C}$.

In the tables are given the functioning of the bootstrap routine for entering building paths. These tables cover 27 times steps from the time the start button on cell $\bar{A}$ is pushed. In each time step the table shows the words (main words) in the cells $\bar{A}$, $\bar{B}$, and $\bar{C}$, plus the words in a 5×8×1 block of cells in the computer. It is assumed that at the start all cells in the computer are inactive, that is have their switching bits set to zero. The boxes with no numbers in them represent either a zero distribution or an inactive cell. Either interpretation may be used.

At a given time step an active cell (a command cell—a cell with switching bit set to 1) is indicated by an asterisk in the upper right corner of the box representing the cell. Therefore, at time step number 0, when the start button on cell $\bar{A}$ is pushed, the only cell containing an asterisk in the corner is cell $\bar{A}$.

The functioning of each block is such that the information in the block together with the functioning of the computer causes the next block to be entered into the computer. This is why the term "bootstrap" is used. The program causes itself to be fed into the computer.

At time step number 3, the information in blocks 1 and 2 have been read into the computer resulting in the entering of particular words into cells $1e$, $2e$, and $5e$, plus the setting of the switching bit in cell $1e$ to the value 1. These three words in these three cells constitute the root or start of a building path.

A building path is a chain of "sign post" cells (containing sign post words) such that each one has a block of two cells associated with it. The last "sign post" word is different from the rest. All of the sign post cells in a building path except for the last sign post cell contain a "duplicate" instruction which, when actuated, will duplicate the words in the two cells associated with this sign post cell into the two cells associated with the next sign post cell and actuate the next sign post cell. The last sign post cell contains a branch instruction which simply shifts the activity to one of the cells associated with the last sign post cell. Thus, a building path transports a block of two words from the beginning of the path to the end and then actuates one of the cells containing one of these words.

The building path, at time step number 3, contains only one sign post cell, namely $5e$. The two cells associated with it are $3e$ and $4e$. Since this path has only one sign post cell it is both the first and the last and there are no intermediate sign post cells.

The 3 and 4 blocks of information on the tape act to extend the building path by one sign post. Block 3 builds the end sign post of the new path and it is in cell $5b$ at time step number 8. Block 4 changes the end sign post in the old path into an intermediate sign post in the new path by replacing the branch instruction word in this cell by the appropriate duplicate instruction word. This is completed by time step number 11.

Blocks 5 and 6 extend the path by one more sign post. Block 5 builds the end sign post for the new path (in cell $3a$ at time step number 15). Block 6 converts the end sign post in the old path to an intermediate sign post in the new path (cell $5b$ at time step number 18).

This procedure could be continued and the path could be extended to any part of the computer. In so doing, care should be taken so that the path does not loop back on itself and disturb its own functioning.

Block 7 acts to enter data word $W_3$ in a prescribed cell in the influence area of the end sign post of the path. (This cell could also be activated by a block of data going along the path, but for now it is better to consider it as being inactive.) Therefore, a given data word could be placed in any cell in the computer.

Block 8 acts to shorten the path by converting the intermediate sign post, next to the end sign post, into an end sign post (time step number 25). In the example, information block 9 follows directly behind the path shortening block 8. (It happens that, in this example, no interference is caused by this close spacing, but in general it would be better to follow each path shortening block by a delay block like block 10.)

After the path is shortened by one sign post, the old end sign post could be erased like block 9 with words $W_5$ and $V_5$ if $W_5$ is the zero word. In general the path may be extended to any part of the computer, shortened by any amount, and then extended any amount in another direction. Also, any data word may be entered in any prescribed cell in the influence area of the last sign post. Therefore, any passive distribution of words in the computer can be entered by building them up—starting with the side of the computer farthest from the primary input-output cells $\bar{A}$, $\bar{B}$, $\bar{C}$, and working back toward the primary input-output area. Accordingly, programs will be entered in passive form and then activated by making one cell near the primary input-output area active by entering one final block of information in the path which now may be rather short.

TABLE 1 OF CHAPTER 7.—THE STARTING TAPE DISTRIBUTION IN THE PRIMARY INPUT-OUTPUT SYSTEM

| | | | | | | |
|---|---|---|---|---|---|---|
| Block 1 | A | $\bar{2}00$ | $\bar{1}00$ | 300 | 100 | 00D |
| | B | $\bar{1}00$ | 300 | ∞ | α | 00B |
| | C | $\bar{1}00$ | ∞ | ∞ | $\bar{1}00$ | $00U_3$ |
| Block 2 | A | $\bar{1}00$ | $\bar{1}00$ | 600 | 100 | 00D |
| | B | ∞ | ∞ | $\bar{1}00$ | ∞ | 00D |
| | C | ∞ | ∞ | ∞ | ∞ | 00N |
| Block 3 | A | $\bar{2}00$ | $\bar{1}00$ | 500 | 200 | 00D |
| | B | $\bar{1}00$ | $\bar{1}00$ | 230 | ∞ | 00D |
| | C | ∞ | ∞ | $\bar{1}00$ | ∞ | 00B |
| Block 4 | A | $\bar{2}00$ | $\bar{1}00$ | 500 | 200 | 00D |
| | B | $\bar{1}00$ | $\bar{1}00$ | 200 | ∞ | 00D |
| | C | $\bar{2}00$ | $\bar{1}00$ | 030 | 030 | 00D |
| Block 5 | A | $\bar{2}00$ | $\bar{1}00$ | 500 | 200 | 00D |
| | B | | | $V_1$ | | |
| | C | | | $W_1$ | | |
| Block 6 | A | $\bar{2}00$ | $\bar{1}00$ | 500 | 200 | 00P |
| | B | | | $V_2$ | | |
| | C | | | $W_2$ | | |
| Block 7 | A | $\bar{2}00$ | $\bar{1}00$ | 500 | 200 | 00D |
| | B | | | $V_3$ | | |
| | C | | | $W_3$ | | |
| Block 8 | A | $\bar{2}00$ | $\bar{1}00$ | 500 | 200 | 00D |
| | B | | | $V_4$ | | |
| | C | | | $W_4$ | | |
| Block 9 | A | $\bar{2}00$ | $\bar{1}00$ | 500 | 200 | 00D |
| | B | | | $V_5$ | | |
| | C | | | $W_5$ | | |
| Block 10 | A | 100 | ∞ | ∞ | ∞ | 00B |
| | B | ∞ | ∞ | ∞ | ∞ | 00N |
| | C | ∞ | ∞ | ∞ | ∞ | 00N |
| Block 11 | A | 200 | 100 | 500 | 200 | 00D |
| | B | | | $V_7$ | | |
| | C | | | $W_7$ | | |

The following additional comments apply to the various time steps of Table 2, Chapter 7, which describe the functioning of the cells.

Time step 0.... When the starting means is activated.

Time step 4.... Begin extending the path.

Time step 10... $W_1$ and $V_1$ are data for making a new end point of the path. $W_1$ = ∞ ∞ $\bar{1}00$ ∞ 00B; $V_1$ = $\bar{1}00$ $\bar{1}00$ 010 ∞ ∞ D.

Time step 11... Ending for the path extension.

Time step 13... $W_2$ and $V_2$ are data for replacing the old end point of the path by a "duplicate" instruction. $W_2$ = $\bar{2}00$ $\bar{1}00$ $\bar{2}10$ $\bar{2}10$ 00D; $V_2$ = $\bar{1}00$ $\bar{1}00$ 200 ∞ 00D.

Time step 16..S $W_3$ is a data word to be entered in some cell in the influence area of the end of the path. $V_3$ = $\bar{1}00$ $\bar{1}00$ $0\bar{2}0$ ∞ 00D.

Time step 19... $W_4$ and $V_4$ are data which shorten the building path by one step. $W_4$ = ∞ ∞ $\bar{1}00$ ∞ 00B; $V_4$ = $\bar{1}00$ $\bar{1}00$ $4\bar{1}0$ ∞ 00D.

Time step 22... $V_5$ = $\bar{1}00$ $\bar{1}00$ 010 ∞ 00D.

Time step 25... $\bar{X}$ is a delay instruction.

VIII. THE GENERAL SYSTEM

In FIG. 1, the general system is illustrated. Two separate arrays of cells are connected to each other by a simple additional small array of cells. The added cells are connected to the large arrays by the same methods that cells are connected within the arrays; thus, a new and larger array is formed.

Lines of cells may be connected from the large array to external digital devices, such as: various short wire storage systems, conventional storage systems of either magnetic tape or of magnetic disk type, card read-punch units, printers, optical readers, sequential digital computers, etc. The lines of cells may have any number of cells in cross section; a larger number will facilitate information transfer through the line. Various intermediate sized arrays are of great utility when placed along the lines, since they provide increased programming capacity at the junctions of lines or at bends in the lines or at information transmission buffering positions.

TABLE 2 OF CHAPTER 7.—FUNCTIONING OF THE BOOTSTRAP ROUTINE FOR ENTERING BUILDING PATHS $\bar{C}$ $\bar{B}$ $\bar{X}$ $\bar{1}00$ ∞ ∞ $\bar{1}00$ $00U_3$ | 100 300 ∞ ∞ 00B | $\bar{2}00$ $\bar{1}00$ 300 100 00D* | → Time step 0

| | 1 | 2 | 3 | 4 | 5 | |
|---|---|---|---|---|---|---|
| | -- -- -- -- -- | -- -- -- -- -- | -- -- -- -- -- | -- -- -- -- -- | -- -- -- -- -- | a |
| | -- -- -- -- -- | -- -- -- -- -- | -- -- -- -- -- | -- -- -- -- -- | -- -- -- -- -- | b |
| | -- -- -- -- -- | -- -- -- -- -- | -- -- -- -- -- | -- -- -- -- -- | -- -- -- -- -- | c |
| | -- -- -- -- -- | -- -- -- -- -- | -- -- -- -- -- | -- -- -- -- -- | -- -- -- -- -- | d |
| → | -- -- -- -- -- | -- -- -- -- -- | -- -- -- -- -- | -- -- -- -- -- | -- -- -- -- -- | e |
| | -- -- -- -- -- | -- -- -- -- -- | -- -- -- -- -- | -- -- -- -- -- | -- -- -- -- -- | f |
| | -- -- -- -- -- | -- -- -- -- -- | -- -- -- -- -- | -- -- -- -- -- | -- -- -- -- -- | g |
| | -- -- -- -- -- | -- -- -- -- -- | -- -- -- -- -- | -- -- -- -- -- | -- -- -- -- -- | h |

$\bar{1}00$ ∞ ∞ $\bar{1}00$ $00U_3$ | $\bar{1}00$ 300 ∞ ∞ 00B | $\bar{2}00$ $\bar{1}00$ 300 100 00D | → Time step 1

| | | | | | | |
|---|---|---|---|---|---|---|
| | --- -- -- --- ------- | --- --- -- -- ----- | -- -- -- -- -- | -- -- -- -- -- | -- -- -- -- -- | a |
| | --- -- -- --- ------- | --- --- -- -- ----- | -- -- -- -- -- | -- -- -- -- -- | -- -- -- -- -- | b |
| | --- -- -- --- ------- | --- --- -- -- ----- | -- -- -- -- -- | -- -- -- -- -- | -- -- -- -- -- | c |
| | --- -- -- --- ------- | --- --- -- -- ----- | -- -- -- -- -- | -- -- -- -- -- | -- -- -- -- -- | d |
| → | $\bar{1}00$ ∞ ∞ $\bar{1}00$ $00U_3$* | $\bar{1}00$ 300 ∞ ∞ 00B | -- -- -- -- -- | -- -- -- -- -- | -- -- -- -- -- | e |
| | --- -- -- --- ------- | --- --- -- -- ----- | -- -- -- -- -- | -- -- -- -- -- | -- -- -- -- -- | f |
| | --- -- -- --- ------- | --- --- -- -- ----- | -- -- -- -- -- | -- -- -- -- -- | -- -- -- -- -- | g |
| | --- -- -- --- ------- | --- --- -- -- ----- | -- -- -- -- -- | -- -- -- -- -- | -- -- -- -- -- | h |

-- -- -- -- -- | ∞ ∞ $\bar{1}00$ ∞ 00B | $\bar{1}00$ $\bar{1}00$ 600 100 00D* | → Time step 2

| | | | | | | |
|---|---|---|---|---|---|---|
| | --- -- -- --- ------- | --- --- -- -- ----- | -- -- -- -- -- | -- -- -- -- -- | -- -- -- -- -- | a |
| | --- -- -- --- ------- | --- --- -- -- ----- | -- -- -- -- -- | -- -- -- -- -- | -- -- -- -- -- | b |
| | --- -- -- --- ------- | --- --- -- -- ----- | -- -- -- -- -- | -- -- -- -- -- | -- -- -- -- -- | c |
| | --- -- -- --- ------- | --- --- -- -- ----- | -- -- -- -- -- | -- -- -- -- -- | -- -- -- -- -- | d |
| → | $\bar{1}00$ ∞ ∞ $\bar{1}00$ $00U_3$ | $\bar{1}00$ 300 ∞ ∞ 00B | -- -- -- -- -- | -- -- -- -- -- | -- -- -- -- -- | e |
| | --- -- -- --- ------- | --- --- -- -- ----- | -- -- -- -- -- | -- -- -- -- -- | -- -- -- -- -- | f |
| | --- -- -- --- ------- | --- --- -- -- ----- | -- -- -- -- -- | -- -- -- -- -- | -- -- -- -- -- | g |

TABLE 2 OF CHAPTER 7.—FUNCTIONING OF THE BOOTSTRAP ROUTINE FOR ENTERING BUILDING PATHS—Continued . . . . . . . . . | ∞ ∞$\bar{1}$00 ∞ 00B $\bar{1}$00 $\bar{1}$00 600 100 00D | → — Time step 3

| | | | | | | |
|---|---|---|---|---|---|---|
| | | | | | | a |
| | | | | | | b |
| | | | | | | c |
| | | | | | | d |
| → | $\bar{1}$00 ∞ ∞ $\bar{1}$00 00$U_1$* | $\bar{1}$00 300 ∞ ∞ 00B | | | ∞ ∞ $\bar{1}$00 ∞ 00B | e |
| | | | | | | f |
| | | | | | | g |
| | | | | | | h |

∞ ∞ $\bar{1}$00 ∞ 00B | $\bar{1}$00 $\bar{1}$00 230 ∞ 00D | $\bar{2}$00 $\bar{1}$00 600 200 00D |→ — Time step 4

| | | | | | | |
|---|---|---|---|---|---|---|
| | | | | | | a |
| | | | | | | b |
| | | | | | | c |
| | | | | | | d |
| → | $\bar{1}$00 ∞ ∞ $\bar{1}$00 00$U_1$ | $\bar{1}$00 300 ∞ ∞ 00B | | | ∞ ∞$\bar{1}$00 ∞ 00B | e |
| | | | | | | f |
| | | | | | | g |
| | | | | | | h |

∞ ∞ $\bar{1}$00 ∞ 00B | $\bar{1}$00 $\bar{1}$00 230 ∞ 00D | $\bar{2}$00 $\bar{1}$00 500 200 00D |→ — Time step 5

| | | | | | | |
|---|---|---|---|---|---|---|
| | | | | | | a |
| | | | | | | b |
| | | | | | | c |
| | | | | | | d |
| → | $\bar{1}$00 ∞ ∞ $\bar{1}$00 00$U_1$ | $\bar{1}$00 300 ∞ ∞ 00B* | ∞ ∞ $\bar{1}$00 ∞ 00B | $\bar{1}$00 $\bar{1}$00 230 ∞ 00D | ∞ ∞ $\bar{1}$00 ∞ 00B | e |
| | | | | | | f |
| | | | | | | g |
| | | | | | | h |

∞ ∞ $\bar{1}$00 ∞ 00B | $\bar{1}$00 $\bar{1}$00 230 ∞ 00D | $\bar{2}$00 $\bar{1}$00 600 200 00D | → — Time step 6

| | | | | | | |
|---|---|---|---|---|---|---|
| | | | | | | a |
| | | | | | | b |
| | | | | | | c |
| | | | | | | d |
| → | $\bar{1}$00 ∞ ∞ $\bar{1}$00 00$U_1$* | $\bar{1}$00 300 ∞ ∞ 00B | ∞ ∞ $\bar{1}$00 ∞ 00B | $\bar{1}$00 $\bar{1}$00 230 ∞ 00D | ∞ ∞ $\bar{1}$00 ∞ 00B* | e |
| | | | | | | f |
| | | | | | | g |
| | | | | | | h |

$\bar{2}$00 $\bar{1}$00 030 030 00D | $\bar{1}$00 $\bar{1}$00 200 ∞ 00D | $\bar{2}$00 $\bar{1}$00 500 200 00D* |→ — Tim step 7

| | | | | | | |
|---|---|---|---|---|---|---|
| | | | | | | a |
| | | | | | | b |
| | | | | | | c |
| | | | | | | d |
| → | $\bar{1}$00 ∞ ∞ $\bar{1}$00 00$U_1$ | $\bar{1}$00 300 ∞ ∞ 00B | ∞ ∞ $\bar{1}$00 ∞ 00B | $\bar{1}$00 $\bar{1}$00 230 ∞ 00D* | ∞ ∞ $\bar{1}$00 ∞,00B | e |
| | | | | | | f |
| | | | | | | g |
| | | | | | | h |

$\bar{2}$00 $\bar{1}$00 030 030 00D | $\bar{1}$00 $\bar{1}$00 200 ∞ 00D | $\bar{2}$00 $\bar{1}$00 500 200 00D |→ — Time step 8

| | | | | | | |
|---|---|---|---|---|---|---|
| | | | | | | a |
| | | | | | ∞ ∞ $\bar{1}$00 ∞ 00B | b |
| | | | | | | c |
| | | | | | | d |
| | $\bar{1}$00 ∞ ∞ $\bar{1}$00 00$U_1$ | $\bar{1}$00 300 ∞ ∞ 00B* | $\bar{2}$00 $\bar{1}$00 030 030 00D | $\bar{1}$00 $\bar{1}$00 200 ∞ 00D | ∞ ∞ $\bar{1}$00 ∞ 00B | e |
| | | | | | | f |
| | | | | | | g |
| | | | | | | h |

$\bar{2}$00 $\bar{1}$00 030 030 00D | $\bar{1}$00 $\bar{1}$00 200 ∞ 00D | $\bar{2}$00 $\bar{1}$00 500 200 00D | → — Time step 9

| | | | | | | |
|---|---|---|---|---|---|---|
| | | | | | | a |
| | | | | | ∞ ∞ $\bar{1}$00 ∞ 00B | b |
| | | | | | | c |
| | | | | | | d |
| → | $\bar{1}$00 ∞ ∞ $\bar{1}$00 00$U_1$* | $\bar{1}$00 300 ∞ ∞00B | $\bar{2}$00 $\bar{1}$00 030 030 00D | $\bar{1}$00 $\bar{1}$00 200 ∞ 00D | ∞ ∞ $\bar{1}$00 ∞ 00B* | e |
| | | | | | | f |
| | | | | | | g |
| | | | | | | h |

TABLE 2 OF CHAPTER 7.—FUNCTIONING OF THE BOOTSTRAP ROUTINE FOR ENTERING BUILDING PATHS—Continued $W_1$ | $V_1$ | $\bar{2}00$ $\bar{1}00$ 500 200 00D* | → Time step 10

| | | | | | |
|---|---|---|---|---|---|
| | | | | | a |
| | | | | ∞ ∞ $\bar{1}00$ ∞ 00B | b |
| | | | | | c |
| | | | | | d |
| $\bar{1}00$ ∞ ∞ $\bar{1}00$ 00$U_1$ | $\bar{1}00$ 300 ∞ ∞ 00B | $\bar{2}00$ $\bar{1}00$ 030 030 00D | $\bar{1}00$ $\bar{1}00$ 200 ∞ 00D* | ∞ ∞ $\bar{1}00$ ∞ 00B | e |
| | | | | | f |
| | | | | | g |
| | | | | | h |

$W_1$ | $V_1$ | $\bar{2}00$ $\bar{1}00$ 500 200 00D | → Time step 11

| | | | | | |
|---|---|---|---|---|---|
| | | | | | a |
| | | | | ∞ ∞ $\bar{1}00$ ∞ 00B | b |
| | | | | | c |
| | | | | | d |
| →$\bar{1}00$ ∞ ∞ $\bar{1}00$ 00$U_1$ | $\bar{1}00$ 300 ∞ ∞ 00B* | $W_1$ | $V_1$ | $\bar{2}00$ $\bar{1}00$ 030 030 00D | e |
| | | | | | f |
| | | | | | g |
| | | | | | h |

$W_1$ | $V_1$ | 200 100 500 200 00D | → Time step 12

| | | | | | |
|---|---|---|---|---|---|
| | | | | | a |
| | | | | ∞ ∞ 100 ∞ 00B | b |
| | | | | | c |
| | | | | | d |
| →$\bar{1}00$ ∞ ∞ $\bar{1}00$ 00$U_1$* | $\bar{1}00$ 300 ∞ ∞ 00B | $W_1$ | $V_1$ | $\bar{2}00$ $\bar{1}00$ 030 030 00D* | e |
| | | | | | f |
| | | | | | g |
| | | | | | g |

$W_2$ | $V_2$ | $\bar{2}00$ $\bar{1}00$ 500 200 00D* | → Time step 13

| | | | | | |
|---|---|---|---|---|---|
| | | | | | a |
| | | $W_1$ | $V_1$ | ∞ ∞ $\bar{1}00$ ∞ 00B* | b |
| | | | | | c |
| | | | | | d |
| →$\bar{1}00$ ∞ ∞ $\bar{1}00$ 00$U_1$ | $\bar{1}00$ 300 ∞ ∞ 00B | $W_1$ | $V_1$ | $\bar{2}00$ $\bar{1}00$ 030 030 00D | e |
| | | | | | f |
| | | | | | g |
| | | | | | h |

$W_2$ | $V_2$ | $\bar{2}00$ $\bar{1}00$ 500 200 00D | → Time step 14

| | | | | | |
|---|---|---|---|---|---|
| | | | | | a |
| | | $W_1$ | $V_1$ | ∞ ∞ $\bar{1}00$ ∞ 00B* | b |
| | | | | | c |
| | | | | | d |
| →$\bar{1}00$ ∞ ∞ $\bar{1}00$ 00$U_1$ | $\bar{1}00$ 300 ∞ ∞ 00B* | $W_2$ | $V_2$ | $\bar{2}00$ $\bar{1}00$ 030 030 00D | e |
| | | | | | f |
| | | | | | h |
| | | | | | h |

$W_2$ | $V_2$ | $\bar{2}00$ $\bar{1}00$ 500 200 00D | → Time step 15

| | | | | | |
|---|---|---|---|---|---|
| | | ∞ ∞ $\bar{1}00$ ∞ 00B | | | a |
| | | $W_1$ | $V_1$ | ∞ ∞ $\bar{1}00$ ∞ 00B | b |
| | | | | | c |
| | | | | | d |
| →$\bar{1}00$ ∞ ∞ $\bar{1}00$ 00$U_1$* | $\bar{1}00$ 300 ∞ ∞ 00B | $W_2$ | $V_2$ | $\bar{2}00$ $\bar{1}00$ 030 030 00D* | e |
| | | | | | f |
| | | | | | g |
| | | | | | h |

$W_3$ | $V_3$ | $\bar{2}00$ $\bar{1}00$ 500 200 00D* → Time step 16

| | | | | | |
|---|---|---|---|---|---|
| | | ∞ ∞ $\bar{1}00$ ∞ 00B | | | a |
| | | $W_2$ | $V_2$ | ∞ ∞ $\bar{1}00$ ∞ 00B* | b |
| | | | | | c |
| | | | | | d |
| →$\bar{1}00$ ∞ ∞ $\bar{1}00$ 00$U_1$ | $\bar{1}00$ 300 ∞ ∞ 00B | $W_2$ | $V_2$ | $\bar{2}00$ $\bar{1}00$ 030 030 00D | e |
| | | | | | f |
| | | | | | g |
| | | | | | h |

TABLE 2 OF CHAPTER 7.—FUNCTIONING OF THE BOOTSTRAP ROUTINE FOR ENTERING BUILDING PATHS—Continued

| $W_3$ | $V_2$ $\bar{2}00$ $\bar{1}00$ 500 200 00D → | | | Time step 17 | |
|---|---|---|---|---|---|
| | | ∞ ∞ $\bar{1}00$ ∞ 00B | | | a |
| | | $W_2$ | $V_2$ | ∞ ∞ $\bar{1}00$ ∞ 00B | b |
| | | | | | c |
| | | | | | d |
| →$\bar{1}00$ ∞ ∞ $\bar{1}00$ 00$U_3$ | $\bar{1}00$ 300 ∞ ∞ 00B* | $W_3$ | $V_3$ | $\bar{2}00$ $\bar{1}00$ 030 030 00D | e |
| | | | | | f |
| | | | | | g |
| | | | | | h |

| $W_3$ | $V_3$ $\bar{2}00$ $\bar{1}00$ 500 200 00D → | | | Time step 18 | |
|---|---|---|---|---|---|
| | | ∞ ∞ $\bar{1}00$ ∞ 00B | | | a |
| | | $W_3$ | $V_2$ | $\bar{2}00$ $\bar{1}00$ $\bar{2}10$ $\bar{2}10$ 00D | b |
| | | | | | c |
| | | | | | d |
| →$\bar{1}00$ ∞ ∞ $\bar{1}00$ 00$U_3$* | $\bar{1}00$ 300 ∞ ∞ 00B | $W_3$ | $V_3$ | $\bar{2}00$ $\bar{1}00$ 030 030 00D* | e |
| | | | | | f |
| | | | | | g |
| | | | | | h |

| $W_4$ $V_4$ $\bar{2}00$ $\bar{1}00$ 500 200 00D* → | | | | Time step 19 | |
|---|---|---|---|---|---|
| | | ∞ ∞ $\bar{1}00$ ∞ 00B | | | a |
| | | $W_3$ | $V_3$ | $\bar{2}00$ $\bar{1}00$ $\bar{2}10$ $\bar{2}10$ 00D* | b |
| | | | | | c |
| | | | | | d |
| → $\bar{1}00$ ∞ ∞ $\bar{1}00$ 00$U_3$ | $\bar{1}00$ 300 ∞ ∞ 00B | $W_3$ | $V_3$ | $\bar{2}00$ $\bar{1}00$ 030 030 00D | e |
| | | | | | f |
| | | | | | g |
| | | | | | h |

| $W_4$ $V_4$ $\bar{2}00$ $\bar{1}00$ 500 200 00D → | | | | Time step 20 | |
|---|---|---|---|---|---|
| $W_3$ | $V_3$ | ∞ ∞ $\bar{1}00$ ∞ 00B* | | | a |
| | | $W_3$ | $V_3$ | $\bar{2}00$ $\bar{1}00$ $\bar{2}10$ $\bar{2}10$ 00D | b |
| | | | | | c |
| | | | | | d |
| → $\bar{1}00$ ∞ ∞ $\bar{1}00$ 00$U_3$ | $\bar{1}00$ 300 ∞ ∞ 00B* | $W_4$ | $V_4$ | $\bar{2}00$ $\bar{1}00$ 030 030 00D | e |
| | | | | | f |
| | | | | | g |
| | | | | | h |

| $W_4$ | $V_4$ $\bar{2}00$ $\bar{1}00$ 500 200 00D → | | | Time step 21 | |
|---|---|---|---|---|---|
| $W_3$ | $V_3$ * | ∞ ∞ $\bar{1}00$ ∞ 00B | | | a |
| | | $W_3$ | $V_3$ | $\bar{2}00$ $\bar{1}00$ $\bar{2}10$ $\bar{2}10$ 00D | b |
| | | | | | c |
| | | | | | d |
| → $\bar{1}00$ ∞ ∞ $\bar{1}00$ 00$U_3$* | $\bar{1}00$ 300 ∞ ∞ 00B | $W_4$ | $V_4$ | $\bar{2}00$ $\bar{1}00$ 030 030 00D* | e |
| | | | | | f |
| | | | | | g |
| | | | | | h |

| $W_5$ | $V_5$ $\bar{2}00$ $\bar{1}00$ 500 200 00D* → | | | Time step 22 | |
|---|---|---|---|---|---|
| $W_3$ | $V_3$ | ∞ ∞ $\bar{1}00$ ∞ 00B | | | a |
| | | $W_4$ | $V_4$ | $\bar{2}00$ $\bar{1}00$ $\bar{2}10$ $\bar{2}10$ 00D* | b |
| $W^3$ | | | | | c |
| | | | | | d |
| → $\bar{1}00$ ∞ ∞ $\bar{1}00$ 00$U_3$ | $\bar{1}00$ 300 ∞ ∞ 00B | $W_4$ | $V_4$ | $\bar{2}00$ $\bar{1}00$ 030 030 00D | e |
| | | | | | f |
| | | | | | g |
| | | | | | h |

| $W_5$ $V_5$ $\bar{2}00$ $\bar{1}00$ 500 200 00D → | | | | Time step 23 | |
|---|---|---|---|---|---|
| $W_4$ | $V_4$ | ∞ ∞ $\bar{1}00$ ∞ 00B* | | | a |
| | | $W_4$ | $V_4$ | $\bar{2}00$ $\bar{1}00$ $\bar{2}10$ $\bar{2}10$ 00D | b |
| $W_3$ | | | | | c |
| | | | | | d |
| →100 ∞ ∞ 100 00$U_3$ | 100 300 ∞ ∞ 00B* | $W_5$ | $V_5$ | $\bar{2}00$ $\bar{1}00$ 030 030 00D | e |
| | | | | | f |
| | | | | | g |
| | | | | | h |

TABLE 2 OF CHAPTER 7. FUNCTIONING OF THE BOOTSTRAP ROUTINE FOR ENTERING BUILDING PATHS—Continued

| $W_5$ | $V_5$ | $\bar{2}00$ $\bar{1}00$ 500 200 00D → | | Time step 24 | |
|---|---|---|---|---|---|
| $W_4$ | $V_4$ | * ∞ ∞ 100 ∞ 00B | | | a |
| | | $W_4$ | $V_4$ | $\bar{2}00$ $\bar{1}00$ $\bar{2}10$ $\bar{2}10$ 00D | b |
| $W_3$ | | | | | c |
| | | | | | d |
| →100 ∞ ∞ 100 00$U_3$* | $\bar{1}00$ 300 ∞ ∞ 00B | $W_5$ | $V_5$ | $\bar{2}00$ $\bar{1}00$ 030 030 00D* | e |
| | | | | | f |
| | | | | | g |
| | | | | | h |

| | | 100 ∞ ∞ ∞ 00B* →| | | Time step 25 | |
|---|---|---|---|---|---|
| $W_4$ | $V_4$ | ∞ ∞ $\bar{1}00$ ∞ 00B | | | a |
| | | $W_5$ | $V_5$ | ∞ ∞ $\bar{1}00$ ∞ 00B * | b |
| $W_3$ | | | | | c |
| | | | | | d |
| → $\bar{1}00$ ∞ ∞ $\bar{1}00$ 00$U_3$ | $\bar{1}00$ 300 ∞ ∞ 00B | $W_5$ | $V_5$ | $\bar{2}00$ $\bar{1}00$ 030 030 00D | e |
| | | | | | f |
| | | | | | g |
| | | | | | h |

| | | 100 ∞ ∞ ∞ 00B →| | | Time step 26 | |
|---|---|---|---|---|---|
| $W_4$ | $V_4$ | ∞ ∞ $\bar{1}00$ ∞ 00B | | | a |
| | | $W_5$ | $V_5$ | * ∞ ∞ $\bar{1}00$ ∞ 00B | b |
| $W_3$ | | | | | c |
| | | | | | d |
| → $\bar{1}00$ ∞ ∞ $\bar{1}00$ 00$U_3$* | $\bar{1}00$ 300 ∞ ∞ 00B | $W_5$ | $V_5$ | $\bar{2}00$ $\bar{1}00$ 030 030 00D | e |
| | | | | | f |
| | | | | | g |
| | | | | | h |

| $W_7$ | $V_7$ | $\bar{2}00$ $\bar{1}00$ 500 200 00D* →| | Time step 27 | |
|---|---|---|---|---|---|
| $W_4$ | $V_4$ | $W_5$ | | | a |
| | | $W_5$ | $V_5$ | ∞ ∞ $\bar{1}00$ ∞ 00B | b |
| $W_3$ | | | | | c |
| | | | | | d |
| →$\bar{1}00$ ∞ ∞ $\bar{1}00$ 00$U_3$ | $\bar{1}00$ 300 ∞ ∞ 00B | $W_5$ | $V_5$ | $\bar{2}00$ $\bar{1}00$ 030 030 00D | e |
| | | | | | f |
| | | | | | g |
| | | | | | h |

The power and clock pulse supply means distribute pulses over the entire array in such a fashion that no influence area of any cell will have in it more than one such pulse at any one time. The starting and deactivating means in the control panel affect the entire array, either all at once or else by selected regions. A single large program can be entered into the computer from one or several storage units, or a number of separate problems can be run at one time by entering from different storage units into different sections of the computing array.

Whereas there are here illustrated and specifically described certain preferred constructions of apparatus which are presently regarded as the best mode of carrying out the invention, it should be understood that various changes may be made and other constructions adopted without departing from the inventive subject matter.

We claim:

1. A digital computing and information processing machine, comprising an array of information processing and transferring cells of word organized type arranged for independent operation in parallel; each cell of said array containing means for addressing all of the cells within a respective surrounding region containing said cell and limited in extent by bit length of the instruction word; said array having at least two different such surrounding regions associated with two different cells, respectively, which have no cells in common; means for transferring information between any cell in said array and other cells within the region surrounding said any cell; means for deactivating the cells of said array in order to stop their execution of the instructions; and power and clock buslines connected to each cell of said array so that power and clock pulses can be supplied from external sources at such a rate and in such a manner that consecutive pulses are separated from each other far enough in both space and time that, for any given cell within the said array, the surrounding region will contain, at most, one such pulse at any given time.

2. A machine according to claim 1, wherein there is additionally provided at least one input-output means connected to at least one cell of the array of cells for exchanging information with an external digital device.

3. A machine according to claim 2, wherein there are additionally provided starting means for operating the deactivating means, for initiating the loading of a program into, and for initiating the execution of instructions within certain cells in said input-output means.

4. A machine according to claim 1, wherein there is additionally provided at least one digital storing and transferring machine, and means functionally connecting each of said storing and transferring machines to a cell of the machine of claim 1.

5. A machine according to claim 1, wherein power and clock supply means are connected with the power and clock buslines, respectively, said means being adapted to supply power and clock pulses in the prescribed manner.

6. A digital computing and information processing system, comprising at least two machines in accordance with claim 1;

and means for transferring information between at least one cell of any one of the machines and at least one cell of at least one other of the machines.

7. A system according to claim 6, wherein there is additionally provided at least one digital storing and transferring machine; and means functionally connecting each said storing and transferring machine to a cell of the system.

8. A system according to claim 7, wherein there is additionally provided at least one input-output means which is functionally attached to at least one cell of one of the machines for exchanging information with an external digital device.

9. A digital storing and transferring machine, comprising an array of storing and transferring cells of word organized type arranged for operation in parallel; each cell having means for exchanging information with neighboring cells in a region surrounding said cell; at least two cells of said array having respective surrounding regions which have no cells in common; power and clock pulse buslines connected to each cell of said array, so that external power and clock pulses can be supplied at such a rate and in such a manner that consecutive pulses are separated from each other far enough in space and time so that the surrounding region of any cell within said array contains, at most, one power and clock pulse at any given time.

10. A machine according to claim 9, wherein the cells are arranged in a 1-dimensional array.

11. A machine according to claim 9, wherein the cells are arranged in a 2-dimensional array.

12. A machine according to claim 9, wherein the cells are arranged in a 3-dimensional array.

13. A machine according to claim 9, wherein the cells of said array have control submodules and double register submodules for storing and transferring information within the said array of cells and have the said means for exchanging information with neighboring cells arranged so that the information may be stored or retrieved in a cyclic fashion, with the cyclic operations proceeding in either a forward or reverse sequence; at east one cell of said array having additional means for transferring the information into or out of said cell, and having means for receiving and operating or information designating the type and extent of cyclic operation to be performed.

14. A machine according to claim 9, wherein power and clock supply means are connected with the power and clock buslines, respectively, said means being adapted to supply power and clock pulses in the prescribed manner.

15. An information processing and transferring cell of word organized type, comprising means for storing at least one word of information; means for storing and sensing the invention in a special bit contained in a selected one of said at least one word of information, and for initiating the execution of the appropriate instruction in said cell as determined from the information in said bit; means for decoding the said selected one word in said cell; means for exchanging information with other similar cells as determined by the address in the selected word; means for executing at least two instructions, one being a duplication instruction, wherein information is moved from one set of cells to another set of cells, and the other being a branching instruction, wherein alternative sets of cells are activated for executing their respective instructions; and means connected to said executing means for utilizing signals from a deactivating means for the purpose of stopping the execution of instructions within the cell.

16. A cell according to claim 15, wherein there are additionally provided means for functionally connecting a digital storing and transferring machine to said cell, and means for inserting information into or using information from said machine in accordance with the instructions of said cell.

17. A cell according to claim 15, wherein there are additionally provided means for exchanging information with other digital devices external to the cell; and means for supplying from the cell information for the operation of said devices.

18. A storage and transferring cell of word organized type, comprising at least one control submodule, having means for exchanging control signals with other such control submodules in said cell or similar cells, and having means for sending control signals to double-register submodules of said cell and having means for decoding any received signals in order to send out the appropriate, subsequent control signals; at least two double-register submodules, each having means for storing two words of information, and means for receiving a transmitted word in the first register from other submodules of said cell or other similar cells, and means for transferring the information to the second register of the said double-register submodule as controlled by signals from a control submodule of said cell; and information transferring means adapted to functionally connect the second register of the double-register submodule to the first register of various similar submodules in said cell and in similar cells.

19. A digital circuit for storing information and for transferring the stored information to other digital circuits if and when required, comprising digital information storing means; additional means for storing and sensing digital information that determined direction and extent of information transfer to other digital circuits, said additional means being connected to said digital information storing means; means for transferring information from said digital information storing means to other digital transferring circuits and being connected to said additional means; means connected to the said additional means for storing and sensing digital information for automatically changing the digital information that determines direction and extent of information transfer so as to indicate in that digital information the fact that it has passed through said digital circuit; and additional means connected to said digital information storing means for transferring digital information therefrom to other digital circuits that are not transferring circuits.

20. A digital circuit according to claim 19, wherein the digital information storing means is a shift register circuit; the additional means for storing and sensing information determining direction and extent of information transfer comprise shift register and decoder circuits; the means for transferring information to other digital circuits are conductors for power pulses; and the means for automatically changing the digital information is an arithmetical reducing circuit.

21. A digital information processing cell of word-organized type including a digital circuit in accordance with claim 19, and additionally including means for storing and sensing in instruction and for executing other instructions from other digital processing information processing cells of word-organized type in an array of such cells; and means connected with the first-named means for receiving and sensing other instructions from other cells in said array.

22. A digital information processing cell according to claim 21, wherein the additional means for storing and sensing an instruction comprises storage register and decoder circuits connected to the digital information storing means.

23. A digital information processing cell of word-organized type in accordance with claim 21, wherein the means for transferring information from the digital information storing means to other digital transferring cells is constructed and arranged to transfer said information to a plurality of said other cells simultaneously.